(12) United States Patent
Hacker

(10) Patent No.: US 10,758,847 B2
(45) Date of Patent: *Sep. 1, 2020

(54) FILTER CARTRIDGE FOR LIQUID FILTERATION; ASSEMBLY; AND, METHODS

(71) Applicant: Donaldson Company, Inc., Minneapolis, MN (US)

(72) Inventor: John Hacker, Edina, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/840,819

(22) Filed: Dec. 13, 2017

(65) Prior Publication Data

US 2018/0193776 A1    Jul. 12, 2018

Related U.S. Application Data

(63) Continuation of application No. 14/543,023, filed on Nov. 17, 2014, now Pat. No. 9,895,632, which is a
(Continued)

(51) Int. Cl.
*B01D 29/01* (2006.01)
*B01D 35/153* (2006.01)
(Continued)

(52) U.S. Cl.
CPC ........... *B01D 29/016* (2013.01); *B01D 29/21* (2013.01); *B01D 29/232* (2013.01); *B01D 29/31* (2013.01);
(Continued)

(58) Field of Classification Search
None
See application file for complete search history.

(56) References Cited

U.S. PATENT DOCUMENTS

| 4,419,234 A | 12/1983 | Miller et al. |
| 4,783,271 A | 11/1988 | Silverwater |

(Continued)

FOREIGN PATENT DOCUMENTS

| DE | 101 13 179 A1 | 9/2002 |
| DE | 199 44 344 B4 | 1/2004 |

(Continued)

OTHER PUBLICATIONS

Allowed claims corresponding to U.S. Appl. No. 13/905,267 dated Dec. 2, 2014.
(Continued)

*Primary Examiner* — Benjamin M Kurtz
(74) *Attorney, Agent, or Firm* — Merchant & Gould P.C.

(57) ABSTRACT

A liquid filter cartridge is provided. Preferred seal arrangements are provided, to provide for preferred axial load conditions, with respect to one or more of the end caps of the cartridge. Some cartridge configurations provided include no core structure or outer liner structure therein, to support axial load. Assemblies using the cartridge, and methods of assembly and use, are provided. The liquid filter cartridge can be a serviceable cartridge, or it can be retained permanently in a housing.

16 Claims, 51 Drawing Sheets

Related U.S. Application Data continuation of application No. 13/905,267, filed on May 30, 2013, now Pat. No. 9,180,390, which is a continuation of application No. 13/282,967, filed on Oct. 27, 2011, now Pat. No. 8,453,848, which is a continuation of application No. 11/098,242, filed on Apr. 4, 2005, now Pat. No. 8,167,142.

(60) Provisional application No. 60/562,045, filed on Apr. 13, 2004.

(51) Int. Cl.
  B01D 35/16 (2006.01)
  B01D 35/30 (2006.01)
  B01D 29/31 (2006.01)
  B01D 29/23 (2006.01)
  B01D 35/147 (2006.01)
  B01D 63/06 (2006.01)
  B01D 65/00 (2006.01)
  B01D 29/21 (2006.01)

(52) U.S. Cl.
  CPC ......... B01D 35/147 (2013.01); B01D 35/153 (2013.01); B01D 35/16 (2013.01); B01D 35/30 (2013.01); B01D 35/306 (2013.01); B01D 63/067 (2013.01); B01D 65/003 (2013.01); *B01D 2201/12* (2013.01); *B01D 2201/291* (2013.01); *B01D 2201/302* (2013.01); *B01D 2201/304* (2013.01); *B01D 2201/305* (2013.01); *B01D 2201/34* (2013.01); *B01D 2201/347* (2013.01); *B01D 2313/21* (2013.01); *B01D 2313/44* (2013.01)

(56) References Cited

U.S. PATENT DOCUMENTS

| | | |
|---|---|---|
| 5,476,585 A | 12/1995 | Mills |
| 5,605,625 A | 2/1997 | Mills |
| 5,685,985 A | 11/1997 | Brown et al. |
| 5,702,602 A | 12/1997 | Brown et al. |
| 5,730,769 A | 3/1998 | Dungs et al. |
| 5,738,785 A | 4/1998 | Brown et al. |
| 5,753,120 A | 5/1998 | Clausen et al. |
| 5,858,227 A | 1/1999 | Stone et al. |
| 5,893,937 A | 4/1999 | Moessinger |
| 5,984,109 A | 11/1999 | Kanwar et al. |
| 6,099,729 A | 8/2000 | Cella et al. |
| 6,156,198 A * | 12/2000 | Bartels ................ B01D 29/232 210/315 |
| 6,187,191 B1 | 2/2001 | Koivula et al. |
| 6,206,205 B1 | 3/2001 | Durre et al. |
| 6,227,381 B1 | 5/2001 | Koivula |
| 6,347,712 B1 * | 2/2002 | Mees .................... B01D 29/15 210/440 |
| 6,416,561 B1 | 7/2002 | Kallsen et al. |
| 6,478,958 B1 | 11/2002 | Beard et al. |
| 6,499,605 B1 | 12/2002 | Koivula |
| 6,599,342 B2 | 7/2003 | Andress et al. |
| 6,555,000 B2 | 8/2003 | Knight et al. |
| 6,602,308 B1 | 8/2003 | Carle et al. |
| 6,626,299 B1 | 9/2003 | Brown et al. |
| 6,695,966 B1 | 2/2004 | Sakraschinsky et al. |
| 6,787,033 B2 | 9/2004 | Beard et al. |
| RE41,713 E | 9/2010 | Gunderson et al. |
| RE42,174 E | 3/2011 | Gunderson et al. |
| 8,152,876 B2 | 4/2012 | Gillenberg et al. |
| 8,167,142 B2 | 5/2012 | Hacker |
| 8,453,848 B2 | 6/2013 | Hacker |
| 8,535,530 B2 | 9/2013 | Mandt et al. |
| 8,821,724 B2 | 9/2014 | Mandt |
| 9,180,390 B2 | 11/2015 | Hacker |
| 9,895,632 B2 * | 2/2018 | Hacker ................ B01D 29/21 |
| 2002/0152732 A1 | 10/2002 | Kallsen et al. |
| 2002/0158006 A1 | 10/2002 | Thomas |
| 2003/0094408 A1 | 5/2003 | Schuyler et al. |
| 2003/0146149 A1 | 8/2003 | Binder et al. |
| 2007/0163945 A1 | 7/2007 | Ehrenberg et al. |
| 2009/0114585 A1 | 5/2009 | Mandt et al. |
| 2011/0017657 A1 | 1/2011 | Jokshas et al. |
| 2011/0247582 A1 | 10/2011 | Blossey et al. |
| 2011/0259199 A1 | 10/2011 | Blossey et al. |

FOREIGN PATENT DOCUMENTS

| | | |
|---|---|---|
| EP | 1 201 289 A1 | 5/2002 |
| EP | 0 844 012 B1 | 8/2003 |
| FR | 2 796 567 | 1/2001 |
| WO | WO 2007/084645 | 7/2007 |

OTHER PUBLICATIONS

Declaration of John R. Hacker (Oct. 29, 2008).
PCT search report and written opinion corresponding to PCT/US2005/011256 dated Oct. 26, 2006.
Exhibit 8 to Declaration (Jan. 14, 2010).
EP search report and written opinion corresponding to 10182710.3-2113-2301646 dated Mar. 2, 2011.
Exhibit 9 to Declaration (Jan. 14, 2010).
First Supplemental Declaration of John R. Hacker (May 7, 2009).
Second Supplemental Declaration of John R. Hacker (Jan. 14, 2010).
Third Supplemental Declaration of John R. Hacker (Jul. 13, 2011).

* cited by examiner

FIG. 15

Ae = number of pleats* Di/4*Do*sin(180 degrees/number of pleats) - Pi/4* Ds"2
Ds = ((number of pleats* Di/4*Do*sin(180 degrees/number of pleats) - Ae)*(4/Pi))^.5
Di = (4*Ae+Pi*Ds^2)/(number of pleats*Do*sin(180/number of pleats))
Do = (Ae+Pi/4*Ds^2)/(number of pleats*Di/4*sin(180/number of pleats))

Ds = (Do x Di x Sin(180degrees/number of pleats)x number of pleats / pi)^.5
Di = (4*Ae+Pi*Ds^2)/(number of pleats*Do*sin(180/number of pleats))
Do = (Ae+Pi/4*Ds^2)/(number of pleats*Di/4*sin(180/number of pleats))

|  |  |  | DP max = | 200 psid |  |
|---|---|---|---|---|---|
|  |  |  | Fmaxt = | 40 lbf |  |
|  |  |  | Ae max = | 0.20 in^2 |  |
| Plt Dpth | Do | Di | Ds | Ae | Fa |
| 50 | inches | inches | inches | in^2 | lbf |
|  | 3.27 | 1.59 | 2.28 | 0.00 | 0.00 |
| Do max | 3.43 | 1.59 | 2.28 | -0.20 | -40.00 |
| Do min | 3.11 | 1.59 | 2.28 | 0.20 | -40.00 |
| Di max | 3.27 | 1.67 | 2.28 | -0.20 | -40.00 |
| Di min | 3.27 | 1.51 | 2.28 | 0.20 | -40.00 |
| Ds min % | 3.27 | 1.59 | 2.22 | -0.20 | -40.00 |
| Ds max % | 3.27 | 1.59 | 2.33 | 0.20 | -40.00 |
| Do max % | 104.9% |  |  |  |  |
| Do min % | 95.1% |  |  |  |  |
| Di max % |  | 104.9% |  |  |  |
| Di min % |  | 95.1% |  |  |  |
| Ds min % |  |  | 97.5% |  |  |
| Ds max % |  |  | 102.4% |  |  |

|  |  |  | DP max = | 200 psid |
|---|---|---|---|---|
|  |  |  | Fmaxt = | 40 lbf |
|  |  |  | Ae max = | 0.20 in^2 |
| Plt Cnt | Do | Di | Plt Dpth | Ds |
| 50 | inches | inches | inches | inches |
|  | 5 |  | 5 | 5 |
| Do max | 5.08 |  |  |  |
| Do min | 4.92 |  |  |  |
| Do max % | 101.7 % |  |  |  |
| Do min % | 98.3 % |  |  |  |

GROUP 1 / 7% GAP / NEW DESIGN VS STANDARD CARTRIDGE WITH SEAL ON I.D.

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| | Do | Di | PIT DEPTH | PIT CNT | GAP | Ds=Db (CALCULATED) | Do MIN | Do MIN AS A % OF Db | Do MAX | Do MAX AS A% OF Db | Di MIN | Di MIN AS A % OF Db | Di MAX | Di MAX AS A% OF Db | Astd(Ds=Di, Do, Di) SEAL ON I.D | Ae(Ds_CALC, Do_MIN, DI_MIN) | Ds1=Ds AS A FUNCTION OF Do_MIN & DI_MIN | Ds1 AS A % OF Db | Ae(Ds_CALC, Do_MIN, DI_MAX) | Ds1=Ds AS A FUNCTION OF Do_MIN & DI_MAX | Ds1 AS A % OF Db | Ae(Ds_CALC, Do_MAX, DI_MIN) | Ds1=Ds AS A FUNCTION OF Do_MAX & DI_MIN | Ds1 AS A % OF Db | Ae(Ds_CALC, Do_MAX, DI_MAX) | Ds1=Ds AS A FUNCTION OF Do_MAX & DI_MAX | Ds1 AS A % OF Db CALC (ie % OF Db Col.6) | Ae(Ds=Db, Do_MIN, DI_MIN) %STD | Ae(Ds=Db, Do_MIN, DI_MAX) %STD | Ae(Ds=Db, Do_MAX, DI_MIN) %STD | Ae(Ds=Db, Do_MAX, DI_MAX) %STD |
| 1 | 2.5 | 1.25 | 0.63 | 20 | 7% | 1.76 | 2.33 | 1.32 | 2.68 | 1.52 | 1.16 | 0.66 | 1.34 | 0.76 | 1.22 | -0.333 | 1.64 | 0.930 | -0.011 | 1.76 | 0.998 | -0.011 | 1.76 | 0.998 | 0.35 | 4.15 | 1.070 | 0.27 | 0.01 | 0.01 | 0.29 |
| 2 | 2.6 | 1.3 | 0.65 | 20 | 7% | 1.83 | 2.42 | 1.32 | 2.78 | 1.52 | 1.21 | 0.66 | 1.39 | 0.76 | 1.32 | -0.36 | 1.71 | 0.930 | -0.011 | 1.83 | 0.998 | -0.011 | 1.83 | 0.998 | 0.38 | 1.96 | 1.070 | 0.27 | 0.01 | 0.01 | 0.29 |
| 3 | 2.7 | 1.35 | 0.68 | 20 | 7% | 1.91 | 2.51 | 1.32 | 2.89 | 1.52 | 1.26 | 0.66 | 1.44 | 0.76 | 1.42 | -0.39 | 1.77 | 0.930 | -0.011 | 1.90 | 0.998 | -0.011 | 1.90 | 0.998 | 0.41 | 2.04 | 1.070 | 0.27 | 0.01 | 0.01 | 0.29 |
| 4 | 2.8 | 1.4 | 0.7 | 20 | 7% | 1.98 | 2.60 | 1.32 | 3.00 | 1.52 | 1.30 | 0.66 | 1.50 | 0.76 | 1.53 | -0.411 | 1.84 | 0.930 | -0.021 | 1.97 | 0.998 | -0.021 | 1.97 | 0.998 | 0.44 | 2.11 | 1.070 | 0.27 | 0.01 | 0.01 | 0.29 |
| 5 | 2.9 | 1.45 | 0.73 | 20 | 7% | 2.05 | 2.70 | 1.32 | 3.10 | 1.52 | 1.35 | 0.66 | 1.56 | 0.76 | 1.64 | -0.44 | 1.90 | 0.930 | -0.022 | 2.04 | 0.998 | -0.022 | 2.04 | 0.998 | 0.48 | 2.19 | 1.070 | 0.27 | 0.01 | 0.01 | 0.29 |
| 6 | 3 | 1.5 | 0.75 | 20 | 7% | 2.12 | 2.79 | 1.32 | 3.21 | 1.52 | 1.40 | 0.66 | 1.61 | 0.76 | 1.75 | -0.48 | 1.97 | 0.930 | -0.022 | 2.11 | 0.998 | -0.022 | 2.11 | 0.998 | 0.51 | 2.27 | 1.070 | 0.27 | 0.01 | 0.01 | 0.29 |
| 7 | 3.1 | 1.55 | 0.78 | 20 | 7% | 2.19 | 2.88 | 1.32 | 3.32 | 1.52 | 1.44 | 0.66 | 1.66 | 0.76 | 1.87 | -0.512 | 2.03 | 0.930 | -0.022 | 2.18 | 0.998 | -0.022 | 2.18 | 0.998 | 0.54 | 2.34 | 1.070 | 0.27 | 0.01 | 0.01 | 0.29 |
| 8 | 3.2 | 1.6 | 0.8 | 20 | 7% | 2.26 | 2.98 | 1.32 | 3.42 | 1.52 | 1.49 | 0.66 | 1.71 | 0.76 | 1.93 | -0.54 | 2.10 | 0.930 | -0.022 | 2.25 | 0.998 | -0.022 | 2.25 | 0.998 | 0.58 | 2.42 | 1.070 | 0.27 | 0.01 | 0.01 | 0.29 |
| 9 | 3.3 | 1.65 | 0.83 | 20 | 7% | 2.33 | 3.07 | 1.32 | 3.53 | 1.52 | 1.53 | 0.66 | 1.77 | 0.76 | 2.12 | -0.58 | 2.17 | 0.930 | -0.022 | 2.32 | 0.998 | -0.022 | 2.32 | 0.998 | 0.62 | 2.49 | 1.070 | 0.27 | 0.01 | 0.01 | 0.29 |
| 10 | 3.4 | 1.7 | 0.85 | 20 | 7% | 2.40 | 3.16 | 1.32 | 3.64 | 1.52 | 1.58 | 0.66 | 1.82 | 0.76 | 2.25 | -0.61 | 2.23 | 0.930 | -0.022 | 2.39 | 0.998 | -0.022 | 2.39 | 0.998 | 0.66 | 2.57 | 1.070 | 0.27 | 0.01 | 0.01 | 0.29 |
| 11 | 3.5 | 1.75 | 0.88 | 20 | 7% | 2.47 | 3.26 | 1.32 | 3.75 | 1.52 | 1.63 | 0.66 | 1.87 | 0.76 | 2.39 | -0.65 | 2.30 | 0.930 | -0.022 | 2.46 | 0.998 | -0.022 | 2.46 | 0.998 | 0.69 | 2.64 | 1.070 | 0.27 | 0.01 | 0.01 | 0.29 |
| 12 | 3.6 | 1.8 | 0.9 | 20 | 7% | 2.54 | 3.35 | 1.32 | 3.85 | 1.52 | 1.67 | 0.66 | 1.93 | 0.76 | 2.52 | -0.68 | 2.36 | 0.930 | -0.022 | 2.53 | 0.998 | -0.022 | 2.53 | 0.998 | 0.73 | 2.72 | 1.070 | 0.27 | 0.01 | 0.01 | 0.29 |
| 13 | 3.7 | 1.85 | 0.93 | 20 | 7% | 2.61 | 3.44 | 1.32 | 3.96 | 1.52 | 1.72 | 0.66 | 1.96 | 0.76 | 2.67 | -0.72 | 2.43 | 0.930 | -0.032 | 2.60 | 0.998 | -0.032 | 2.60 | 0.998 | 0.78 | 2.79 | 1.070 | 0.27 | 0.01 | 0.01 | 0.29 |
| 14 | 3.8 | 1.9 | 0.95 | 20 | 7% | 2.66 | 3.53 | 1.32 | 4.07 | 1.52 | 1.77 | 0.66 | 2.03 | 0.76 | 2.81 | -0.76 | 2.49 | 0.930 | -0.032 | 2.67 | 0.998 | -0.032 | 2.67 | 0.998 | 0.82 | 2.86 | 1.070 | 0.27 | 0.01 | 0.01 | 0.29 |
| 15 | 3.9 | 1.95 | 0.98 | 20 | 7% | 2.75 | 3.63 | 1.32 | 4.17 | 1.52 | 1.81 | 0.66 | 2.09 | 0.76 | 2.96 | -0.80 | 2.56 | 0.930 | -0.032 | 2.75 | 0.998 | -0.032 | 2.75 | 0.998 | 0.86 | 2.87 | 1.070 | 0.27 | 0.01 | 0.01 | 0.29 |
| 16 | 4 | 2 | 1 | 20 | 7% | 2.82 | 3.72 | 1.32 | 4.28 | 1.52 | 1.86 | 0.66 | 2.13 | 0.76 | 3.12 | -0.85 | 2.63 | 0.930 | -0.032 | 2.82 | 0.998 | -0.032 | 2.82 | 0.998 | 0.91 | 2.94 | 1.070 | 0.27 | 0.01 | 0.01 | 0.29 |
| 17 | 4.1 | 2.05 | 1.03 | 20 | 7% | 2.89 | 3.81 | 1.32 | 4.39 | 1.52 | 1.91 | 0.66 | 2.19 | 0.76 | 3.27 | -0.89 | 2.69 | 0.930 | -0.032 | 2.89 | 0.998 | -0.032 | 2.89 | 0.998 | 0.95 | 3.02 | 1.070 | 0.27 | 0.01 | 0.01 | 0.29 |
| 18 | 4.2 | 2.1 | 1.05 | 20 | 7% | 2.96 | 3.91 | 1.32 | 4.49 | 1.52 | 1.95 | 0.66 | 2.25 | 0.76 | 3.44 | -0.93 | 2.76 | 0.930 | -0.043 | 2.96 | 0.998 | -0.043 | 2.96 | 0.998 | 1.00 | 3.10 | 1.070 | 0.27 | 0.01 | 0.01 | 0.29 |
| 19 | 4.3 | 2.15 | 1.08 | 20 | 7% | 3.03 | 4.00 | 1.32 | 4.60 | 1.52 | 2.00 | 0.66 | 2.30 | 0.76 | 3.60 | -0.98 | 2.82 | 0.930 | -0.043 | 3.03 | 0.998 | -0.043 | 3.03 | 0.998 | 1.05 | 3.17 | 1.070 | 0.27 | 0.01 | 0.01 | 0.29 |
| 20 | 4.4 | 2.2 | 1.1 | 20 | 7% | 3.10 | 4.09 | 1.32 | 4.71 | 1.52 | 2.05 | 0.66 | 2.35 | 0.76 | 3.77 | -1.02 | 2.89 | 0.930 | -1.072 | 2.95 | 0.998 | -1.072 | 2.95 | 0.998 | 1.10 | 3.25 | 1.070 | 0.27 | 0.01 | 0.01 | 0.29 |
| 21 | 4.5 | 2.25 | 1.13 | 20 | 7% | 3.18 | 4.19 | 1.32 | 4.82 | 1.52 | 2.09 | 0.66 | 2.41 | 0.76 | 3.94 | -1.07 | 2.95 | 0.930 | -1.15 | 3.10 | 0.998 | -1.15 | 3.10 | 0.998 | 1.15 | 3.32 | 1.070 | 0.27 | 0.01 | 0.01 | 0.29 |
| 22 | 4.6 | 2.3 | 1.15 | 20 | 7% | 3.25 | 4.28 | 1.32 | 4.92 | 1.52 | 2.14 | 0.66 | 2.46 | 0.76 | 4.12 | -1.12 | 3.02 | 0.930 | -0.043017 | 3.17 | 0.998 | -0.043017 | 3.17 | 0.998 | 1.20 | 3.40 | 1.070 | 0.27 | 0.01 | 0.01 | 0.29 |
| 23 | 4.7 | 2.35 | 1.18 | 20 | 7% | 3.32 | 4.37 | 1.32 | 5.03 | 1.52 | 2.19 | 0.66 | 2.51 | 0.76 | 4.30 | -1.17 | 3.08 | 0.930 | -0.043 | 3.24 | 0.998 | -0.043 | 3.24 | 0.998 | 1.25 | 3.47 | 1.070 | 0.27 | 0.01 | 0.01 | 0.29 |
| 24 | 4.8 | 2.4 | 1.2 | 20 | 7% | 3.39 | 4.46 | 1.32 | 5.14 | 1.52 | 2.23 | 0.66 | 2.57 | 0.76 | 4.49 | -1.22 | 3.16 | 0.930 | -0.053 | 3.31 | 0.998 | -0.053 | 3.31 | 0.998 | 1.31 | 3.55 | 1.070 | 0.27 | 0.01 | 0.01 | 0.29 |
| 25 | 4.9 | 2.45 | 1.23 | 20 | 7% | 3.46 | 4.56 | 1.32 | 5.24 | 1.52 | 2.28 | 0.66 | 2.62 | 0.76 | 4.68 | -1.27 | 3.22 | 0.930 | -0.053 | 3.38 | 0.998 | -0.053 | 3.38 | 0.998 | 1.36 | 3.62 | 1.070 | 0.27 | 0.01 | 0.01 | 0.29 |
| 26 | 5 | 2.5 | 1.25 | 20 | 7% | 3.53 | 4.65 | 1.32 | 5.35 | 1.52 | 2.33 | 0.66 | 2.68 | 0.76 | 4.87 | -1.32 | 3.28 | 0.930 | -0.053 | 3.45 | 0.998 | -0.053 | 3.45 | 0.998 | 1.42 | 3.70 | 1.070 | 0.27 | 0.01 | 0.01 | 0.29 |
| 27 | 5.1 | 2.55 | 1.28 | 20 | 7% | 3.60 | 4.74 | 1.32 | 5.46 | 1.52 | 2.37 | 0.66 | 2.73 | 0.76 | 5.07 | -1.37 | 3.35 | 0.930 | -0.053 | 3.52 | 0.998 | -0.053 | 3.52 | 0.998 | 1.47 | 3.78 | 1.070 | 0.27 | 0.01 | 0.01 | 0.29 |
| 28 | 5.2 | 2.6 | 1.3 | 20 | 7% | 3.67 | 4.84 | 1.32 | 5.56 | 1.52 | 2.42 | 0.66 | 2.78 | 0.76 | 5.27 | -1.43 | 3.41 | 0.930 | -0.053 | 3.59 | 0.998 | -0.053 | 3.59 | 0.998 | 1.53 | 3.85 | 1.070 | 0.27 | 0.01 | 0.01 | 0.29 |
| 29 | 5.3 | 2.65 | 1.33 | 20 | 7% | 3.74 | 4.93 | 1.32 | 5.67 | 1.52 | 2.46 | 0.66 | 2.84 | 0.76 | 5.47 | -1.48 | 3.48 | 0.930 | -0.053 | 3.66 | 0.998 | -0.053 | 3.66 | 0.998 | 1.59 | 3.93 | 1.070 | 0.27 | 0.01 | 0.01 | 0.29 |
| 30 | 5.4 | 2.7 | 1.35 | 20 | 7% | 3.81 | 5.02 | 1.32 | 5.78 | 1.52 | 2.51 | 0.66 | 2.89 | 0.76 | 5.68 | -1.54 | 3.54 | 0.930 | -0.063 | 3.73 | 0.998 | -0.063 | 3.73 | 0.998 | 1.65 | 4.00 | 1.070 | 0.27 | 0.01 | 0.01 | 0.29 |
| 31 | 5.5 | 2.75 | 1.38 | 20 | 7% | 3.88 | 5.12 | 1.32 | 5.89 | 1.52 | 2.56 | 0.66 | 2.94 | 0.76 | 5.89 | -1.60 | 3.61 | 0.930 | -0.063 | 3.80 | 0.998 | -0.063 | 3.80 | 0.998 | 1.71 | 4.15 | 1.070 | 0.27 | 0.01 | 0.01 | 0.29 |

FIG. 18A

GROUP 1 / 7% GAP / NEW DESIGN VS

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| | Do | DI | PIT DEPTH | PIT CNT | GAP | Ds=Db (CALCULATED) | Do MIN | Do MIN AS A % OF Db | Do MAX | Do MAX AS A% OF Db | DI MIN | DI MIN AS A % OF Db | DI MAX | DI MAX AS A% OF Db | Astd(Ds=DI, Do, DI) SEAL ON I.D | Ae(Ds_CALC, Do_MIN, DI_MIN) |
| 1 | 2.5 | 1.25 | 0.63 | 20 | 7% | 1.76 | 2.33 | 1.32 | 2.68 | 1.52 | 1.16 | 0.66 | 1.34 | 0.76 | 1.22 | −0.33 |
| 2 | 2.6 | 1.3 | 0.65 | 20 | 7% | 1.83 | 2.42 | 1.32 | 2.78 | 1.52 | 1.21 | 0.66 | 1.39 | 0.76 | 1.32 | −0.36 |
| 3 | 2.7 | 1.35 | 0.68 | 20 | 7% | 1.91 | 2.51 | 1.32 | 2.89 | 1.52 | 1.26 | 0.66 | 1.44 | 0.76 | 1.42 | −0.39 |
| 4 | 2.8 | 1.4 | 0.7 | 20 | 7% | 1.98 | 2.60 | 1.32 | 3.00 | 1.52 | 1.30 | 0.66 | 1.50 | 0.76 | 1.53 | −0.41 |
| 5 | 2.9 | 1.45 | 0.73 | 20 | 7% | 2.05 | 2.70 | 1.32 | 3.10 | 1.52 | 1.35 | 0.66 | 1.56 | 0.76 | 1.64 | −0.44 |
| 6 | 3 | 1.5 | 0.75 | 20 | 7% | 2.12 | 2.79 | 1.32 | 3.21 | 1.52 | 1.40 | 0.66 | 1.61 | 0.76 | 1.75 | −0.48 |
| 7 | 3.1 | 1.55 | 0.78 | 20 | 7% | 2.19 | 2.88 | 1.32 | 3.32 | 1.52 | 1.44 | 0.66 | 1.66 | 0.76 | 1.87 | −0.51 |
| 8 | 3.2 | 1.6 | 0.8 | 20 | 7% | 2.26 | 2.98 | 1.32 | 3.42 | 1.52 | 1.49 | 0.66 | 1.71 | 0.76 | 1.99 | −0.54 |
| 9 | 3.3 | 1.65 | 0.83 | 20 | 7% | 2.33 | 3.07 | 1.32 | 3.53 | 1.52 | 1.53 | 0.66 | 1.77 | 0.76 | 2.12 | −0.58 |
| 10 | 3.4 | 1.7 | 0.85 | 20 | 7% | 2.40 | 3.16 | 1.32 | 3.64 | 1.52 | 1.58 | 0.66 | 1.82 | 0.76 | 2.25 | −0.61 |
| 11 | 3.5 | 1.75 | 0.88 | 20 | 7% | 2.47 | 3.26 | 1.32 | 3.75 | 1.52 | 1.63 | 0.66 | 1.87 | 0.76 | 2.39 | −0.65 |
| 12 | 3.6 | 1.8 | 0.9 | 20 | 7% | 2.54 | 3.35 | 1.32 | 3.85 | 1.52 | 1.67 | 0.66 | 1.93 | 0.76 | 2.52 | −0.68 |
| 13 | 3.7 | 1.85 | 0.93 | 20 | 7% | 2.61 | 3.44 | 1.32 | 3.96 | 1.52 | 1.72 | 0.66 | 1.96 | 0.76 | 2.67 | −0.72 |
| 14 | 3.8 | 1.9 | 0.95 | 20 | 7% | 2.66 | 3.53 | 1.32 | 4.07 | 1.52 | 1.77 | 0.66 | 2.03 | 0.76 | 2.81 | −0.76 |
| 15 | 3.9 | 1.95 | 0.98 | 20 | 7% | 2.75 | 3.63 | 1.32 | 4.17 | 1.52 | 1.81 | 0.66 | 2.09 | 0.76 | 2.96 | −0.80 |
| 16 | 4 | 2 | 1 | 20 | 7% | 2.82 | 3.72 | 1.32 | 4.28 | 1.52 | 1.86 | 0.66 | 2.14 | 0.76 | 3.12 | −0.85 |
| 17 | 4.1 | 2.05 | 1.03 | 20 | 7% | 2.89 | 3.81 | 1.32 | 4.39 | 1.52 | 1.91 | 0.66 | 2.19 | 0.76 | 3.27 | −0.89 |
| 18 | 4.2 | 2.1 | 1.05 | 20 | 7% | 2.96 | 3.91 | 1.32 | 4.49 | 1.52 | 1.95 | 0.66 | 2.25 | 0.76 | 3.44 | −0.93 |
| 19 | 4.3 | 2.15 | 1.08 | 20 | 7% | 3.03 | 4.00 | 1.32 | 4.60 | 1.52 | 2.00 | 0.66 | 2.30 | 0.76 | 3.60 | −0.98 |
| 20 | 4.4 | 2.2 | 1.1 | 20 | 7% | 3.10 | 4.09 | 1.32 | 4.71 | 1.52 | 2.05 | 0.66 | 2.35 | 0.76 | 3.77 | −1.02 |
| 21 | 1.5 | 2.25 | 1.13 | 20 | 7% | 3.18 | 4.19 | 1.32 | 4.82 | 1.52 | 2.09 | 0.66 | 2.41 | 0.76 | 3.94 | −1.07 |
| 22 | 4.6 | 2.3 | 1.15 | 20 | 7% | 3.25 | 4.28 | 1.32 | 4.92 | 1.52 | 2.14 | 0.66 | 2.46 | 0.76 | 4.12 | −1.12 |
| 23 | 4.7 | 2.35 | 1.18 | 20 | 7% | 3.32 | 4.37 | 1.32 | 5.03 | 1.52 | 2.19 | 0.66 | 2.51 | 0.76 | 4.30 | −1.17 |
| 24 | 4.8 | 2.4 | 1.2 | 20 | 7% | 3.39 | 4.46 | 1.32 | 5.14 | 1.52 | 2.23 | 0.66 | 2.57 | 0.76 | 4.49 | −1.22 |
| 25 | 4.9 | 2.45 | 1.23 | 20 | 7% | 3.46 | 4.56 | 1.32 | 5.24 | 1.52 | 2.28 | 0.66 | 2.62 | 0.76 | 4.68 | −1.27 |
| 26 | 5 | 2.5 | 1.25 | 20 | 7% | 3.53 | 4.65 | 1.32 | 5.35 | 1.52 | 2.33 | 0.66 | 2.68 | 0.76 | 4.87 | −1.32 |
| 27 | 5.1 | 2.55 | 1.28 | 20 | 7% | 3.60 | 4.74 | 1.32 | 5.46 | 1.52 | 2.37 | 0.66 | 2.73 | 0.76 | 5.07 | −1.37 |
| 28 | 5.2 | 2.6 | 1.3 | 20 | 7% | 3.67 | 4.84 | 1.32 | 5.56 | 1.52 | 2.42 | 0.66 | 2.78 | 0.76 | 5.27 | −1.43 |
| 29 | 5.3 | 2.65 | 1.33 | 20 | 7% | 3.74 | 4.93 | 1.32 | 5.67 | 1.52 | 2.46 | 0.66 | 2.84 | 0.76 | 5.47 | −1.48 |
| 30 | 5.4 | 2.7 | 1.35 | 20 | 7% | 3.81 | 5.02 | 1.32 | 5.78 | 1.52 | 2.51 | 0.66 | 2.89 | 0.76 | 5.68 | −1.54 |
| 31 | 5.5 | 2.75 | 1.38 | 20 | 7% | 3.88 | 5.12 | 1.32 | 5.89 | 1.52 | 2.56 | 0.66 | 2.94 | 0.76 | 5.89 | −1.60 |

FIG. 18B

| \multicolumn{15}{l}{STANDARD CARTRIDGE WITH SEAL ON I.D.} |
|---|---|---|---|---|---|---|---|---|---|---|---|---|---|---|
| 17 | 18 | 19 | 20 | 21 | 22 | 23 | 24 | 25 | 26 | 27 | 28 | 29 | 30 | 31 |
| Ds1=Ds AS A FUNCTION OF Do_MIN & DI_MIN | Ds1 AS A % OF Db | Ae(Ds_CALC, Do_MIN, DI_MAX) | Ds1=Ds AS A FUNCTION OF Do_MIN & DI_MAX | Ds1 AS A % OF Db | Ae(Ds_CALC, Do_MAX, DI_MIN) | Ds1=Ds AS A FUNCTION OF Do_MAX & DI_MIN | Ds1 AS A % OF Db | Ae(Ds_CALC, Do_MAX, DI_MAX) | Ds1=Ds AS A FUNCTION OF Do_MAX & DI_MAX | Ds1 AS A % OF Db CALC (ie % of Ds Col.6) | Ae(Ds=Db, DO_MIN, DI_MIN) % ASTD | Ae(Ds=Db, DO_MIN, DI_MAX) % ASTD | Ae(Ds=Db, DO_MAX, DI_MIN) % ASTD | Ae(Ds=Db, DO_MAX, DI_MAX) % ASTD |
| 1.64 | 0.930 | −0.01 | 1.76 | 0.998 | −0.01 | 1.76 | 0.998 | 0.35 | 4.15 | 1.070 | 0.27 | 0.01 | 0.01 | 0.29 |
| 1.71 | 0.930 | −0.01 | 1.83 | 0.998 | −0.01 | 1.83 | 0.998 | 0.38 | 1.96 | 1.070 | 0.27 | 0.01 | 0.01 | 0.29 |
| 1.77 | 0.930 | −0.01 | 1.90 | 0.998 | −0.01 | 1.90 | 0.998 | 0.41 | 2.04 | 1.070 | 0.27 | 0.01 | 0.01 | 0.29 |
| 1.84 | 0.930 | −0.02 | 1.97 | 0.998 | −0.02 | 1.97 | 0.998 | 0.44 | 2.11 | 1.070 | 0.27 | 0.01 | 0.01 | 0.29 |
| 1.90 | 0.930 | −0.02 | 2.04 | 0.998 | −0.02 | 2.04 | 0.998 | 0.48 | 2.19 | 1.070 | 0.27 | 0.01 | 0.01 | 0.29 |
| 1.97 | 0.930 | −0.02 | 2.11 | 0.998 | −0.02 | 2.11 | 0.998 | 0.51 | 2.27 | 1.070 | 0.27 | 0.01 | 0.01 | 0.29 |
| 2.03 | 0.930 | −0.02 | 2.18 | 0.998 | −0.02 | 2.18 | 0.998 | 0.54 | 2.34 | 1.070 | 0.27 | 0.01 | 0.01 | 0.29 |
| 2.10 | 0.930 | −0.02 | 2.25 | 0.998 | −0.02 | 2.25 | 0.998 | 0.58 | 2.42 | 1.070 | 0.27 | 0.01 | 0.01 | 0.29 |
| 2.17 | 0.930 | −0.02 | 2.32 | 0.998 | −0.02 | 2.32 | 0.998 | 0.62 | 2.49 | 1.070 | 0.27 | 0.01 | 0.01 | 0.29 |
| 2.23 | 0.930 | −0.02 | 2.39 | 0.998 | −0.02 | 2.39 | 0.998 | 0.66 | 2.57 | 1.070 | 0.27 | 0.01 | 0.01 | 0.29 |
| 2.30 | 0.930 | −0.02 | 2.46 | 0.998 | −0.02 | 2.46 | 0.998 | 0.69 | 2.64 | 1.070 | 0.27 | 0.01 | 0.01 | 0.29 |
| 2.36 | 0.930 | −0.02 | 2.53 | 0.998 | −0.02 | 2.53 | 0.998 | 0.73 | 2.72 | 1.070 | 0.27 | 0.01 | 0.01 | 0.29 |
| 2.43 | 0.930 | −0.03 | 2.60 | 0.998 | −0.03 | 2.60 | 0.998 | 0.78 | 2.79 | 1.070 | 0.27 | 0.01 | 0.01 | 0.29 |
| 2.49 | 0.930 | −0.03 | 2.67 | 0.998 | −0.03 | 2.67 | 0.998 | 0.82 | 2.87 | 1.070 | 0.27 | 0.01 | 0.01 | 0.29 |
| 2.56 | 0.930 | −0.03 | 2.75 | 0.998 | −0.03 | 2.75 | 0.998 | 0.86 | 2.94 | 1.070 | 0.27 | 0.01 | 0.01 | 0.29 |
| 2.63 | 0.930 | −0.03 | 2.82 | 0.998 | −0.03 | 2.82 | 0.998 | 0.91 | 3.02 | 1.070 | 0.27 | 0.01 | 0.01 | 0.29 |
| 2.69 | 0.930 | −0.03 | 2.89 | 0.998 | −0.03 | 2.86 | 0.998 | 0.95 | 3.10 | 1.070 | 0.27 | 0.01 | 0.01 | 0.29 |
| 2.76 | 0.930 | −0.03 | 2.96 | 0.998 | −0.03 | 2.96 | 0.998 | 1.00 | 3.17 | 1.070 | 0.27 | 0.01 | 0.01 | 0.29 |
| 2.82 | 0.930 | −0.04 | 3.03 | 0.998 | −0.04 | 3.03 | 0.998 | 1.05 | 3.25 | 1.070 | 0.27 | 0.01 | 0.01 | 0.29 |
| 2.89 | 0.930 | −0.04 | 3.10 | 0.998 | −0.04 | 3.10 | 0.998 | 1.10 | 3.32 | 1.070 | 0.27 | 0.01 | 0.01 | 0.29 |
| 2.95 | 0.930 | −0.04 | 3.17 | 0.998 | −0.04 | 3017 | 0.998 | 1.15 | 3.40 | 1.070 | 0.27 | 0.01 | 0.01 | 0.29 |
| 3.02 | 0.930 | −0.04 | 3.24 | 0.998 | −0.04 | 3.24 | 0.998 | 1.20 | 3.47 | 1.070 | 0.27 | 0.01 | 0.01 | 0.29 |
| 3.08 | 0.930 | −0.04 | 3.31 | 0.998 | −0.04 | 3.31 | 0.998 | 1.25 | 3.55 | 1.070 | 0.27 | 0.01 | 0.01 | 0.29 |
| 3.16 | 0.930 | −0.04 | 3.38 | 0.998 | −0.04 | 3.38 | 0.998 | 1.31 | 3.62 | 1.070 | 0.27 | 0.01 | 0.01 | 0.29 |
| 3.22 | 0.930 | −0.05 | 3.45 | 0.998 | −0.05 | 3.45 | 0.998 | 1.36 | 3.70 | 1.070 | 0.27 | 0.01 | 0.01 | 0.29 |
| 3.28 | 0.930 | −0.05 | 3.52 | 0.998 | −0.05 | 3.52 | 0.998 | 1.42 | 3.78 | 1.070 | 0.27 | 0.01 | 0.01 | 0.29 |
| 3.35 | 0.930 | −0.05 | 3.59 | 0.998 | −0.05 | 3.59 | 0.998 | 1.47 | 3.85 | 1.070 | 0.27 | 0.01 | 0.01 | 0.29 |
| 3.41 | 0.930 | −0.05 | 3.66 | 0.998 | −0.05 | 3.66 | 0.998 | 1.53 | 3.93 | 1.070 | 0.27 | 0.01 | 0.01 | 0.29 |
| 3.48 | 0.930 | −0.05 | 3.73 | 0.998 | −0.05 | 3.73 | 0.998 | 1.59 | 4.00 | 1.070 | 0.27 | 0.01 | 0.01 | 0.29 |
| 3.54 | 0.930 | −0.06 | 3.80 | 0.998 | −0.06 | 3.80 | 0.998 | 1.65 | 4.08 | 1.070 | 0.27 | 0.01 | 0.01 | 0.29 |
| 3.61 | 0.930 | −0.06 | 3.87 | 0.998 | −0.06 | 3.87 | 0.998 | 1.71 | 4.15 | 1.070 | 0.27 | 0.01 | 0.01 | 0.29 |

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| | | | | | | | | | | | | | | | GROUP 1 / 12% GAP / NEW DESIGN VS | |
| | Do | DI | PIT DEPTH | PIT CNT | GAP | Ds=Db (CALCULATED) | Do MIN | Do MIN AS A % OF Db | Do MAX | Do MAX AS A% OF Db | DI MIN | DI MIN AS A % OF Db | DI MAX | DI MAX AS A% OF Db | Astd(Ds=DI, Do, DI) SEAL ON I.D | Ae(Ds_CALC, Do_MIN, DI_MIN) |
| 1 | 2.5 | 1.25 | 0.63 | 20 | 12% | 1.76 | 2.20 | 1.25 | 2.80 | 1.59 | 1.10 | 0.62 | 1.40 | 0.79 | 1.22 | −0.55 |
| 2 | 2.6 | 1.3 | 0.65 | 20 | 12% | 1.83 | 2.29 | 1.25 | 2.91 | 1.59 | 1.14 | 0.62 | 1.46 | 0.79 | 1.32 | −0.60 |
| 3 | 2.7 | 1.35 | 0.68 | 20 | 12% | 1.91 | 2.38 | 1.25 | 3.02 | 1.59 | 1.19 | 0.62 | 1.51 | 0.79 | 1.42 | −0.64 |
| 4 | 2.8 | 1.4 | 0.7 | 20 | 12% | 1.98 | 2.46 | 1.25 | 3.14 | 1.59 | 1.23 | 0.62 | 1.57 | 0.79 | 1.53 | −0.69 |
| 5 | 2.9 | 1.45 | 0.73 | 20 | 12% | 2.05 | 2.55 | 1.25 | 3.25 | 1.59 | 1.28 | 0.62 | 1.62 | 0.79 | 1.64 | −0.74 |
| 6 | 3 | 1.5 | 0.75 | 20 | 12% | 2.12 | 2.64 | 1.25 | 3.36 | 1.59 | 1.32 | 0.62 | 1.68 | 0.79 | 1.75 | −0.79 |
| 7 | 3.1 | 1.55 | 0.78 | 20 | 12% | 2.19 | 2.73 | 1.25 | 3.47 | 1.59 | 1.36 | 0.62 | 1.74 | 0.79 | 1.87 | −0.85 |
| 8 | 3.2 | 1.6 | 0.8 | 20 | 12% | 2.26 | 2.82 | 1.25 | 3.58 | 1.59 | 1.41 | 0.62 | 1.79 | 0.79 | 1.99 | −0.90 |
| 9 | 3.3 | 1.65 | 0.83 | 20 | 12% | 2.33 | 2.90 | 1.25 | 3.70 | 1.59 | 1.45 | 0.62 | 1.85 | 0.79 | 2.12 | −0.96 |
| | 3.4 | 1.7 | 0.85 | 20 | 12% | 2.40 | 2.99 | 1.25 | 3.81 | 1.59 | 1.50 | 0.62 | 1.90 | 0.79 | 2.25 | −1.02 |
| | 3.5 | 1.75 | 0.88 | 20 | 12% | 2.47 | 3.08 | 1.25 | 3.92 | 1.59 | 1.54 | 0.62 | 1.96 | 0.79 | 2.39 | −1.08 |
| | 3.6 | 1.8 | 0.9 | 20 | 12% | 2.54 | 3.17 | 1.25 | 4.03 | 1.59 | 1.58 | 0.62 | 2.02 | 0.79 | 2.52 | −1.14 |
| | 3.7 | 1.85 | 0.93 | 20 | 12% | 2.61 | 3.26 | 1.25 | 4.14 | 1.59 | 1.63 | 0.62 | 2.07 | 0.79 | 2.67 | −1.21 |
| | 3.8 | 1.9 | 0.95 | 20 | 12% | 2.68 | 3.34 | 1.25 | 4.26 | 1.59 | 1.67 | 0.62 | 2.13 | 0.79 | 2.81 | −1.27 |
| | 3.9 | 1.95 | 0.98 | 20 | 12% | 2.75 | 3.43 | 1.25 | 4.37 | 1.59 | 1.72 | 0.62 | 2.18 | 0.79 | 2.96 | −1.34 |
| | 4 | 2 | 1 | 20 | 12% | 2.82 | 3.52 | 1.25 | 4.48 | 1.59 | 1.76 | 0.62 | 2.24 | 0.79 | 3.12 | −1.41 |
| | 4.1 | 2.05 | 1.03 | 20 | 12% | 2.89 | 3.61 | 1.25 | 4.59 | 1.59 | 1.80 | 0.62 | 2.30 | 0.79 | 3.27 | −1.48 |
| | 4.2 | 2.1 | 1.05 | 20 | 12% | 2.96 | 3.70 | 1.25 | 4.70 | 1.59 | 1.85 | 0.62 | 2.35 | 0.79 | 3.44 | −1.56 |
| | 4.3 | 2.15 | 1.08 | 20 | 12% | 3.03 | 3.78 | 1.25 | 4.82 | 1.59 | 1.89 | 0.62 | 2.41 | 0.79 | 3.60 | −1.63 |
| | 4.4 | 2.2 | 1.1 | 20 | 12% | 3.10 | 3.87 | 1.25 | 4.93 | 1.59 | 1.94 | 0.62 | 2.46 | 0.79 | 3.77 | −1.71 |
| | 1.5 | 2.25 | 1.13 | 20 | 12% | 3.18 | 3.96 | 1.25 | 5.04 | 1.59 | 1.98 | 0.62 | 2.52 | 0.79 | 3.94 | −1.79 |
| | 4.6 | 2.3 | 1.15 | 20 | 12% | 3.25 | 4.05 | 1.25 | 5.15 | 1.59 | 2.02 | 0.62 | 2.58 | 0.79 | 4.12 | −1.87 |
| | 4.7 | 2.35 | 1.18 | 20 | 12% | 3.32 | 4.14 | 1.25 | 5.26 | 1.59 | 2.07 | 0.62 | 2.63 | 0.79 | 4.30 | −1.95 |
| | 4.8 | 2.4 | 1.2 | 20 | 12% | 3.39 | 4.22 | 1.25 | 5.38 | 1.59 | 2.11 | 0.62 | 2.69 | 0.79 | 4.49 | −2.03 |
| | 4.9 | 2.45 | 1.23 | 20 | 12% | 3.46 | 4.31 | 1.25 | 5.49 | 1.59 | 2.16 | 0.62 | 2.74 | 0.79 | 4.68 | −2.12 |
| | 5 | 2.5 | 1.25 | 20 | 12% | 3.53 | 4.40 | 1.25 | 5.60 | 1.59 | 2.20 | 0.62 | 2.80 | 0.79 | 4.87 | −2.21 |
| | 5.1 | 2.55 | 1.28 | 20 | 12% | 3.60 | 4.49 | 1.25 | 5.71 | 1.59 | 2.24 | 0.62 | 2.86 | 0.79 | 5.07 | −2.29 |
| | 5.2 | 2.6 | 1.3 | 20 | 12% | 3.67 | 4.58 | 1.25 | 5.82 | 1.59 | 2.29 | 0.62 | 2.91 | 0.79 | 5.27 | −2.39 |
| | 5.3 | 2.65 | 1.33 | 20 | 12% | 3.74 | 4.66 | 1.25 | 5.94 | 1.59 | 2.33 | 0.62 | 2.97 | 0.79 | 5.47 | −2.48 |
| | 5.4 | 2.7 | 1.35 | 20 | 12% | 3.81 | 4.75 | 1.25 | 6.05 | 1.59 | 2.38 | 0.62 | 3.02 | 0.79 | 5.68 | −2.57 |
| | 5.5 | 2.75 | 1.38 | 20 | 12% | 3.88 | 4.84 | 1.25 | 6.16 | 1.59 | 2.42 | 0.62 | 3.08 | 0.79 | 5.89 | −2.67 |

FIG. 19B

| STANDARD CARTRIDGE WITH SEAL ON I.D. | | | | | | | | | | | | | | |
|---|---|---|---|---|---|---|---|---|---|---|---|---|---|---|
| 17 | 18 | 19 | 20 | 21 | 22 | 23 | 24 | 25 | 26 | 27 | 28 | 29 | 30 | 31 |
| $Ds1=Ds$ AS A FUNCTION OF $Do\_MIN$ & $Dl\_MIN$ | $Ds1$ AS A % OF $Db$ | $Ae(Ds\_CALC, Do\_MIN, Dl\_MAX)$ | $Ds1=Ds$ AS A FUNCTION OF $Do\_MIN$ & $Dl\_MAX$ | $Ds1$ AS A % OF $Db$ | $Ae(Ds\_CALC, Do\_MAX, Dl\_MIN)$ | $Ds1=Ds$ AS A FUNCTION OF $Do\_MAX$ & $Dl\_MIN$ | $Ds1$ AS A % OF $Db$ | $Ae(Ds\_CALC, Do\_MAX, Dl\_MAX)$ | $Ds1=Ds$ AS A FUNCTION OF $Do\_MAX$ & $Dl\_MAX$ | $Ds1$ AS A % OF $Db$ (ie % OF $Ds$ CALC Col.6) | $Ae(Ds=Db, DO\_MIN, Dl\_MIN)$ % ASTD | $Ae(Ds=Db, DO\_MIN, Dl\_MAX)$ % ASTD | $Ae(Ds=Db, DO\_MAX, Dl\_MIN)$ % ASTD | $Ae(Ds=Db, DO\_MAX, Dl\_MAX)$ % ASTD |
| 1.55 | 0.880 | −0.04 | 1.75 | 0.993 | −0.04 | 1.75 | 0.993 | 0.62 | 1.96 | 1.120 | 0.45 | 0.03 | 0.03 | 0.51 |
| 1.61 | 0.880 | −0.04 | 1.82 | 0.993 | −0.04 | 1.82 | 0.993 | 0.67 | 2.05 | 1.120 | 0.45 | 0.03 | 0.03 | 0.51 |
| 1.68 | 0.880 | −0.04 | 1.89 | 0.993 | −0.04 | 1.89 | 0.993 | 0.73 | 2.13 | 1.120 | 0.45 | 0.03 | 0.03 | 0.51 |
| 1.74 | 0.880 | −0.04 | 1.96 | 0.993 | −0.04 | 1.96 | 0.993 | 0.78 | 2.21 | 1.120 | 0.45 | 0.03 | 0.03 | 0.51 |
| 1.80 | 0.880 | −0.05 | 2.03 | 0.993 | −0.05 | 2.03 | 0.993 | 0.84 | 2.29 | 1.120 | 0.45 | 0.03 | 0.03 | 0.51 |
| 1.86 | 0.880 | −0.05 | 2.10 | 0.993 | −0.05 | 2.10 | 0.993 | 0.90 | 2.37 | 1.120 | 0.45 | 0.03 | 0.03 | 0.51 |
| 1.93 | 0.880 | −0.05 | 2.17 | 0.993 | −0.05 | 2.17 | 0.993 | 0.96 | 2.45 | 1.120 | 0.45 | 0.03 | 0.03 | 0.51 |
| 1.99 | 0.880 | −0.06 | 2.24 | 0.993 | −0.06 | 2.24 | 0.993 | 1.02 | 2.53 | 1.120 | 0.45 | 0.03 | 0.03 | 0.51 |
| 2.05 | 0.880 | −0.06 | 2.31 | 0.993 | −0.06 | 2.31 | 0.993 | 1.08 | 2.61 | 1.120 | 0.45 | 0.03 | 0.03 | 0.51 |
| 2.11 | 0.880 | −0.07 | 2.38 | 0.993 | −0.07 | 2.38 | 0.993 | 1.15 | 2.69 | 1.120 | 0.45 | 0.03 | 0.03 | 0.51 |
| 2.17 | 0.880 | −0.07 | 2.45 | 0.993 | −0.07 | 2.45 | 0.993 | 1.22 | 2.77 | 1.120 | 0.45 | 0.03 | 0.03 | 0.51 |
| 2.24 | 0.880 | −0.07 | 2.52 | 0.993 | −0.07 | 2.52 | 0.993 | 1.29 | 2.85 | 1.120 | 0.45 | 0.03 | 0.03 | 0.51 |
| 2.30 | 0.880 | −0.08 | 2.59 | 0.993 | −0.08 | 2.59 | 0.993 | 1.36 | 2.92 | 1.120 | 0.45 | 0.03 | 0.03 | 0.51 |
| 2.36 | 0.880 | −0.08 | 2.66 | 0.993 | −0.08 | 2.66 | 0.993 | 1.44 | 3.00 | 1.120 | 0.45 | 0.03 | 0.03 | 0.51 |
| 2.42 | 0.880 | −0.09 | 2.73 | 0.993 | −0.09 | 2.73 | 0.993 | 1.51 | 3.08 | 1.120 | 0.45 | 0.03 | 0.03 | 0.51 |
| 2.48 | 0.880 | −0.09 | 2.80 | 0.993 | −0.09 | 2.80 | 0.993 | 1.59 | 3.16 | 1.120 | 0.45 | 0.03 | 0.03 | 0.51 |
| 2.55 | 0.880 | −0.09 | 2.87 | 0.993 | −0.09 | 2.87 | 0.993 | 1.67 | 3.24 | 1.120 | 0.45 | 0.03 | 0.03 | 0.51 |
| 2.61 | 0.880 | −0.10 | 2.94 | 0.993 | −0.10 | 2.94 | 0.993 | 1.76 | 3.32 | 1.120 | 0.45 | 0.03 | 0.03 | 0.51 |
| 2.67 | 0.880 | −0.10 | 3.01 | 0.993 | −0.10 | 3.01 | 0.993 | 1.84 | 3.40 | 1.120 | 0.45 | 0.03 | 0.03 | 0.51 |
| 2.73 | 0.880 | −0.11 | 3.08 | 0.993 | −0.11 | 3.08 | 0.993 | 1.93 | 3.48 | 1.120 | 0.45 | 0.03 | 0.03 | 0.51 |
| 2.79 | 0.880 | −0.11 | 3.15 | 0.993 | −0.11 | 3.15 | 0.993 | 2.01 | 3.56 | 1.120 | 0.45 | 0.03 | 0.03 | 0.51 |
| 2.86 | 0.880 | −0.12 | 3.22 | 0.993 | −0.12 | 3.22 | 0.993 | 2.11 | 3.64 | 1.120 | 0.45 | 0.03 | 0.03 | 0.51 |
| 2.92 | 0.880 | −0.12 | 3.29 | 0.993 | −0.12 | 3.29 | 0.993 | 2.20 | 3.71 | 1.120 | 0.45 | 0.03 | 0.03 | 0.51 |
| 2.98 | 0.880 | −0.13 | 3.36 | 0.993 | −0.13 | 3.36 | 0.993 | 2.29 | 3.79 | 1.120 | 0.45 | 0.03 | 0.03 | 0.51 |
| 3.04 | 0.880 | −0.14 | 3.43 | 0.993 | −0.14 | 3.43 | 0.993 | 2.39 | 3.87 | 1.120 | 0.45 | 0.03 | 0.03 | 0.51 |
| 3.10 | 0.880 | −0.14 | 3.50 | 0.993 | −0.14 | 3.50 | 0.993 | 2.49 | 3.95 | 1.120 | 0.45 | 0.03 | 0.03 | 0.51 |
| 3.17 | 0.880 | −0.15 | 3.57 | 0.993 | −0.15 | 3.57 | 0.993 | 2.59 | 4.03 | 1.120 | 0.45 | 0.03 | 0.03 | 0.51 |
| 3.23 | 0.880 | −0.15 | 3.64 | 0.993 | −0.15 | 3.64 | 0.993 | 2.69 | 4.11 | 1.120 | 0.45 | 0.03 | 0.03 | 0.51 |
| 3.29 | 0.880 | −0.16 | 3.71 | 0.993 | −0.16 | 3.71 | 0.993 | 2.79 | 4.19 | 1.120 | 0.45 | 0.03 | 0.03 | 0.51 |
| 3.35 | 0.880 | −0.16 | 3.78 | 0.993 | −0.16 | 3.78 | 0.993 | 2.90 | 4.27 | 1.120 | 0.45 | 0.03 | 0.03 | 0.51 |
| 3.42 | 0.880 | −0.17 | 3.85 | 0.993 | −0.17 | 3.85 | 0.993 | 3.01 | 4.35 | 1.120 | 0.45 | 0.03 | 0.03 | 0.51 |

GROUP 1 / 22% GAP / NEW DESIGN VS STANDARD CARTRIDGE WITH SEAL ON I.D.

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| | Do | Di | PIT DEPTH | PIT CNT | GAP | Ds=Db (CALCULATED) | Do MIN | Do MIN AS A % OF Db | Do MAX | Do MAX AS A% OF Db | Di MIN | Di MIN AS A % OF Db | Di MAX | Di MAX AS A% OF Db | Astd(Ds=Di, Do, Di) SEAL ON I.D | Ae(Ds_CALC, Do_MIN, DL_MIN) | Ds1=Ds AS A FUNCTION OF Do_MIN & DL_MIN | Ds1 AS A % OF Db | Ae(Ds_CALC, Do_MIN, DL_MAX) | Ds1=Ds AS A FUNCTION OF Do_MIN & DL_MAX | Ds1 AS A % OF Db | Ae(Ds_CALC, Do_MAX, DL_MIN) | Ds1=Ds AS A FUNCTION OF Do_MAX & DL_MIN | Ds1 AS A % OF Db | Ae(Ds_CALC, Do_MAX, DL_MAX) | Ds1=Ds AS A FUNCTION OF Do_MAX & DL_MAX | Ds1 AS A % OF Db (ie % OF Db Col.6) | Ae(Ds=Db, Do_MIN, DL_MIN) %STD | Ae(Ds=Db, Do_MIN, DL_MAX) %STD | Ae(Ds=Db, Do_MAX, DL_MIN) %STD | Ae(Ds=Db, Do_MAX, DL_MAX) %STD |
| 1 | 2.5 | 1.25 | 0.63 | 20 | 22% | 1.76 | 1.95 | 1.11 | 3.05 | 1.73 | 0.98 | 0.55 | 1.53 | 0.66 | 1.22 | -.096 | 1.38 | 0.780 | -0.121 | 1.72 | 0.975 | -0.121 | 1.72 | 0.975 | 1.19 | 2.15 | 1.220 | 0.79 | 0.10 | 0.10 | 0.98 |
| 2 | 2.6 | 1.3 | 0.65 | 20 | 22% | 1.83 | 2.03 | 1.11 | 3.17 | 1.73 | 1.01 | 0.55 | 1.59 | 0.66 | 1.32 | -1.04 | 1.43 | 0.780 | -0.131 | 1.79 | 0.975 | -0.131 | 1.79 | 0.975 | 1.29 | 2.24 | 1.220 | 0.79 | 0.10 | 0.10 | 0.98 |
| 3 | 2.7 | 1.35 | 0.68 | 20 | 22% | 1.91 | 2.11 | 1.11 | 3.29 | 1.73 | 1.05 | 0.55 | 1.65 | 0.66 | 1.42 | -1.12 | 1.49 | 0.780 | -0.141 | 1.86 | 0.975 | -0.141 | 1.86 | 0.975 | 1.39 | 2.32 | 1.220 | 0.79 | 0.10 | 0.10 | 0.98 |
| 4 | 2.8 | 1.4 | 0.7 | 20 | 22% | 1.98 | 2.18 | 1.11 | 3.42 | 1.73 | 1.09 | 0.55 | 1.71 | 0.66 | 1.53 | -1.20 | 1.54 | 0.780 | -0.151 | 1.93 | 0.975 | -0.151 | 1.93 | 0.975 | 1.50 | 2.41 | 1.220 | 0.79 | 0.10 | 0.10 | 0.98 |
| 5 | 2.9 | 1.45 | 0.73 | 20 | 22% | 2.05 | 2.26 | 1.11 | 3.54 | 1.73 | 1.13 | 0.55 | 1.77 | 0.66 | 1.64 | -1.29 | 1.60 | 0.780 | -0.162 | 2.00 | 0.975 | -0.162 | 2.00 | 0.975 | 1.61 | 2.50 | 1.220 | 0.79 | 0.10 | 0.10 | 0.98 |
| 6 | 3 | 1.5 | 0.75 | 20 | 22% | 2.12 | 2.34 | 1.11 | 3.66 | 1.73 | 1.17 | 0.55 | 1.83 | 0.66 | 1.75 | -1.38 | 1.65 | 0.780 | -0.172 | 2.07 | 0.975 | -0.172 | 2.07 | 0.975 | 1.72 | 2.58 | 1.220 | 0.79 | 0.10 | 0.10 | 0.98 |
| 7 | 3.1 | 1.55 | 0.78 | 20 | 22% | 2.19 | 2.42 | 1.11 | 3.78 | 1.73 | 1.21 | 0.55 | 1.89 | 0.66 | 1.87 | -1.47 | 1.71 | 0.780 | -0.182 | 2.13 | 0.975 | -0.182 | 2.13 | 0.975 | 1.84 | 2.67 | 1.220 | 0.79 | 0.10 | 0.10 | 0.98 |
| 8 | 3.2 | 1.6 | 0.8 | 20 | 22% | 2.26 | 2.50 | 1.11 | 3.90 | 1.73 | 1.25 | 0.55 | 1.95 | 0.66 | 1.99 | -1.57 | 1.76 | 0.780 | -0.192 | 2.20 | 0.975 | -0.192 | 2.20 | 0.975 | 1.96 | 2.75 | 1.220 | 0.79 | 0.10 | 0.10 | 0.98 |
| 9 | 3.3 | 1.65 | 0.83 | 20 | 22% | 2.33 | 2.57 | 1.11 | 4.03 | 1.73 | 1.29 | 0.55 | 2.01 | 0.66 | 2.12 | -1.67 | 1.82 | 0.780 | -0.212 | 2.27 | 0.975 | -0.212 | 2.27 | 0.975 | 2.08 | 2.84 | 1.220 | 0.79 | 0.10 | 0.10 | 0.98 |
| 10 | 3.4 | 1.7 | 0.85 | 20 | 22% | 2.40 | 2.65 | 1.11 | 4.15 | 1.73 | 1.33 | 0.55 | 2.07 | 0.66 | 2.25 | -1.77 | 1.87 | 0.780 | -0.222 | 2.34 | 0.975 | -0.222 | 2.34 | 0.975 | 2.21 | 2.93 | 1.220 | 0.79 | 0.10 | 0.10 | 0.98 |
| 11 | 3.5 | 1.75 | 0.88 | 20 | 22% | 2.47 | 2.73 | 1.11 | 4.27 | 1.73 | 1.37 | 0.55 | 2.14 | 0.66 | 2.39 | -1.88 | 1.93 | 0.780 | -0.232 | 2.41 | 0.975 | -0.232 | 2.41 | 0.975 | 2.34 | 3.01 | 1.220 | 0.79 | 0.10 | 0.10 | 0.98 |
| 12 | 3.6 | 1.8 | 0.9 | 20 | 22% | 2.54 | 2.81 | 1.11 | 4.39 | 1.73 | 1.40 | 0.55 | 2.20 | 0.66 | 2.52 | -1.98 | 1.98 | 0.780 | -0.252 | 2.48 | 0.975 | -0.252 | 2.48 | 0.975 | 2.48 | 3.10 | 1.220 | 0.79 | 0.10 | 0.10 | 0.98 |
| 13 | 3.7 | 1.85 | 0.93 | 20 | 22% | 2.61 | 2.89 | 1.11 | 4.51 | 1.73 | 1.44 | 0.55 | 2.26 | 0.66 | 2.67 | -2.10 | 2.04 | 0.780 | -0.262 | 2.55 | 0.975 | -0.262 | 2.55 | 0.975 | 2.61 | 3.19 | 1.220 | 0.79 | 0.10 | 0.10 | 0.98 |
| 14 | 3.8 | 1.9 | 0.95 | 20 | 22% | 2.68 | 2.96 | 1.11 | 4.64 | 1.73 | 1.48 | 0.55 | 2.32 | 0.66 | 2.81 | -2.21 | 2.09 | 0.780 | -0.272 | 2.62 | 0.975 | -0.272 | 2.62 | 0.975 | 2.76 | 3.27 | 1.220 | 0.79 | 0.10 | 0.10 | 0.98 |
| 15 | 3.9 | 1.95 | 0.98 | 20 | 22% | 2.75 | 3.04 | 1.11 | 4.76 | 1.73 | 1.52 | 0.55 | 2.38 | 0.66 | 2.96 | -2.33 | 2.15 | 0.780 | -0.292 | 2.68 | 0.975 | -0.292 | 2.68 | 0.975 | 2.91 | 3.36 | 1.220 | 0.79 | 0.10 | 0.10 | 0.98 |
| 16 | 4 | 2 | 1 | 20 | 22% | 2.82 | 3.12 | 1.11 | 4.88 | 1.73 | 1.56 | 0.55 | 2.44 | 0.66 | 3.12 | -2.45 | 2.20 | 0.780 | -0.302 | 2.75 | 0.975 | -0.302 | 2.75 | 0.975 | 3.06 | 3.44 | 1.220 | 0.79 | 0.10 | 0.10 | 0.98 |
| 17 | 4.1 | 2.05 | 1.03 | 20 | 22% | 2.89 | 3.20 | 1.11 | 5.00 | 1.73 | 1.60 | 0.55 | 2.50 | 0.66 | 3.27 | -2.57 | 2.26 | 0.780 | -0.322 | 2.82 | 0.975 | -0.322 | 2.82 | 0.975 | 3.21 | 3.53 | 1.220 | 0.79 | 0.10 | 0.10 | 0.98 |
| 18 | 4.2 | 2.1 | 1.05 | 20 | 22% | 2.98 | 3.28 | 1.11 | 5.12 | 1.73 | 1.64 | 0.55 | 2.56 | 0.66 | 3.44 | -2.70 | 2.31 | 0.780 | -0.332 | 2.89 | 0.975 | -0.332 | 2.89 | 0.975 | 3.37 | 3.62 | 1.220 | 0.79 | 0.10 | 0.10 | 0.98 |
| 19 | 4.3 | 2.15 | 1.08 | 20 | 22% | 3.03 | 3.35 | 1.11 | 5.25 | 1.73 | 1.68 | 0.55 | 2.62 | 0.66 | 3.60 | -2.83 | 2.37 | 0.780 | -0.352 | 2.96 | 0.975 | -1.35 | 2.96 | 0.975 | 3.53 | 3.70 | 1.220 | 0.79 | 0.10 | 0.10 | 0.98 |
| 20 | 4.4 | 2.2 | 1.1 | 20 | 22% | 3.10 | 3.43 | 1.11 | 5.37 | 1.73 | 1.72 | 0.55 | 2.68 | 0.66 | 3.77 | -2.96 | 2.42 | 0.780 | -0.373 | 3.03 | 0.975 | -0.373 | 3.03 | 0.975 | 3.70 | 3.79 | 1.220 | 0.79 | 0.10 | 0.10 | 0.98 |
| 21 | 1.5 | 2.25 | 1.13 | 20 | 22% | 3.18 | 3.51 | 1.11 | 5.49 | 1.73 | 1.76 | 0.55 | 2.75 | 0.66 | 3.94 | -3.10 | 2.48 | 0.780 | -0.383 | 3.10 | 0.975 | -0.383 | 3.10 | 0.975 | 3.87 | 3.87 | 1.220 | 0.79 | 0.10 | 0.10 | 0.98 |
| 22 | 4.6 | 2.3 | 1.15 | 20 | 22% | 3.25 | 3.59 | 1.11 | 5.61 | 1.73 | 1.79 | 0.55 | 2.81 | 0.66 | 4.12 | -3.24 | 2.53 | 0.780 | -0.403 | 3.17 | 0.975 | -0.403 | 3.17 | 0.975 | 4.04 | 3.96 | 1.220 | 0.79 | 0.10 | 0.10 | 0.98 |
| 23 | 4.7 | 2.35 | 1.18 | 20 | 22% | 3.32 | 3.67 | 1.11 | 5.73 | 1.73 | 1.83 | 0.55 | 2.87 | 0.66 | 4.30 | -3.38 | 2.59 | 0.780 | -0.423 | 3.24 | 0.975 | -0.423 | 3.24 | 0.975 | 4.22 | 4.05 | 1.220 | 0.79 | 0.10 | 0.10 | 0.98 |
| 24 | 4.8 | 2.4 | 1.2 | 20 | 22% | 3.39 | 3.74 | 1.11 | 5.86 | 1.73 | 1.87 | 0.55 | 2.93 | 0.66 | 4.49 | -3.53 | 2.64 | 0.780 | -0.443 | 3.30 | 0.975 | -0.443 | 3.30 | 0.975 | 4.40 | 4.13 | 1.220 | 0.79 | 0.10 | 0.10 | 0.98 |
| 25 | 4.9 | 2.45 | 1.23 | 20 | 22% | 3.46 | 3.82 | 1.11 | 5.96 | 1.73 | 1.91 | 0.55 | 2.99 | 0.66 | 4.68 | -3.68 | 2.70 | 0.780 | -0.453 | 3.37 | 0.975 | -0.453 | 3.37 | 0.975 | 4.59 | 4.22 | 1.220 | 0.79 | 0.10 | 0.10 | 0.98 |
| 26 | 5 | 2.5 | 1.25 | 20 | 22% | 3.53 | 3.90 | 1.11 | 6.10 | 1.73 | 1.95 | 0.55 | 3.05 | 0.66 | 4.87 | -3.83 | 2.75 | 0.780 | -0.473 | 3.44 | 0.975 | -0.473 | 3.44 | 0.975 | 4.78 | 4.30 | 1.220 | 0.79 | 0.10 | 0.10 | 0.98 |
| 27 | 5.1 | 2.55 | 1.28 | 20 | 22% | 3.60 | 3.98 | 1.11 | 6.22 | 1.73 | 1.99 | 0.55 | 3.11 | 0.66 | 5.07 | -3.98 | 2.81 | 0.780 | -0.493 | 3.51 | 0.975 | -0.493 | 3.51 | 0.975 | 4.97 | 4.39 | 1.220 | 0.79 | 0.10 | 0.10 | 0.98 |
| 28 | 5.2 | 2.6 | 1.3 | 20 | 22% | 3.67 | 4.06 | 1.11 | 6.34 | 1.73 | 2.03 | 0.55 | 3.17 | 0.66 | 5.27 | -4.14 | 2.86 | 0.780 | -0.513 | 3.58 | 0.975 | -0.513 | 3.58 | 0.975 | 5.16 | 4.48 | 1.220 | 0.79 | 0.10 | 0.10 | 0.98 |
| 29 | 5.3 | 2.65 | 1.33 | 20 | 22% | 3.74 | 4.13 | 1.11 | 6.47 | 1.73 | 2.07 | 0.55 | 3.23 | 0.66 | 5.47 | -4.30 | 2.92 | 0.780 | -0.533 | 3.65 | 0.975 | -0.533 | 3.65 | 0.975 | 5.37 | 4.56 | 1.220 | 0.79 | 0.10 | 0.10 | 0.98 |
| 30 | 5.4 | 2.7 | 1.35 | 20 | 22% | 3.81 | 4.21 | 1.11 | 6.59 | 1.73 | 2.11 | 0.55 | 3.29 | 0.66 | 5.68 | -4.47 | 2.97 | 0.780 | -0.553 | 3.72 | 0.975 | -0.553 | 3.72 | 0.975 | 5.57 | 4.65 | 1.220 | 0.79 | 0.10 | 0.10 | 0.98 |
| 31 | 5.5 | 2.75 | 1.38 | 20 | 22% | 3.88 | 4.29 | 1.11 | 6.71 | 1.73 | 2.15 | 0.55 | 3.36 | 0.66 | 5.89 | -4.63 | 3.03 | 0.780 | -0.573 | 3.79 | 0.975 | -0.573 | 3.79 | 0.975 | 5.78 | 4.73 | 1.220 | 0.79 | 0.10 | 0.10 | 0.98 |

FIG. 20A

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| | | | | | | | | | | | | | | | GROUP 1 / 22% GAP / NEW DESIGN VS | |
| | Do | DI | PIT DEPTH | PIT CNT | GAP | Ds=Db (CALCULATED) | Do MIN | Do MIN AS A % OF Db | Do MAX | Do MAX AS A% OF Db | DI MIN | DI MIN AS A % OF Db | DI MAX | DI MAX AS A% OF Db | Astd(Ds=DI, Do, DI) SEAL ON I.D | Ae(Ds_CALC, Do_MIN, DI_MIN) |
| 1 | 2.5 | 1.25 | 0.63 | 20 | 22% | 1.76 | 1.95 | 1.11 | 3.05 | 1.73 | 0.98 | 0.55 | 1.53 | 0.66 | 1.22 | −096 |
| 2 | 2.6 | 1.3 | 0.65 | 20 | 22% | 1.83 | 2.03 | 1.11 | 3.17 | 1.73 | 1.01 | 0.55 | 1.59 | 0.66 | 1.32 | −1.04 |
| 3 | 2.7 | 1.35 | 0.68 | 20 | 22% | 1.91 | 2.11 | 1.11 | 3.29 | 1.73 | 1.05 | 0.55 | 1.65 | 0.66 | 1.42 | −1.12 |
| 4 | 2.8 | 1.4 | 0.7 | 20 | 22% | 1.98 | 2.18 | 1.11 | 3.42 | 1.73 | 1.09 | 0.55 | 1.71 | 0.66 | 1.53 | −1.20 |
| 5 | 2.9 | 1.45 | 0.73 | 20 | 22% | 2.05 | 2.26 | 1.11 | 3.54 | 1.73 | 1.13 | 0.55 | 1.77 | 0.66 | 1.64 | −1.29 |
| 6 | 3 | 1.5 | 0.75 | 20 | 22% | 2.12 | 2.34 | 1.11 | 3.66 | 1.73 | 1.17 | 0.55 | 1.83 | 0.66 | 1.75 | −1.38 |
| 7 | 3.1 | 1.55 | 0.78 | 20 | 22% | 2.19 | 2.42 | 1.11 | 3.78 | 1.73 | 1.21 | 0.55 | 1.89 | 0.66 | 1.87 | −1.47 |
| 8 | 3.2 | 1.6 | 0.8 | 20 | 22% | 2.26 | 2.50 | 1.11 | 3.90 | 1.73 | 1.25 | 0.55 | 1.95 | 0.66 | 1.99 | −1.57 |
| 9 | 3.3 | 1.65 | 0.83 | 20 | 22% | 2.33 | 2.57 | 1.11 | 4.03 | 1.73 | 1.29 | 0.55 | 2.01 | 0.66 | 2.12 | −1.67 |
| 10 | 3.4 | 1.7 | 0.85 | 20 | 22% | 2.40 | 2.65 | 1.11 | 4.15 | 1.73 | 1.33 | 0.55 | 2.07 | 0.66 | 2.25 | −1.77 |
| 11 | 3.5 | 1.75 | 0.88 | 20 | 22% | 2.47 | 2.73 | 1.11 | 4.27 | 1.73 | 1.37 | 0.55 | 2.14 | 0.66 | 2.39 | −1.88 |
| 12 | 3.6 | 1.8 | 0.9 | 20 | 22% | 2.54 | 2.81 | 1.11 | 4.39 | 1.73 | 1.40 | 0.55 | 2.20 | 0.66 | 2.52 | −1.98 |
| 13 | 3.7 | 1.85 | 0.93 | 20 | 22% | 2.61 | 2.89 | 1.11 | 4.51 | 1.73 | 1.44 | 0.55 | 2.26 | 0.66 | 2.67 | −2.10 |
| 14 | 3.8 | 1.9 | 0.95 | 20 | 22% | 2.68 | 2.96 | 1.11 | 4.64 | 1.73 | 1.48 | 0.55 | 2.32 | 0.66 | 2.81 | −2.21 |
| 15 | 3.9 | 1.95 | 0.98 | 20 | 22% | 2.75 | 3.04 | 1.11 | 4.76 | 1.73 | 1.52 | 0.55 | 2.38 | 0.66 | 2.96 | −2.33 |
| 16 | 4 | 2 | 1 | 20 | 22% | 2.82 | 3.12 | 1.11 | 4.88 | 1.73 | 1.56 | 0.55 | 2.44 | 0.66 | 3.12 | −2.45 |
| 17 | 4.1 | 2.05 | 1.03 | 20 | 22% | 2.89 | 3.20 | 1.11 | 5.00 | 1.73 | 1.60 | 0.55 | 2.50 | 0.66 | 3.27 | −2.57 |
| 18 | 4.2 | 2.1 | 1.05 | 20 | 22% | 2.98 | 3.28 | 1.11 | 5.12 | 1.73 | 1.64 | 0.55 | 2.56 | 0.66 | 3.44 | −2.70 |
| 19 | 4.3 | 2.15 | 1.08 | 20 | 22% | 3.03 | 3.35 | 1.11 | 5.25 | 1.73 | 1.68 | 0.55 | 2.62 | 0.66 | 3.60 | −2.83 |
| 20 | 4.4 | 2.2 | 1.1 | 20 | 22% | 3.10 | 3.43 | 1.11 | 5.37 | 1.73 | 1.72 | 0.55 | 2.68 | 0.66 | 3.77 | −2.96 |
| 21 | 1.5 | 2.25 | 1.13 | 20 | 22% | 3.18 | 3.51 | 1.11 | 5.49 | 1.73 | 1.76 | 0.55 | 2.75 | 0.66 | 3.94 | −3.10 |
| 22 | 4.6 | 2.3 | 1.15 | 20 | 22% | 3.25 | 3.59 | 1.11 | 5.61 | 1.73 | 1.79 | 0.55 | 2.81 | 0.66 | 4.12 | −3.24 |
| 23 | 4.7 | 2.35 | 1.18 | 20 | 22% | 3.32 | 3.67 | 1.11 | 5.73 | 1.73 | 1.83 | 0.55 | 2.87 | 0.66 | 4.30 | −3.38 |
| 24 | 4.8 | 2.4 | 1.2 | 20 | 22% | 3.39 | 3.74 | 1.11 | 5.86 | 1.73 | 1.87 | 0.55 | 2.93 | 0.66 | 4.49 | −3.53 |
| 25 | 4.9 | 2.45 | 1.23 | 20 | 22% | 3.46 | 3.82 | 1.11 | 5.96 | 1.73 | 1.91 | 0.55 | 2.99 | 0.66 | 4.68 | −3.68 |
| 26 | 5 | 2.5 | 1.25 | 20 | 22% | 3.53 | 3.90 | 1.11 | 6.10 | 1.73 | 1.95 | 0.55 | 3.05 | 0.66 | 4.87 | −3.83 |
| 27 | 5.1 | 2.55 | 1.28 | 20 | 22% | 3.60 | 3.98 | 1.11 | 6.22 | 1.73 | 1.99 | 0.55 | 3.11 | 0.66 | 5.07 | −3.98 |
| 28 | 5.2 | 2.6 | 1.3 | 20 | 22% | 3.67 | 4.06 | 1.11 | 6.34 | 1.73 | 2.03 | 0.55 | 3.17 | 0.66 | 5.27 | −4.14 |
| 29 | 5.3 | 2.65 | 1.33 | 20 | 22% | 3.74 | 4.13 | 1.11 | 6.47 | 1.73 | 2.07 | 0.55 | 3.23 | 0.66 | 5.47 | −4.30 |
| 30 | 5.4 | 2.7 | 1.35 | 20 | 22% | 3.81 | 4.21 | 1.11 | 6.59 | 1.73 | 2.11 | 0.55 | 3.29 | 0.66 | 5.68 | −4.47 |
| 31 | 5.5 | 2.75 | 1.38 | 20 | 22% | 3.88 | 4.29 | 1.11 | 6.71 | 1.73 | 2.15 | 0.55 | 3.36 | 0.66 | 5.89 | −4.63 |

FIG. 20B

| STANDARD CARTIRDGE WITH SEAL ON I.D. | | | | | | | | | | | | | | |
|---|---|---|---|---|---|---|---|---|---|---|---|---|---|---|
| 17 | 18 | 19 | 20 | 21 | 22 | 23 | 24 | 25 | 26 | 27 | 28 | 29 | 30 | 31 |
| $Ds1=Ds$ AS A FUNCTION OF $Do\_MIN$ & $Dl\_MIN$ | $Ds1$ AS A % OF $Db$ | $Ae(Ds\_CALC, Do\_MIN, Dl\_MAX)$ | $Ds1=Ds$ AS A FUNTION OF $Do\_MIN$ & $Dl\_MAX$ | $Ds1$ AS A % OF $Db$ | $Ae(Ds\_CALC, Do\_MAX, Dl\_MIN)$ | $Ds1=Ds$ AS A FUNTION OF $Do\_MAX$ & $Dl\_MIN$ | $Ds1$ AS A % OF $Db$ | $Ae(Ds\_CALC, Do\_MAX, Dl\_MAX)$ | $Ds1=Ds$ AS A FUNCTION OF $Do\_MAX$ & $Dl\_MAX$ | $Ds1$ AS A % OF $Db$ $Ds$ CALC (ie % of $Db$ Col.6) | $Ae(Ds=Db, DO\_MIN, Dl\_MIN)$ % ASTD | $Ae(Ds=Db, DO\_MIN, Dl\_MAX)$ % ASTD | $Ae(Ds=Db, DO\_MAX, Dl\_MIN)$ % ASTD | $Ae(Ds=Db, DO\_MAX, Dl\_MAX)$ % ASTD |
| 1.38 | 0.780 | −0.12 | 1.72 | 0.975 | −0.12 | 1.72 | 0.975 | 1.19 | 2.15 | 1.220 | 0.79 | 0.10 | 0.10 | 0.98 |
| 1.43 | 0.780 | −0.13 | 1.79 | 0.975 | −0.13 | 1.79 | 0.975 | 1.29 | 2.24 | 1.220 | 0.79 | 0.10 | 0.10 | 0.98 |
| 1.49 | 0.780 | −0.14 | 1.86 | 0.975 | −0.14 | 1.86 | 0.975 | 1.39 | 2.32 | 1.220 | 0.79 | 0.10 | 0.10 | 0.98 |
| 1.54 | 0.780 | −0.15 | 1.93 | 0.975 | −0.15 | 1.93 | 0.975 | 1.50 | 2.41 | 1.220 | 0.79 | 0.10 | 0.10 | 0.98 |
| 1.60 | 0.780 | −0.16 | 2.00 | 0.975 | −0.16 | 2.00 | 0.975 | 1.61 | 2.50 | 1.220 | 0.79 | 0.10 | 0.10 | 0.98 |
| 1.65 | 0.780 | −0.17 | 2.07 | 0.975 | −0.17 | 2.07 | 0.975 | 1.72 | 2.58 | 1.220 | 0.79 | 0.10 | 0.10 | 0.98 |
| 1.71 | 0.780 | −0.18 | 2.13 | 0.975 | −0.18 | 2.13 | 0.975 | 1.84 | 2.67 | 1.220 | 0.79 | 0.10 | 0.10 | 0.98 |
| 1.76 | 0.780 | −0.19 | 2.20 | 0.975 | −0.19 | 2.20 | 0.975 | 1.96 | 2.75 | 1.220 | 0.79 | 0.10 | 0.10 | 0.98 |
| 1.82 | 0.780 | −0.21 | 2.27 | 0.975 | −0.21 | 2.27 | 0.975 | 2.08 | 2.84 | 1.220 | 0.79 | 0.10 | 0.10 | 0.98 |
| 1.87 | 0.780 | −0.22 | 2.34 | 0.975 | −0.22 | 2.34 | 0.975 | 2.21 | 2.93 | 1.220 | 0.79 | 0.10 | 0.10 | 0.98 |
| 1.93 | 0.780 | −0.23 | 2.41 | 0.975 | −0.23 | 2.41 | 0.975 | 2.34 | 3.01 | 1.220 | 0.79 | 0.10 | 0.10 | 0.98 |
| 1.98 | 0.780 | −0.25 | 2.48 | 0.975 | −0.25 | 2.48 | 0.975 | 2.48 | 3.10 | 1.220 | 0.79 | 0.10 | 0.10 | 0.98 |
| 2.04 | 0.780 | −0.26 | 2.55 | 0.975 | −0.26 | 2.55 | 0.975 | 2.61 | 3.19 | 1.220 | 0.79 | 0.10 | 0.10 | 0.98 |
| 2.09 | 0.780 | −0.27 | 2.62 | 0.975 | −0.27 | 2.62 | 0.975 | 2.76 | 3.27 | 1.220 | 0.79 | 0.10 | 0.10 | 0.98 |
| 2.15 | 0.780 | −0.29 | 2.68 | 0.975 | −0.29 | 2.68 | 0.975 | 2.91 | 3.36 | 1.220 | 0.79 | 0.10 | 0.10 | 0.98 |
| 2.20 | 0.780 | −0.30 | 2.75 | 0.975 | −0.30 | 2.75 | 0.975 | 3.06 | 3.44 | 1.220 | 0.79 | 0.10 | 0.10 | 0.98 |
| 2.26 | 0.780 | −0.32 | 2.82 | 0.975 | −0.32 | 2.82 | 0.975 | 3.21 | 3.53 | 1.220 | 0.79 | 0.10 | 0.10 | 0.98 |
| 2.31 | 0.780 | −0.33 | 2.89 | 0.975 | −0.33 | 2.89 | 0.975 | 3.37 | 3.62 | 1.220 | 0.79 | 0.10 | 0.10 | 0.98 |
| 2.37 | 0.780 | −1.35 | 2.96 | 0.975 | −1.35 | 2.96 | 0.975 | 3.53 | 3.70 | 1.220 | 0.79 | 0.10 | 0.10 | 0.98 |
| 2.42 | 0.780 | −0.37 | 3.03 | 0.975 | −0.37 | 3.03 | 0.975 | 3.70 | 3.79 | 1.220 | 0.79 | 0.10 | 0.10 | 0.98 |
| 2.48 | 0.780 | −0.38 | 3.10 | 0.975 | −0.38 | 3.10 | 0.975 | 3.87 | 3.87 | 1.220 | 0.79 | 0.10 | 0.10 | 0.98 |
| 2.53 | 0.780 | −0.40 | 3.17 | 0.975 | −0.40 | 3.17 | 0.975 | 4.04 | 3.96 | 1.220 | 0.79 | 0.10 | 0.10 | 0.98 |
| 2.59 | 0.780 | −0.42 | 3.24 | 0.975 | −0.42 | 3.24 | 0.975 | 4.22 | 4.05 | 1.220 | 0.79 | 0.10 | 0.10 | 0.98 |
| 2.64 | 0.780 | −0.44 | 3.30 | 0.975 | −0.44 | 3.30 | 0.975 | 4.40 | 4.13 | 1.220 | 0.79 | 0.10 | 0.10 | 0.98 |
| 2.70 | 0.780 | −0.45 | 3.37 | 0.975 | −0.45 | 3.37 | 0.975 | 4.59 | 4.22 | 1.220 | 0.79 | 0.10 | 0.10 | 0.98 |
| 2.75 | 0.780 | −0.47 | 3.44 | 0.975 | −0.47 | 3.44 | 0.975 | 4.78 | 4.30 | 1.220 | 0.79 | 0.10 | 0.10 | 0.98 |
| 2.81 | 0.780 | −0.49 | 3.51 | 0.975 | −0.49 | 3.51 | 0.975 | 4.97 | 4.39 | 1.220 | 0.79 | 0.10 | 0.10 | 0.98 |
| 2.86 | 0.780 | −0.51 | 3.58 | 0.975 | −0.51 | 3.58 | 0.975 | 5.16 | 4.48 | 1.220 | 0.79 | 0.10 | 0.10 | 0.98 |
| 2.92 | 0.780 | −0.53 | 3.65 | 0.975 | −0.53 | 3.65 | 0.975 | 5.37 | 4.56 | 1.220 | 0.79 | 0.10 | 0.10 | 0.98 |
| 2.97 | 0.780 | −0.55 | 3.72 | 0.975 | −0.55 | 3.72 | 0.975 | 5.57 | 4.65 | 1.220 | 0.79 | 0.10 | 0.10 | 0.98 |
| 3.03 | 0.780 | −0.57 | 3.79 | 0.975 | −0.57 | 3.79 | 0.975 | 5.78 | 4.73 | 1.220 | 0.79 | 0.10 | 0.10 | 0.98 |

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| | | | | | | | | | | | | | | GROUP 2 / 7% GAP / NEW DESIGN | |
| | Do | DI | PIT DEPTH | PIT CNT | GAP | Ds=Db (ie. Db) | Do MIN | Do MIN AS A % OF Ds/CALC | Do MAX | Do MAX AS A% OF DS/CALC | DI MIN | DI MIN AS A % OF Ds/CALC | DI MAX | DI MAX AS A% OF Ds/CALC | Astd(Ds=DI, Do, DI) |
| 1 | 5.6 | 2.8 | 1.4 | 20 | 7.0% | 3.95 | 5.21 | 132% | 5.99 | 152% | 2.60 | 65.9% | 3.00 | 75.8% | 6.107 |
| 2 | 5.7 | 2.85 | 1.425 | 20 | 7.0% | 4.02 | 5.30 | 132% | 6.10 | 152% | 2.65 | 65.9% | 3.05 | 75.8% | 6.327 |
| 3 | 5.8 | 2.9 | 1.45 | 20 | 7.0% | 4.09 | 5.39 | 132% | 6.21 | 152% | 2.70 | 65.9% | 3.10 | 75.8% | 6.551 |
| 4 | 5.9 | 2.95 | 1.457 | 20 | 7.0% | 4.16 | 5.49 | 132% | 6.31 | 152% | 2.74 | 65.9% | 3.16 | 75.8% | 6.779 |
| 5 | 6 | 3 | 1.5 | 20 | 7.0% | 4.23 | 5.58 | 132% | 6.42 | 152% | 2.79 | 65.9% | 3.21 | 75.8% | 7.011 |
| 6 | 6.1 | 3.05 | 1.525 | 20 | 7.0% | 4.30 | 5.67 | 132% | 6.53 | 152% | 2.84 | 65.9% | 3.26 | 75.8% | 7.246 |
| 7 | 6.2 | 3.1 | 1.55 | 20 | 7.0% | 4.38 | 5.77 | 132% | 6.63 | 152% | 2.88 | 65.9% | 3.32 | 75.8% | 7.486 |
| 8 | 6.3 | 3.15 | 1.575 | 20 | 7.0% | 4.45 | 5.86 | 132% | 6.74 | 152% | 2.93 | 65.9% | 3.37 | 75.8% | 7.729 |
| 9 | 6.4 | 3.2 | 1.6 | 20 | 7.0% | 4.52 | 5.95 | 132% | 6.85 | 152% | 2.98 | 65.9% | 3.42 | 75.8% | 7.976 |
| 10 | 6.5 | 3.25 | 1.625 | 20 | 7.0% | 4.59 | 6.05 | 132% | 6.96 | 152% | 3.02 | 65.9% | 3.48 | 75.8% | 8.228 |
| 11 | 6.6 | 3.3 | 1.65 | 20 | 7.0% | 4.66 | 6.14 | 132% | 7.06 | 152% | 3.07 | 65.9% | 3.53 | 75.8% | 8.483 |
| 12 | 6.7 | 3.35 | 1.675 | 20 | 7.0% | 4.73 | 6.23 | 132% | 7.17 | 152% | 3.12 | 65.9% | 3.58 | 75.8% | 8.742 |
| 13 | 6.8 | 3.4 | 1.7 | 20 | 7.0% | 4.80 | 6.32 | 132% | 7.28 | 152% | 3.16 | 65.9% | 3.64 | 75.8% | 9.005 |
| 14 | 6.9 | 3.45 | 1.725 | 20 | 7.0% | 4.87 | 6.42 | 132% | 7.38 | 152% | 3.21 | 65.9% | 3.69 | 75.8% | 9.271 |
| 15 | 7 | 3.5 | 1.75 | 20 | 7.0% | 4.94 | 6.51 | 132% | 7.49 | 152% | 3.26 | 65.9% | 3.75 | 75.8% | 9.542 |
| 16 | 7.1 | 3.55 | 1.775 | 20 | 7.0% | 5.01 | 6.60 | 132% | 7.60 | 152% | 3.30 | 65.9% | 3.80 | 75.8% | 9.817 |

FIG. 21B

| VS STANDARD CARTIRDGE WITH SEAL ON I.D. | | | | | | | | | | | | | | | |
|---|---|---|---|---|---|---|---|---|---|---|---|---|---|---|---|
| 16 | 17 | 18 | 19 | 20 | 21 | 22 | 23 | 24 | 25 | 26 | 27 | 28 | 29 | 30 | 31 |
| $Ae(Ds\_CALC, Do\_MIN, Dl\_MIN)$ | $Ds1=Ds$ AS A FUNCTION OF $Do\_MIN$ & $Dl\_MIN$ | $Ds1$ AS A % OF Db | $Ae(Ds\_CALC, Do\_MIN, Dl\_MAX)$ | $Ds1=Ds$ AS A FUNTION OF $Do\_MIN$ & $Dl\_MAX$ | $Ds1$ AS A % OF Db | $Ae(Ds\_CALC, Do\_MAX, Dl\_MIN)$ | $Ds1=Ds$ AS A FUNTION OF $Do\_MAX$ & $Dl\_MIN$ | $Ds1$ AS A % OF Db | $Ae(Ds\_CALC, Do\_MAX, Dl\_MAX)$ | $Ds1=Ds$ AS A FUNTION OF $Do\_MAX$ & $Dl\_MAX$ | $Ds1$ AS A % OF Db $Ds$ CALC (ie % of Db Col.6) | $Ae(Ds=Db, DO\_MIN, Dl\_MIN)$ %ASTD | $Ae(Ds=Db, DO\_MIN, Dl\_MAX)$ %ASTD | $Ae(Ds=Db, DO\_MAX, Dl\_MIN)$ %ASTD | $Ae(Ds=Db, DO\_MAX, Dl\_MAX)$ %ASTD |
| −1.66 | 3.66 | 0.930 | −0.06 | 3.94 | 0.998 | −0.06 | 3.94 | 0.998 | 1.76 | 4.23 | 1.070 | 27.1% | 1.0% | 1.0% | 29.1% |
| −1.72 | 3.74 | 0.930 | −0.06 | 4.01 | 0.998 | −0.06 | 4.01 | 0.998 | 1.84 | 4.30 | 1.070 | 27.1% | 1.0% | 1.0% | 29.1% |
| −1.78 | 3.81 | 0.930 | −0.06 | 4.08 | 0.998 | −0.06 | 4.08 | 0.998 | 1.91 | 4.38 | 1.070 | 27.1% | 1.0% | 1.0% | 29.1% |
| −1.84 | 3.87 | 0.930 | −0.07 | 4.15 | 0.998 | −0.07 | 4.15 | 0.998 | 1.97 | 4.45 | 1.070 | 27.1% | 1.0% | 1.0% | 29.1% |
| −1.90 | 3.94 | 0.930 | −0.07 | 4.22 | 0.998 | −0.07 | 4.22 | 0.998 | 2.04 | 4.53 | 1.070 | 27.1% | 1.0% | 1.0% | 29.1% |
| −1.97 | 4.00 | 0.930 | −0.07 | 4.29 | 0.998 | −0.07 | 4.29 | 0.998 | 2.11 | 4.61 | 1.070 | 27.1% | 1.0% | 1.0% | 29.1% |
| −2.03 | 4.07 | 0.930 | −0.07 | 4.36 | 0.998 | −0.07 | 4.36 | 0.998 | 2.18 | 4.68 | 1.070 | 27.1% | 1.0% | 1.0% | 29.1% |
| −2.10 | 4.13 | 0.930 | −0.08 | 4.43 | 0.998 | −0.08 | 4.43 | 0.998 | 2.25 | 4.76 | 1.070 | 27.1% | 1.0% | 1.0% | 29.1% |
| −2.16 | 4.20 | 0.930 | −0.08 | 4.51 | 0.998 | −0.08 | 4.51 | 0.998 | 2.32 | 4.83 | 1.070 | 27.1% | 1.0% | 1.0% | 29.1% |
| −2.23 | 4.27 | 0.930 | −0.08 | 4.58 | 0.998 | −0.08 | 4.58 | 0.998 | 2.39 | 4.91 | 1.070 | 27.1% | 1.0% | 1.0% | 29.1% |
| −2.30 | 4.33 | 0.930 | −0.08 | 4.65 | 0.998 | −0.08 | 4.65 | 0.998 | 2.47 | 4.98 | 1.070 | 27.1% | 1.0% | 1.0% | 29.1% |
| −2.37 | 4.40 | 0.930 | −0.09 | 4.72 | 0.998 | −0.09 | 4.72 | 0.998 | 2.54 | 5.06 | 1.070 | 27.1% | 1.0% | 1.0% | 29.1% |
| −2.44 | 4.46 | 0.930 | −0.09 | 4.79 | 0.998 | −0.09 | 4.79 | 0.998 | 2.62 | 5.13 | 1.070 | 27.1% | 1.0% | 1.0% | 29.1% |
| −2.52 | 4.53 | 0.930 | −0.09 | 4.86 | 0.998 | −0.09 | 4.86 | 0.998 | 2.70 | 5.21 | 1.070 | 27.1% | 1.0% | 1.0% | 29.1% |
| −2.59 | 4.59 | 0.930 | −0.09 | 4.93 | 0.998 | −0.09 | 4.93 | 0.998 | 2.78 | 5.29 | 1.070 | 27.1% | 1.0% | 1.0% | 29.1% |
| −2.66 | 4.66 | 0.930 | −0.10 | 5.00 | 0.998 | −0.10 | 5.00 | 0.998 | 2.86 | 5.36 | 1.070 | 27.1% | 1.0% | 1.0% | 29.1% |

FIG. 21C

| | | | | | | | | | | | | | | | |
|---|---|---|---|---|---|---|---|---|---|---|---|---|---|---|---|
| 17 | 7.2 | 3.6 | 1.8 | 20 | 7.0% | 5.08 | 6.70 | 132% | 7.70 | 152% | 3.35 | 65.9% | 3.85 | 75.8% | 10.095 |
| 18 | 7.3 | 3.65 | 1.825 | 20 | 7.0% | 5.15 | 6.79 | 132% | 7.81 | 152% | 3.39 | 65.9% | 3.91 | 75.8% | 10.378 |
| 19 | 7.4 | 3.7 | 1.85 | 20 | 7.0% | 5.22 | 6.88 | 132% | 7.92 | 152% | 3.44 | 65.9% | 3.95 | 75.8% | 10.664 |
| 20 | 7.5 | 3.75 | 1.875 | 20 | 7.0% | 5.29 | 6.98 | 132% | 8.03 | 152% | 3.49 | 65.9% | 4.01 | 75.8% | 10.954 |
| 21 | 7.6 | 3.8 | 1.9 | 20 | 7.0% | 5.36 | 7.07 | 132% | 8.13 | 152% | 3.53 | 65.9% | 4.07 | 75.8% | 11.248 |
| 22 | 7.7 | 3.85 | 1.925 | 20 | 7.0% | 5.43 | 7.16 | 132% | 8.24 | 152% | 3.58 | 65.9% | 4.12 | 75.8% | 11.546 |
| 23 | 7.8 | 3.9 | 1.95 | 20 | 7.0% | 5.50 | 7.25 | 132% | 8.35 | 152% | 3.63 | 65.9% | 4.17 | 75.8% | 11.848 |
| 24 | 7.9 | 3.95 | 1.975 | 20 | 7.0% | 5.57 | 7.35 | 132% | 8.45 | 152% | 3.67 | 65.9% | 4.23 | 75.8% | 12.154 |
| 25 | 8 | 4 | 2 | 20 | 7.0% | 5.65 | 7.44 | 132% | 8.56 | 152% | 3.72 | 65.9% | 4.28 | 75.8% | 12.463 |
| 26 | 8.1 | 4.05 | 2.025 | 20 | 7.0% | 5.72 | 7.53 | 132% | 8.67 | 152% | 3.77 | 65.9% | 4.33 | 75.8% | 12.777 |
| 27 | 8.2 | 4.1 | 2.05 | 20 | 7.0% | 5.79 | 7.63 | 132% | 8.77 | 152% | 3.81 | 65.9% | 4.39 | 75.8% | 13.094 |
| 28 | 8.3 | 4.15 | 2.075 | 20 | 7.0% | 5.86 | 7.72 | 132% | 8.88 | 152% | 3.88 | 65.9% | 4.44 | 75.8% | 13.415 |
| 29 | 8.4 | 4.2 | 2.1 | 20 | 7.0% | 5.93 | 7.81 | 132% | 8.99 | 152% | 3.91 | 65.9% | 4.49 | 75.8% | 13.741 |
| 30 | 8.5 | 4.25 | 2.125 | 20 | 7.0% | 6.00 | 7.91 | 132% | 9.10 | 152% | 3.95 | 65.9% | 4.55 | 75.8% | 14.070. |
| 31 | 8.6 | 4.3 | 2.15 | 20 | 7.0% | 6.07 | 8.00 | 132% | 9.20 | 152% | 4.00 | 65.9% | 4.60 | 75.8% | 14.403 |
| 32 | 8.7 | 4.35 | 2.175 | 20 | 7.0% | 6.14 | 8.09 | 132% | 9.31 | 152% | 4.05 | 65.9% | 4.65 | 75.8% | 14.740 |
| 33 | 8.9 | 4.4 | 2.2 | 20 | 7.0% | 6.21 | 8.18 | 132% | 9.42 | 152% | 4.09 | 65.9% | 4.71 | 75.8% | 15.080 |
| 34 | 8.9 | 4.45 | 2.225 | 20 | 7.0% | 6.28 | 8.28 | 132% | 9.52 | 152% | 4.14 | 65.9% | 4.76 | 75.8% | 15.425 |
| 35 | 9 | 4.5 | 2.25 | 20 | 7.0% | 6.35 | 8.37 | 132% | 9.63 | 152% | 4.19 | 65.9% | 4.82 | 75.8% | 15.774 |
| 36 | 9.1 | 4.55 | 2.275 | 20 | 7.0% | 6.42 | 8.46 | 132% | 9.74 | 152% | 4.23 | 65.9% | 4.87 | 75.8% | 16.126 |
| 37 | 9.2 | 4.6 | 2.3 | 20 | 7.0% | 6.49 | 8.56 | 132% | 9.84 | 152% | 4.28 | 65.9% | 4.92 | 75.8% | 16.483 |
| 38 | 9.3 | 4.65 | 2.325 | 20 | 7.0% | 6.56 | 8.65 | 132% | 9.95 | 152% | 4.32 | 65.9% | 4.98 | 75.8% | 16.843 |
| 39 | 9.4 | 4.7 | 2.35 | 20 | 7.0% | 6.63 | 8.74 | 132% | 10.06 | 152% | 4.37 | 65.9% | 5.03 | 75.8% | 17.207 |
| 40 | 9.5 | 4.75 | 2.375 | 20 | 7.0% | 6.70 | 8.84 | 132% | 10.17 | 152% | 4.42 | 65.9% | 5.08 | 75.8% | 17.575 |
| 41 | 9.6 | 4.8 | 2.4 | 20 | 7.0% | 6.77 | 8.93 | 132% | 10.27 | 152% | 4.46 | 65.9% | 5.14 | 75.8% | 17.947 |
| 42 | 9.7 | 4.85 | 2.425 | 20 | 7.0% | 6.84 | 9.02 | 132% | 10.38 | 152% | 4.51 | 65.9% | 5.19 | 75.8% | 18.323 |
| 43 | 9.8 | 4.9 | 2.45 | 20 | 7.0% | 6.92 | 9.11 | 132% | 10.49 | 152% | 4.56 | 65.9% | 5.24 | 75.8% | 18.703 |
| 44 | 9.9 | 4.95 | 2.475 | 20 | 7.0% | 6.99 | 9.21 | 132% | 10.59 | 152% | 4.60 | 65.9% | 5.30 | 75.8% | 19.086 |
| 45 | 10 | 5 | 2.5 | 20 | 7.0% | 7.08 | 9.30 | 132% | 10.70 | 152% | 4.65 | 65.9% | 5.35 | 75.8% | 19.474 |

FIG. 21D

| | | | | | | | | | | | | | | |
|---|---|---|---|---|---|---|---|---|---|---|---|---|---|---|
| −2.74 | 4.73 | 0.930 | −0.10 | 5.07 | 0.998 | −0.10 | 5.07 | 0.998 | 2.94 | 5.44 | 1.070 | 27.1% | 1.0% | 1.0% | 29.1% |
| −2.82 | 4.79 | 0.930 | −0.10 | 5.14 | 0.998 | −0.10 | 5.14 | 0.998 | 3.02 | 5.51 | 1.070 | 27.1% | 1.0% | 1.0% | 29.1% |
| −2.89 | 4.86 | 0.930 | −0.10 | 5.21 | 0.998 | −0.10 | 5.21 | 0.998 | 3.10 | 5.59 | 1.070 | 27.1% | 1.0% | 1.0% | 29.1% |
| −2.97 | 4.92 | 0.930 | −0.11 | 5.28 | 0.998 | −0.11 | 5.28 | 0.998 | 3.19 | 5.66 | 1.070 | 27.1% | 1.0% | 1.0% | 29.1% |
| −3.05 | 4.99 | 0.930 | −0.11 | 5.35 | 0.998 | −0.11 | 5.35 | 0.998 | 3.27 | 5.74 | 1.070 | 27.1% | 1.0% | 1.0% | 29.1% |
| −3.13 | 5.05 | 0.930 | −0.11 | 5.42 | 0.998 | −0.11 | 5.42 | 0.998 | 3.36 | 5.81 | 1.070 | 27.1% | 1.0% | 1.0% | 29.1% |
| −3.21 | 5.12 | 0.930 | −0.12 | 5.49 | 0.998 | −0.12 | 5.49 | 0.998 | 3.45 | 5.89 | 1.070 | 27.1% | 1.0% | 1.0% | 29.1% |
| −3.30 | 5.18 | 0.930 | −0.12 | 5.56 | 0.998 | −0.12 | 5.56 | 0.998 | 3.54 | 5.96 | 1.070 | 27.1% | 1.0% | 1.0% | 29.1% |
| −3.38 | 5.25 | 0.930 | −0.12 | 5.63 | 0.998 | −0.12 | 5.63 | 0.998 | 3.63 | 6.04 | 1.070 | 27.1% | 1.0% | 1.0% | 29.1% |
| −3.47 | 5.32 | 0.930 | −0.13 | 5.70 | 0.998 | −0.13 | 5.70 | 0.998 | 3.72 | 6.12 | 1.070 | 27.1% | 1.0% | 1.0% | 29.1% |
| −3.55 | 5.38 | 0.930 | −0.13 | 5.77 | 0.998 | −0.13 | 5.77 | 0.998 | 3.81 | 6.19 | 1.070 | 27.1% | 1.0% | 1.0% | 29.1% |
| −3.64 | 5.45 | 0.930 | −0.13 | 5.84 | 0.998 | −0.13 | 5.84 | 0.998 | 3.90 | 6.27 | 1.070 | 27.1% | 1.0% | 1.0% | 29.1% |
| −3.73 | 5.51 | 0.930 | −0.14 | 5.91 | 0.998 | −0.14 | 5.91 | 0.998 | 4.00 | 6.34 | 1.070 | 27.1% | 1.0% | 1.0% | 29.1% |
| −3.82 | 5.58 | 0.930 | −0.14 | 5.98 | 0.998 | −0.14 | 5.98 | 0.998 | 4.09 | 6.42 | 1.070 | 27.1% | 1.0% | 1.0% | 29.1% |
| −3.91 | 5.64 | 0.930 | −0.14 | 6.05 | 0.998 | −0.14 | 6.05 | 0.998 | 4.19 | 6.49 | 1.070 | 27.1% | 1.0% | 1.0% | 29.1% |
| −4.00 | 5.71 | 0.930 | −0.15 | 6.12 | 0.998 | −0.15 | 6.12 | 0.998 | 4.29 | 6.57 | 1.070 | 27.1% | 1.0% | 1.0% | 29.1% |
| −4.09 | 5.78 | 0.930 | −0.15 | 6.19 | 0.998 | −0.15 | 6.19 | 0.998 | 4.39 | 6.64 | 1.070 | 27.1% | 1.0% | 1.0% | 29.1% |
| −4.19 | 5.84 | 0.930 | −0.15 | 6.26 | 0.998 | −0.15 | 6.26 | 0.998 | 4.49 | 6.72 | 1.070 | 27.1% | 1.0% | 1.0% | 29.1% |
| −4.28 | 5.91 | 0.930 | −0.16 | 6.34 | 0.998 | −0.16 | 6.34 | 0.998 | 4.59 | 6.80 | 1.070 | 27.1% | 1.0% | 1.0% | 29.1% |
| −4.38 | 5.97 | 0.930 | −0.16 | 6.41 | 0.998 | −0.16 | 6.41 | 0.998 | 4.69 | 6.87 | 1.070 | 27.1% | 1.0% | 1.0% | 29.1% |
| −4.47 | 6.04 | 0.930 | −0.16 | 6.48 | 0.998 | −0.16 | 6.48 | 0.998 | 4.80 | 6.95 | 1.070 | 27.1% | 1.0% | 1.0% | 29.1% |
| −4.57 | 6.10 | 0.930 | −0.17 | 6.55 | 0.998 | −0.17 | 6.55 | 0.998 | 4.90 | 7.02 | 1.070 | 27.1% | 1.0% | 1.0% | 29.1% |
| −4.67 | 6.17 | 0.930 | −0.17 | 6.62 | 0.998 | −0.17 | 6.62 | 0.998 | 5.01 | 7.10 | 1.070 | 27.1% | 1.0% | 1.0% | 29.1% |
| −4.77 | 6.23 | 0.930 | −0.17 | 6.69 | 0.998 | −0.17 | 6.69 | 0.998 | 5.11 | 7.17 | 1.070 | 27.1% | 1.0% | 1.0% | 29.1% |
| −4.87 | 6.30 | 0.930 | −0.18 | 6.76 | 0.998 | −0.18 | 6.76 | 0.998 | 5.22 | 7.25 | 1.070 | 27.1% | 1.0% | 1.0% | 29.1% |
| −4.97 | 6.37 | 0.930 | −0.18 | 6.83 | 0.998 | −0.18 | 6.83 | 0.998 | 5.33 | 7.32 | 1.070 | 27.1% | 1.0% | 1.0% | 29.1% |
| −5.07 | 6.43 | 0.930 | −0.18 | 6.90 | 0.998 | −0.18 | 6.90 | 0.998 | 5.44 | 7.40 | 1.070 | 27.1% | 1.0% | 1.0% | 29.1% |
| −5.18 | 6.50 | 0.930 | −0.19 | 6.97 | 0.998 | −0.19 | 6.97 | 0.998 | 5.55 | 7.47 | 1.070 | 27.1% | 1.0% | 1.0% | 29.1% |
| −5.28 | 6.58 | 0.930 | −0.19 | 7.04 | 0.998 | −0.19 | 7.04 | 0.998 | 6.67 | 7.55 | 1.070 | 27.1% | 1.0% | 1.0% | 29.1% |

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| | | | | | | | | | | | | | | GROUP 2 / 12% GAP / NEW DESIGN | |
| | Do | DI | PIT DEPTH | PIT CNT | GAP | Ds=Db (ie. Db) | Do MIN | Do MIN AS A % OF Ds/CALC | Do MAX | Do MAX AS A% OF Ds/CALC | DI MIN | DI MIN AS A % OF Ds/CALC | DI MAX | DI MAX AS A% OF Ds/CALC | Astd(Ds=DI, Do, DI) |
| 1 | 5.6 | 2.8 | 1.4 | 20 | 12.0% | 3.95 | 4.93 | 125% | 6.27 | 159% | 2.46 | 62.4% | 3.14 | 79.4% | 6.107 |
| 2 | 5.7 | 2.85 | 1.425 | 20 | 12.0% | 4.02 | 5.02 | 125% | 6.38 | 159% | 2.51 | 62.4% | 3.19 | 79.4% | 6.327 |
| 3 | 5.8 | 2.9 | 1.45 | 20 | 12.0% | 4.09 | 5.10 | 125% | 6.50 | 159% | 2.55 | 62.4% | 3.25 | 79.4% | 6.551 |
| 4 | 5.9 | 2.95 | 1.457 | 20 | 12.0% | 4.16 | 5.19 | 125% | 6.61 | 159% | 2.60 | 62.4% | 3.30 | 79.4% | 6.779 |
| 5 | 6 | 3 | 1.5 | 20 | 12.0% | 4.23 | 5.28 | 125% | 6.72 | 159% | 2.64 | 62.4% | 3.36 | 79.4% | 7.011 |
| 6 | 6.1 | 3.05 | 1.525 | 20 | 12.0% | 4.30 | 5.37 | 125% | 6.83 | 159% | 2.68 | 62.4% | 3.42 | 79.4% | 7.246 |
| 7 | 6.2 | 3.1 | 1.55 | 20 | 12.0% | 4.38 | 5.46 | 125% | 6.94 | 159% | 2.73 | 62.4% | 3.47 | 79.4% | 7.486 |
| 8 | 6.3 | 3.15 | 1.575 | 20 | 12.0% | 4.45 | 5.54 | 125% | 7.06 | 159% | 2.77 | 62.4% | 3.53 | 79.4% | 7.729 |
| 9 | 6.4 | 3.2 | 1.6 | 20 | 12.0% | 4.52 | 5.63 | 125% | 7.17 | 159% | 2.82 | 62.4% | 3.58 | 79.4% | 7.976 |
| 10 | 6.5 | 3.25 | 1.625 | 20 | 12.0% | 4.59 | 5.72 | 125% | 7.28 | 159% | 2.86 | 62.4% | 3.64 | 79.4% | 8.228 |
| 11 | 6.6 | 3.3 | 1.65 | 20 | 12.0% | 4.66 | 5.81 | 125% | 7.39 | 159% | 2.90 | 62.4% | 3.70 | 79.4% | 8.483 |
| 12 | 6.7 | 3.35 | 1.675 | 20 | 12.0% | 4.73 | 5.90 | 125% | 7.50 | 159% | 2.95 | 62.4% | 3.75 | 79.4% | 8.742 |
| 13 | 6.8 | 3.4 | 1.7 | 20 | 12.0% | 4.80 | 5.98 | 125% | 7.62 | 159% | 2.99 | 62.4% | 3.61 | 79.4% | 9.005 |
| 14 | 6.9 | 3.45 | 1.725 | 20 | 12.0% | 4.87 | 6.07 | 125% | 7.73 | 159% | 3.04 | 62.4% | 3.86 | 79.4% | 9.271 |
| 15 | 7 | 3.5 | 1.75 | 20 | 12.0% | 4.94 | 6.16 | 125% | 7.84 | 159% | 3.08 | 62.4% | 3.92 | 79.4% | 9.542 |
| 16 | 7.1 | 3.55 | 1.775 | 20 | 12.0% | 5.01 | 6.25 | 125% | 7.95 | 159% | 3.12 | 62.4% | 3.98 | 79.4% | 9.817 |
| 17 | 7.2 | 3.6 | 1.8 | 20 | 12.0% | 5.08 | 6.34 | 125% | 8.06 | 159% | 3.17 | 62.4% | 4.03 | 79.4% | ##### |

FIG. 22B

| VS STANDARD CARTIRDGE WITH SEAL ON I.D. | | | | | | | | | | | | | | | |
|---|---|---|---|---|---|---|---|---|---|---|---|---|---|---|---|
| 16 | 17 | 18 | 19 | 20 | 21 | 22 | 23 | 24 | 25 | 26 | 27 | 28 | 29 | 30 | 31 |
| $Ae(Ds\_CALC, Do\_MIN, Dl\_MIN)$ | $Ds1=Ds$ AS A FUNCTION OF $Do\_MIN$ & $Dl\_MIN$ | $Ds1$ AS A % OF $Db$ | $Ae(Ds\_CALC, Do\_MIN, Dl\_MAX)$ | $Ds1=Ds$ AS A FUNTION OF $Do\_MIN$ & $Dl\_MAX$ | $Ds1$ AS A % OF $Db$ | $Ae(Ds\_CALC, Do\_MAX, Dl\_MIN)$ | $Ds1=Ds$ AS A FUNTION OF $Do\_MAX$ & $Dl\_MIN$ | $Ds1$ AS A % OF $Db$ | $Ae(Ds\_CALC, Do\_MAX, Dl\_MAX)$ | $Ds1=Ds$ AS A FUNTION OF $Do\_MAX$ & $Dl\_MAX$ | $Ds1$ AS A % OF $Ds$ CALC (ie % OF $Db$ Col.6) | $Ae(Ds=Db, DO\_MIN, Dl\_MIN)$ % ASTD | $Ae(Ds=Db, DO\_MIN, Dl\_MAX)$ % ASTD | $Ae(Ds=Db, DO\_MAX, Dl\_MIN)$ % ASTD | $Ae(Ds=Db, DO\_MAX, Dl\_MAX)$ % ASTD |
| -2.77 | 3.48 | 0.880 | -0.18 | 3.92 | 0.993 | -0.18 | 3.92 | 0.993 | 3.12 | 4.43 | 1.120 | 45.3% | 2.9% | 2.9% | 51.1% |
| -2.87 | 3.54 | 0.880 | -0.18 | 3.99 | 0.993 | -0.18 | 3.99 | 0.993 | 3.23 | 4.50 | 1.120 | 45.3% | 2.9% | 2.9% | 51.1% |
| -2.97 | 3.60 | 0.880 | -0.19 | 4.08 | 0.993 | -0.19 | 4.08 | 0.993 | 3.35 | 4.58 | 1.120 | 45.3% | 2.9% | 2.9% | 51.1% |
| -3.07 | 3.66 | 0.880 | -0.20 | 4.13 | 0.993 | -0.20 | 4.13 | 0.993 | 3.46 | 4.66 | 1.120 | 45.3% | 2.9% | 2.9% | 51.1% |
| -3.18 | 3.73 | 0.880 | -0.20 | 4.20 | 0.993 | -0.20 | 4.20 | 0.993 | 3.58 | 4.74 | 1.120 | 45.3% | 2.9% | 2.9% | 51.1% |
| -3.28 | 3.79 | 0.880 | -0.21 | 4.27 | 0.993 | -0.21 | 4.27 | 0.993 | 3.70 | 4.82 | 1.120 | 45.3% | 2.9% | 2.9% | 51.1% |
| -3.39 | 3.85 | 0.880 | -0.22 | 4.34 | 0.993 | -0.22 | 4.34 | 0.993 | 3.82 | 4.90 | 1.120 | 45.3% | 2.9% | 2.9% | 51.1% |
| -3.50 | 3.91 | 0.880 | -0.22 | 4.41 | 0.993 | -0.22 | 4.41 | 0.993 | 3.95 | 4.96 | 1.120 | 45.3% | 2.9% | 2.9% | 51.1% |
| -3.61 | 3.97 | 0.880 | -0.23 | 4.48 | 0.993 | -0.23 | 4.48 | 0.993 | 4.08 | 5.06 | 1.120 | 45.3% | 2.9% | 2.9% | 51.1% |
| -3.73 | 4.04 | 0.880 | -0.24 | 4.55 | 0.993 | -0.24 | 4.55 | 0.993 | 4.20 | 5.14 | 1.120 | 45.3% | 2.9% | 2.9% | 51.1% |
| -3.84 | 4.10 | 0.880 | -0.25 | 4.62 | 0.993 | -0.25 | 4.62 | 0.993 | 4.33 | 5.22 | 1.120 | 45.3% | 2.9% | 2.9% | 51.1% |
| -3.96 | 4.16 | 0.880 | -0.25 | 4.69 | 0.993 | -0.25 | 4.69 | 0.993 | 4.47 | 5.30 | 1.120 | 45.3% | 2.9% | 2.9% | 51.1% |
| -4.08 | 4.22 | 0.880 | -0.26 | 4.75 | 0.993 | -0.26 | 4.75 | 0.993 | 4.60 | 5.37 | 1.120 | 45.3% | 2.9% | 2.9% | 51.1% |
| -4.20 | 4.28 | 0.880 | -0.27 | 4.83 | 0.993 | -0.27 | 4.83 | 0.993 | 4.74 | 5.45 | 1.120 | 45.3% | 2.9% | 2.9% | 51.1% |
| -4.62 | 4.35 | 0.880 | -0.28 | 4.90 | 0.993 | -0.28 | 4.90 | 0.993 | 4.88 | 5.53 | 1.120 | 45.3% | 2.9% | 2.9% | 51.1% |
| -4.45 | 4.41 | 0.880 | -0.28 | 4.97 | 0.993 | -0.28 | 4.97 | 0.993 | 5.02 | 5.61 | 1.120 | 45.3% | 2.9% | 2.9% | 51.1% |
| -4.57 | 4.47 | 0.880 | -0.29 | 5.04 | 0.993 | -0.29 | 5.04 | 0.993 | 5.16 | 5.69 | 1.120 | 45.3% | 2.9% | 2.9% | 51.1% |

FIG. 22C

| 18 | 7.3 | 3.65 | 1.825 | 20 | 12.0% | 5.15 | 6.42 | 125% | 8.18 | 159% | 3.21 | 62.4% | 4.09 | 79.4% | ##### |
|---|---|---|---|---|---|---|---|---|---|---|---|---|---|---|---|
| 19 | 7.4 | 3.7 | 1.85 | 20 | 12.0% | 5.22 | 6.51 | 125% | 8.29 | 159% | 3.26 | 62.4% | 4.14 | 79.4% | ##### |
| 20 | 7.5 | 3.75 | 1.875 | 20 | 12.0% | 5.29 | 6.60 | 125% | 8.40 | 159% | 3.30 | 62.4% | 4.20 | 79.4% | ##### |
| 21 | 7.6 | 3.8 | 1.9 | 20 | 12.0% | 5.36 | 6.69 | 125% | 8.51 | 159% | 3.34 | 62.4% | 4.26 | 79.4% | ##### |
| 22 | 7.7 | 3.85 | 1.925 | 20 | 12.0% | 5.43 | 6.78 | 125% | 8.62 | 159% | 3.39 | 62.4% | 4.31 | 79.4% | ##### |
| 23 | 7.8 | 3.9 | 1.95 | 20 | 12.0% | 5.50 | 6.86 | 125% | 8.74 | 159% | 3.43 | 62.4% | 4.37 | 79.4% | ##### |
| 24 | 7.9 | 3.95 | 1.975 | 20 | 12.0% | 5.57 | 6.95 | 125% | 8.85 | 159% | 3.48 | 62.4% | 4.42 | 79.4% | ##### |
| 25 | 8 | 4 | 2 | 20 | 12.0% | 5.65 | 7.04 | 125% | 8.96 | 159% | 3.56 | 62.4% | 4.48 | 79.4% | ##### |
| 26 | 8.1 | 4.05 | 2.025 | 20 | 12.0% | 5.72 | 7.13 | 125% | 9.07 | 159% | 3.61 | 62.4% | 4.54 | 79.4% | ##### |
| 27 | 8.2 | 4.1 | 2.05 | 20 | 12.0% | 5.79 | 7.22 | 125% | 9.18 | 159% | 3.65 | 62.4% | 4.59 | 79.4% | ##### |
| 28 | 8.3 | 4.15 | 2.075 | 20 | 12.0% | 5.86 | 7.30 | 125% | 9.30 | 159% | 3.70 | 62.4% | 4.65 | 79.4% | ##### |
| 29 | 8.4 | 4.2 | 2.1 | 20 | 12.0% | 5.93 | 7.39 | 125% | 9.41 | 159% | 3.74 | 62.4% | 4.70 | 79.4% | ##### |
| 30 | 8.5 | 4.25 | 2.125 | 20 | 12.0% | 6.00 | 7.48 | 125% | 9.52 | 159% | 3.78 | 62.4% | 4.76 | 79.4% | ##### |
| 31 | 8.6 | 4.3 | 2.15 | 20 | 12.0% | 6.07 | 7.57 | 125% | 9.63 | 159% | 3.83 | 62.4% | 4.82 | 79.4% | ##### |
| 32 | 8.7 | 4.35 | 2.175 | 20 | 12.0% | 6.14 | 7.66 | 125% | 9.74 | 159% | 3.87 | 62.4% | 4.87 | 79.4% | ##### |
| 33 | 8.9 | 4.4 | 2.2 | 20 | 12.0% | 6.21 | 7.74 | 125% | 9.86 | 159% | 3.92 | 62.4% | 4.93 | 79.4% | ##### |
| 34 | 8.9 | 4.45 | 2.225 | 20 | 12.0% | 6.28 | 7.83 | 125% | 9.97 | 159% | 3.96 | 62.4% | 4.98 | 79.4% | ##### |
| 35 | 9 | 4.5 | 2.25 | 20 | 12.0% | 6.35 | 7.92 | 125% | 10.08 | 159% | 4.00 | 62.4% | 5.04 | 79.4% | ##### |
| 36 | 9.1 | 4.55 | 2.275 | 20 | 12.0% | 6.42 | 8.01 | 125% | 10.19 | 159% | 4.05 | 62.4% | 5.10 | 79.4% | ##### |
| 37 | 9.2 | 4.6 | 2.3 | 20 | 12.0% | 6.49 | 8.10 | 125% | 10.30 | 159% | 4.09 | 62.4% | 5.15 | 79.4% | ##### |
| 38 | 9.3 | 4.65 | 2.325 | 20 | 12.0% | 6.56 | 8.18 | 125% | 10.42 | 159% | 4.14 | 62.4% | 5.21 | 79.4% | ##### |
| 39 | 9.4 | 4.7 | 2.35 | 20 | 12.0% | 6.63 | 8.27 | 125% | 10.53 | 159% | 4.18 | 62.4% | 5.26 | 79.4% | ##### |
| 40 | 9.5 | 4.75 | 2.375 | 20 | 12.0% | 6.70 | 8.36 | 125% | 10.64 | 159% | XXX | 62.4% | 5.32 | 79.4% | ##### |
| 41 | 9.6 | 4.8 | 2.4 | 20 | 12.0% | 6.77 | 8.45 | 125% | 10.75 | 159% | 4.22 | 62.4% | 5.38 | 79.4% | ##### |
| 42 | 9.7 | 4.85 | 2.425 | 20 | 12.0% | 6.84 | 8.54 | 125% | 10.86 | 159% | 4.27 | 62.4% | 5.43 | 79.4% | ##### |
| 43 | 9.8 | 4.9 | 2.45 | 20 | 12.0% | 6.92 | 8.62 | 125% | 10.98 | 159% | 4.31 | 62.4% | 5.49 | 79.4% | ##### |
| 44 | 9.9 | 4.95 | 2.475 | 20 | 12.0% | 6.99 | 8.71 | 125% | 11.09 | 159% | 4.36 | 62.4% | 5.54 | 79.4% | ##### |
| 45 | 10 | 5 | 2.5 | 20 | 12.0% | 7.06 | 8.80 | 125% | 11.20 | 159% | 4.40 | 62.4% | 5.60 | 79.4% | ##### |

FIG. 22D

| | | | | | | | | | | | | | | |
|---|---|---|---|---|---|---|---|---|---|---|---|---|---|---|
| −4.70 | 4.53 | 0.880 | −0.30 | 5.11 | 0.993 | −0.30 | 5.11 | 0.993 | 5.30 | 5.77 | 1.120 | 45.3% | 2.9% | 2.9% | 51.1% |
| −4.83 | 4.60 | 0.880 | −0.31 | 5.18 | 0.993 | −0.31 | 5.18 | 0.993 | 5.45 | 5.85 | 1.120 | 45.3% | 2.9% | 2.9% | 51.1% |
| −4.96 | 4.66 | 0.880 | −0.32 | 5.25 | 0.993 | −0.32 | 5.25 | 0.993 | 5.60 | 5.93 | 1.120 | 45.3% | 2.9% | 2.9% | 51.1% |
| −5.10 | 4.72 | 0.880 | −0.33 | 5.32 | 0.993 | −0.33 | 5.32 | 0.993 | 5.75 | 6.01 | 1.120 | 45.3% | 2.9% | 2.9% | 51.1% |
| −5.23 | 4.78 | 0.880 | −0.33 | 5.39 | 0.993 | −0.33 | 5.39 | 0.993 | 5.90 | 6.09 | 1.120 | 45.3% | 2.9% | 2.9% | 51.1% |
| −5.37 | 4.84 | 0.880 | −0.34 | 5.46 | 0.993 | −0.34 | 5.46 | 0.993 | 6.05 | 6.16 | 1.120 | 45.3% | 2.9% | 2.9% | 51.1% |
| −5.51 | 4.91 | 0.880 | −0.35 | 5.53 | 0.993 | −0.35 | 5.53 | 0.993 | 6.21 | 6.24 | 1.120 | 45.3% | 2.9% | 2.9% | 51.1% |
| −5.65 | 4.97 | 0.880 | −0.36 | 5.60 | 0.993 | −0.36 | 5.60 | 0.993 | 6.37 | 6.32 | 1.120 | 45.3% | 2.9% | 2.9% | 51.1% |
| −5.79 | 5.03 | 0.880 | −0.37 | 5.67 | 0.993 | −0.37 | 5.67 | 0.993 | 6.53 | 6.40 | 1.120 | 45.3% | 2.9% | 2.9% | 51.1% |
| −5.93 | 5.09 | 0.880 | −0.38 | 5.74 | 0.993 | −0.38 | 5.74 | 0.993 | 6.69 | 6.48 | 1.120 | 45.3% | 2.9% | 2.9% | 51.1% |
| −6.08 | 5.15 | 0.880 | −0.39 | 5.51 | 0.993 | −0.39 | 5.51 | 0.993 | 6.85 | 6.56 | 1.120 | 45.3% | 2.9% | 2.9% | 51.1% |
| −6.23 | 5.22 | 0.880 | −0.40 | 5.88 | 0.993 | −0.40 | 5.88 | 0.993 | 7.02 | 6.64 | 1.120 | 45.3% | 2.9% | 2.9% | 51.1% |
| −6.37 | 5.28 | 0.880 | −0.41 | 5.95 | 0.993 | −0.41 | 5.95 | 0.993 | 7.19 | 6.72 | 1.120 | 45.3% | 2.9% | 2.9% | 51.1% |
| −6.53 | 5.34 | 0.880 | −0.42 | 6.02 | 0.993 | −0.42 | 6.02 | 0.993 | 7.36 | 6.80 | 1.120 | 45.3% | 2.9% | 2.9% | 51.1% |
| −6.68 | 5.40 | 0.880 | −0.43 | 6.09 | 0.993 | −0.43 | 6.09 | 0.993 | 7.53 | 6.88 | 1.120 | 45.3% | 2.9% | 2.9% | 51.1% |
| −6.83 | 5.46 | 0.880 | −0.44 | 6.16 | 0.993 | −0.44 | 6.16 | 0.993 | 7.70 | 6.95 | 1.120 | 45.3% | 2.9% | 2.9% | 51.1% |
| −6.99 | 5.53 | 0.880 | −0.45 | 6.23 | 0.993 | −0.45 | 6.23 | 0.993 | 7.88 | 7.03 | 1.120 | 45.3% | 2.9% | 2.9% | 51.1% |
| −7.15 | 5.59 | 0.880 | −0.46 | 6.30 | 0.993 | −0.46 | 6.30 | 0.993 | 8.08 | 7.11 | 1.120 | 45.3% | 2.9% | 2.9% | 51.1% |
| −7.31 | 5.65 | 0.880 | −0.47 | 6.38 | 0.993 | −0.47 | 6.38 | 0.993 | 8.24 | 7.19 | 1.120 | 45.3% | 2.9% | 2.9% | 51.1% |
| −7.47 | 5.71 | 0.880 | −0.48 | 6.45 | 0.993 | −0.48 | 6.45 | 0.993 | 8.42 | 7.27 | 1.120 | 45.3% | 2.9% | 2.9% | 51.1% |
| −7.63 | 5.78 | 0.880 | −0.49 | 6.52 | 0.993 | −0.49 | 6.52 | 0.993 | 8.61 | 7.35 | 1.120 | 45.3% | 2.9% | 2.9% | 51.1% |
| −7.80 | 5.84 | 0.880 | −0.50 | 6.59 | 0.993 | −0.50 | 6.59 | 0.993 | 8.79 | 7.43 | 1.120 | 45.3% | 2.9% | 2.9% | 51.1% |
| −7.96 | 5.90 | 0.880 | −0.51 | 6.66 | 0.993 | −0.51 | 6.66 | 0.993 | 8.98 | 7.51 | 1.120 | 45.3% | 2.9% | 2.9% | 51.1% |
| −8.13 | 5.96 | 0.880 | −0.52 | 6.73 | 0.993 | −0.52 | 6.73 | 0.993 | 9.17 | 7.59 | 1.120 | 45.3% | 2.9% | 2.9% | 51.1% |
| −8.30 | 6.02 | 0.880 | −0.53 | 6.80 | 0.993 | −0.53 | 6.80 | 0.993 | 9.36 | 7.67 | 1.120 | 45.3% | 2.9% | 2.9% | 51.1% |
| −8.47 | 6.09 | 0.880 | −0.54 | 6.87 | 0.993 | −0.54 | 6.87 | 0.993 | 9.58 | 7.75 | 1.120 | 45.3% | 2.9% | 2.9% | 51.1% |
| −8.65 | 6.15 | 0.880 | −0.55 | 6.94 | 0.993 | −0.55 | 6.94 | 0.993 | 9.75 | 7.82 | 1.120 | 45.3% | 2.9% | 2.9% | 51.1% |
| −8.82 | 6.21 | 0.880 | −0.58 | 7.01 | 0.993 | −0.58 | 7.01 | 0.993 | 9.95 | 7.90 | 1.120 | 45.3% | 2.9% | 2.9% | 51.1% |

GROUP 2 / 22% GAP / NEW DESIGN VS

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| | Do | Di | PIT DEPTH | PIT CNT | GAP | Ds=Db (ie. Db) | Do MIN | Do MIN AS A % OF Ds/CALC | Do MAX | Do MAX AS A% OF Ds/CALC | DI MIN | DI MIN AS A % OF Ds/CALC | DI MAX | DI MAX AS A% OF Ds/CALC | Astd(Ds=DI, Do, DI) | Ae(Ds_CALC, Do_MIN, DI_MIN) |
| 1 | 5.6 | 2.8 | 1.4 | 20 | 22.0% | 3.95 | 4.37 | 111% | 6.83 | 173% | 2.18 | 53.3% | 3.42 | 86.4% | 6.107 | -4.80 |
| 2 | 5.7 | 2.85 | 1.425 | 20 | 22.0% | 4.02 | 4.45 | 111% | 6.95 | 173% | 2.22 | 53.3% | 3.48 | 86.4% | 6.327 | -4.98 |
| 3 | 5.8 | 2.9 | 1.45 | 20 | 22.0% | 4.09 | 4.52 | 111% | 7.08 | 173% | 2.26 | 53.3% | 3.54 | 86.4% | 6.551 | -5.15 |
| 4 | 5.9 | 2.95 | 1.457 | 20 | 22.0% | 4.16 | 4.60 | 111% | 7.20 | 173% | 2.30 | 53.3% | 3.60 | 86.4% | 6.779 | -5.33 |
| 5 | 6 | 3 | 1.5 | 20 | 22.0% | 4.23 | 4.68 | 111% | 7.32 | 173% | 2.34 | 53.3% | 3.68 | 86.4% | 7.011 | -5.51 |
| 6 | 6.1 | 3.05 | 1.525 | 20 | 22.0% | 4.30 | 4.76 | 111% | 7.44 | 173% | 2.38 | 53.3% | 3.72 | 86.4% | 7.246 | -5.70 |
| 7 | 6.2 | 3.1 | 1.55 | 20 | 22.0% | 4.36 | 4.84 | 111% | 7.56 | 173% | 2.42 | 53.3% | 3.78 | 86.4% | 7.486 | -5.89 |
| 8 | 6.3 | 3.15 | 1.575 | 20 | 22.0% | 4.45 | 4.91 | 111% | 7.69 | 173% | 2.48 | 53.3% | 3.84 | 86.4% | 7.729 | -6.08 |
| 9 | 6.4 | 3.2 | 1.6 | 20 | 22.0% | 4.52 | 4.99 | 111% | 7.81 | 173% | 2.50 | 53.3% | 3.90 | 86.4% | 7.976 | -6.27 |
| 10 | 6.5 | 3.25 | 1.625 | 20 | 22.0% | 4.59 | 5.07 | 111% | 7.93 | 173% | 2.54 | 53.3% | 3.97 | 86.4% | 8.228 | -6.47 |
| 11 | 6.6 | 3.3 | 1.65 | 20 | 22.0% | 4.66 | 5.15 | 111% | 8.05 | 173% | 2.57 | 53.3% | 4.03 | 86.4% | 8.483 | -6.67 |
| 12 | 6.7 | 3.35 | 1.675 | 20 | 22.0% | 4.73 | 5.23 | 111% | 8.17 | 173% | 2.61 | 53.3% | 4.09 | 86.4% | 8.742 | -6.87 |
| 13 | 6.8 | 3.4 | 1.7 | 20 | 22.0% | 4.80 | 5.30 | 111% | 8.30 | 173% | 2.65 | 53.3% | 4.15 | 86.4% | 9.005 | -7.08 |
| 14 | 6.9 | 3.45 | 1.725 | 20 | 22.0% | 4.57 | 5.38 | 111% | 8.42 | 173% | 2.69 | 53.3% | 4.21 | 86.4% | 9.271 | -7.29 |
| 15 | 7 | 3.5 | 1.75 | 20 | 22.0% | 4.94 | 5.46 | 111% | 8.54 | 173% | 2.73 | 53.3% | 4.27 | 86.4% | 9.542 | -7.50 |

STANDARD CARTIRDGE WITH SEAL ON I.D.

| 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|
| $Ds1=Ds$ AS A FUNCTION OF $Do\_MIN$ & $Dl\_MIN$ | $Ds1$ AS A % OF $Db$ | $Ae(Ds\_CALC, Do\_MIN, Dl\_MAX)$ | $Ds1=Ds$ AS A FUNCTION OF $Do\_MIN$ & $Dl\_MAX$ | $Ds1$ AS A % OF $Db$ | $Ae(Ds\_CALC, Do\_MAX, Dl\_MIN)$ | $Ds1=Ds$ AS A FUNCTION OF $Do\_MAX$ & $Dl\_MIN$ | $Ds1$ AS A % OF $Db$ | $Ae(Ds\_CALC, Do\_MAX, Dl\_MAX)$ | $Ds1=Ds$ AS A FUNCTION OF $Do\_MAX$ & $Dl\_MAX$ | $Ds1$ AS A % OF $Ds$ CALC (ie % OF $Db$ Col.6) | $Ae(Ds=Db, Do\_MIN, Dl\_MIN)$ % ASTD | $Ae(Ds=Db, Do\_MIN, Dl\_MAX)$ % ASTD | $Ae(Ds=Db, Do\_MAX, Dl\_MIN)$ % ASTD | $Ae(Ds=Db, Do\_MAX, Dl\_MAX)$ % ASTD |
| 3.08 | 0.780 | -0.59 | 3.85 | 0.975 | -0.59 | 3.85 | 0.975 | 5.99 | 4.82 | 1.220 | 78.6% | 9.7% | 9.7% | 98.1% |
| 3.14 | 0.780 | -0.61 | 3.92 | 0.975 | -0.61 | 3.92 | 0.975 | 6.21 | 4.91 | 1.220 | 78.6% | 9.7% | 9.7% | 98.1% |
| 3.19 | 0.780 | -0.64 | 3.99 | 0.975 | -0.64 | 3.99 | 0.975 | 6.43 | 4.99 | 1.220 | 78.6% | 9.7% | 9.7% | 98.1% |
| 3.25 | 0.780 | -0.66 | 4.06 | 0.975 | -0.66 | 4.06 | 0.975 | 6.65 | 5.08 | 1.220 | 78.6% | 9.7% | 9.7% | 98.1% |
| 3.30 | 0.780 | -0.68 | 4.13 | 0.975 | -0.68 | 4.13 | 0.975 | 6.88 | 5.17 | 1.220 | 78.6% | 9.7% | 9.7% | 98.1% |
| 3.36 | 0.780 | -0.70 | 4.20 | 0.975 | -0.70 | 4.20 | 0.975 | 7.11 | 5.25 | 1.220 | 78.6% | 9.7% | 9.7% | 98.1% |
| 3.41 | 0.780 | -0.73 | 4.27 | 0.975 | -0.73 | 4.27 | 0.975 | 7.34 | 5.34 | 1.220 | 78.6% | 9.7% | 9.7% | 98.1% |
| 3.47 | 0.780 | -0.75 | 4.34 | 0.975 | -0.75 | 4.34 | 0.975 | 7.58 | 5.42 | 1.220 | 78.6% | 9.7% | 9.7% | 98.1% |
| 3.52 | 0.780 | -0.78 | 4.41 | 0.975 | -0.78 | 4.41 | 0.975 | 7.82 | 5.51 | 1.220 | 78.6% | 9.7% | 9.7% | 98.1% |
| 3.58 | 0.780 | -0.80 | 4.47 | 0.975 | -0.80 | 4.47 | 0.975 | 8.07 | 5.60 | 1.220 | 78.6% | 9.7% | 9.7% | 98.1% |
| 3.63 | 0.780 | -0.82 | 4.54 | 0.975 | -0.82 | 4.54 | 0.975 | 8.32 | 5.68 | 1.220 | 78.6% | 9.7% | 9.7% | 98.1% |
| 3.69 | 0.780 | -0.85 | 4.61 | 0.975 | -0.85 | 4.61 | 0.975 | 8.57 | 5.77 | 1.220 | 78.6% | 9.7% | 9.7% | 98.1% |
| 3.74 | 0.780 | -0.88 | 4.68 | 0.975 | -0.88 | 4.68 | 0.975 | 8.83 | 5.85 | 1.220 | 78.6% | 9.7% | 9.7% | 98.1% |
| 3.80 | 0.780 | -0.90 | 4.75 | 0.975 | -0.90 | 4.75 | 0.975 | 9.09 | 5.94 | 1.220 | 78.6% | 9.7% | 9.7% | 98.1% |
| 3.85 | 0.780 | -0.93 | 4.82 | 0.975 | -0.93 | 4.82 | 0.975 | 9.36 | 6.03 | 1.220 | 78.6% | 9.7% | 9.7% | 98.1% |

| | | | | | | | | | | | | |
|---|---|---|---|---|---|---|---|---|---|---|---|---|
| 16 | 7.1 | 3.55 | 1.775 | 20 | 22.0% | 5.01 | 5.54 | 111% | 8.66 | 173% | 2.77 | 53.3% | 4.33 | 86.4% | 9.817 | −7.72 |
| 17 | 7.2 | 3.6 | 1.8 | 20 | 22.0% | 5.08 | 5.62 | 111% | 8.78 | 173% | 2.81 | 53.3% | 4.39 | 86.4% | 10.095 | −7.94 |
| 18 | 7.3 | 3.65 | 1.825 | 20 | 22.0% | 5.15 | 5.69 | 111% | 8.91 | 173% | 2.85 | 53.3% | 4.45 | 86.4% | 10.378 | −8.16 |
| 19 | 7.4 | 3.7 | 1.85 | 20 | 22.0% | 5.22 | 5.77 | 111% | 9.03 | 173% | 2.89 | 53.3% | 4.51 | 86.4% | 10.664 | −8.39 |
| 20 | 7.5 | 3.75 | 1.875 | 20 | 22.0% | 5.29 | 5.85 | 111% | 9.15 | 173% | 2.93 | 53.3% | 4.58 | 86.4% | 10.954 | −8.61 |
| 21 | 7.6 | 3.8 | 1.9 | 20 | 22.0% | 5.36 | 5.93 | 111% | 9.27 | 173% | 2.96 | 53.3% | 4.64 | 86.4% | 11.248 | −8.85 |
| 22 | 7.7 | 3.85 | 1.925 | 20 | 22.0% | 5.43 | 6.01 | 111% | 9.39 | 173% | 3.00 | 53.3% | 4.70 | 86.4% | 11.546 | −9.08 |
| 23 | 7.8 | 3.9 | 1.95 | 20 | 22.0% | 5.50 | 6.08 | 111% | 9.52 | 173% | 3.04 | 53.3% | 4.76 | 86.4% | 11.848 | −9.32 |
| 24 | 7.9 | 3.95 | 1.975 | 20 | 22.0% | 5.57 | 6.16 | 111% | 9.64 | 173% | 3.08 | 53.3% | 4.82 | 86.4% | 12.154 | −9.56 |
| 25 | 8 | 4 | 2 | 20 | 22.0% | 5.95 | 6.24 | 111% | 9.76 | 173% | 3.12 | 53.3% | 4.88 | 86.4% | 12.463 | −9.80 |
| 26 | 8.1 | 4.05 | 2.025 | 20 | 22.0% | 5.72 | 6.32 | 111% | 9.88 | 173% | 3.16 | 53.3% | 4.94 | 86.4% | 12.777 | −10.05 |
| 27 | 8.2 | 4.1 | 2.05 | 20 | 22.0% | 5.79 | 6.40 | 111% | 10.00 | 173% | 3.20 | 53.3% | 5.00 | 86.4% | 13.094 | −10.30 |
| 28 | 8.3 | 4.15 | 2.075 | 20 | 22.0% | 5.86 | 6.47 | 111% | 10.13 | 173% | 3.24 | 53.3% | 5.06 | 86.4% | 13.415 | −10.55 |
| 29 | 8.4 | 4.2 | 2.1 | 20 | 22.0% | 5.93 | 6.55 | 111% | 1025 | 173% | 3.28 | 53.3% | 5.12 | 86.4% | 13.741 | −10.81 |
| 30 | 8.5 | 4.25 | 2.125 | 20 | 22.0% | 6.00 | 6.63 | 111% | 10.37 | 173% | 3.32 | 53.3% | 5.19 | 86.4% | 14.070 | −11.07 |
| 31 | 8.6 | 4.3 | 2.15 | 20 | 22.0% | 6.07 | 6.71 | 111% | 1049 | 173% | 3.36 | 53.3% | 5.25 | 86.4% | 14.403 | −11.33 |
| 32 | 8.7 | 4.35 | 2.175 | 20 | 22.0% | 6.14 | 6.79 | 111% | 10.61 | 173% | 3.39 | 53.3% | 5.31 | 86.4% | 14.740 | −11.59 |
| 33 | 8.8 | 4.4 | 2.2 | 20 | 22.0% | 6.21 | 6.88 | 111% | 10.74 | 173% | 3.43 | 53.3% | 5.37 | 86.4% | 15.080 | −11.86 |
| 34 | 8.9 | 4.45 | 2.225 | 20 | 22.0% | 6.28 | 6.94 | 111% | 10.86 | 173% | 3.47 | 53.3% | 5.43 | 86.4% | 15.425 | −12.13 |
| 35 | 9 | 4.5 | 2.25 | 20 | 22.0% | 6.35 | 7.02 | 111% | 10.98 | 173% | 3.51 | 53.3% | 5.49 | 86.4% | 15.774 | −12.41 |
| 36 | 9.1 | 4.55 | 2.275 | 20 | 22.0% | 6.42 | 7.10 | 111% | 11.10 | 173% | 3.55 | 53.3% | 5.55 | 86.4% | 16.126 | −12.68 |
| 37 | 9.2 | 4.6 | 2.3 | 20 | 22.0% | 6.49 | 7.18 | 111% | 11.22 | 173% | 3.59 | 53.3% | 5.61 | 86.4% | 16.483 | −12.96 |
| 38 | 9.3 | 4.65 | 2.325 | 20 | 22.0% | 6.56 | 7.25 | 111% | 11.35 | 173% | 3.63 | 53.3% | 5.67 | 86.4% | 16.843 | −13.25 |
| 39 | 9.4 | 4.7 | 2.35 | 20 | 22.0% | 6.63 | 7.33 | 111% | 11.47 | 173% | 3.67 | 53.3% | 5.73 | 86.4% | 17.207 | −13.53 |
| 40 | 9.5 | 4.75 | 2.375 | 20 | 22.0% | 6.70 | 7.41 | 111% | 11.59 | 173% | 3.71 | 53.3% | 5.80 | 86.4% | 17.575 | −13.82 |
| 41 | 9.6 | 4.8 | 2.4 | 20 | 22.0% | 6.77 | 7.49 | 111% | 11.71 | 173% | 3.74 | 53.3% | 5.86 | 86.4% | 17.947 | −14.11 |
| 42 | 9.7 | 4.85 | 2.425 | 20 | 22.0% | 6.84 | 7.57 | 111% | 11.83 | 173% | 3.78 | 53.3% | 5.92 | 86.4% | 18.323 | −14.41 |
| 43 | 9.8 | 4.9 | 2.45 | 20 | 22.0% | 6.92 | 7.64 | 111% | 11.96 | 173% | 3.82 | 53.3% | 5.98 | 86.4% | 18.703 | −14.71 |
| 44 | 9.9 | 4.95 | 2.475 | 20 | 22.0% | 6.99 | 7.72 | 111% | 12.08 | 173% | 3.86 | 53.3% | 6.04 | 86.4% | 19.086 | −15.01 |
| 45 | 10 | 5 | 2.5 | 20 | 22.0% | 7.08 | 7.80 | 111% | 12.50 | 173% | 3.90 | 53.3% | 6.10 | 86.4% | 19.474 | −15.31 |

FIG. 23D

| | | | | | | | | | |
|---|---|---|---|---|---|---|---|---|---|
| 3.91 | 0.780 | -0.95 | 4.89 | 0.975 | -0.95 | 4.89 | 0.975 | 9.63 | 6.11 | 1.220 | 78.6% | 9.7% | 9.7% | 98.1% |
| 3.96 | 0.780 | -0.98 | 4.96 | 0.975 | -0.98 | 4.96 | 0.975 | 9.90 | 6.20 | 1.220 | 78.6% | 9.7% | 9.7% | 98.1% |
| 4.02 | 0.780 | -1.01 | 5.03 | 0.975 | -1.01 | 5.03 | 0.975 | 10.18 | 6.28 | 1.220 | 78.6% | 9.7% | 9.7% | 98.1% |
| 4.07 | 0.780 | -1.04 | 5.09 | 0.975 | -1.04 | 5.09 | 0.975 | 10.16 | 6.37 | 1.220 | 78.6% | 9.7% | 9.7% | 98.1% |
| 4.13 | 0.780 | -1.06 | 5.16 | 0.975 | -1.06 | 5.16 | 0.975 | 10.74 | 6.46 | 1.220 | 78.6% | 9.7% | 9.7% | 98.1% |
| 4.18 | 0.780 | -1.09 | 5.23 | 0.975 | -1.09 | 5.23 | 0.975 | 11.03 | 6.54 | 1.220 | 78.6% | 9.7% | 9.7% | 98.1% |
| 4.24 | 0.780 | -1.12 | 5.30 | 0.975 | -1.12 | 5.30 | 0.975 | 11.32 | 6.63 | 1.220 | 78.6% | 9.7% | 9.7% | 98.1% |
| 4.29 | 0.780 | -1.15 | 5.37 | 0.975 | -1.15 | 5.37 | 0.975 | 11.62 | 6.71 | 1.220 | 78.6% | 9.7% | 9.7% | 98.1% |
| 4.35 | 0.780 | -1.18 | 5.44 | 0.975 | -1.18 | 5.44 | 0.975 | 11.92 | 6.80 | 1.220 | 78.6% | 9.7% | 9.7% | 98.1% |
| 4.40 | 0.780 | -1.21 | 5.51 | 0.975 | -1.21 | 5.51 | 0.975 | 12.22 | 6.89 | 1.220 | 78.6% | 9.7% | 9.7% | 98.1% |
| 4.46 | 0.780 | -1.24 | 5.58 | 0.975 | -1.24 | 5.58 | 0.975 | 12.63 | 6.97 | 1.220 | 78.6% | 9.7% | 9.7% | 98.1% |
| 4.51 | 0.780 | -1.27 | 5.64 | 0.975 | -1.27 | 5.64 | 0.975 | 12.84 | 7.08 | 1.220 | 78.6% | 9.7% | 9.7% | 98.1% |
| 4.57 | 0.780 | -1.30 | 5.71 | 0.975 | -1.30 | 5.71 | 0.975 | 13.16 | 7.15 | 1.220 | 78.6% | 9.7% | 9.7% | 98.1% |
| 4.62 | 0.780 | -1.34 | 5.78 | 0.975 | -1.34 | 5.78 | 0.975 | 13.48 | 7.23 | 1.220 | 78.6% | 9.7% | 9.7% | 98.1% |
| 4.68 | 0.780 | -1.37 | 5.85 | 0.975 | -1.37 | 5.85 | 0.975 | 13.80 | 7.32 | 1.220 | 78.6% | 9.7% | 9.7% | 98.1% |
| 4.73 | 0.780 | -1.40 | 5.92 | 0.975 | -1.40 | 5.92 | 0.975 | 14.13 | 7.40 | 1.220 | 78.6% | 9.7% | 9.7% | 98.1% |
| 4.79 | 0.780 | -1.43 | 5.99 | 0.975 | -1.43 | 5.99 | 0.975 | 14.46 | 7.49 | 1.220 | 78.6% | 9.7% | 9.7% | 98.1% |
| 4.84 | 0.780 | -1.47 | 6.06 | 0.975 | -1.47 | 6.06 | 0.975 | 14.79 | 7.58 | 1.220 | 78.6% | 9.7% | 9.7% | 98.1% |
| 4.90 | 0.780 | -1.50 | 6.13 | 0.975 | -1.50 | 6.13 | 0.975 | 15.13 | 7.66 | 1.220 | 78.6% | 9.7% | 9.7% | 98.1% |
| 4.95 | 0.780 | -1.53 | 6.20 | 0.975 | -1.53 | 6.20 | 0.975 | 15.47 | 7.75 | 1.220 | 78.6% | 9.7% | 9.7% | 98.1% |
| 5.01 | 0.780 | -1.57 | 6.28 | 0.975 | -1.57 | 6.28 | 0.975 | 15.82 | 7.83 | 1.220 | 78.6% | 9.7% | 9.7% | 98.1% |
| 5.06 | 0.780 | -1.60 | 6.33 | 0.975 | -1.60 | 6.33 | 0.975 | 16.17 | 7.92 | 1.220 | 78.6% | 9.7% | 9.7% | 98.1% |
| 5.12 | 0.780 | -1.64 | 6.40 | 0.975 | -1.64 | 6.40 | 0.975 | 16.52 | 8.01 | 1.220 | 78.6% | 9.7% | 9.7% | 98.1% |
| 5.17 | 0.780 | -1.67 | 6.47 | 0.975 | -1.67 | 6.47 | 0.975 | 16.88 | 8.09 | 1.220 | 78.6% | 9.7% | 9.7% | 98.1% |
| 5.23 | 0.780 | -1.71 | 6.54 | 0.975 | -1.71 | 6.54 | 0.975 | 17.24 | 8.18 | 1.220 | 78.6% | 9.7% | 9.7% | 98.1% |
| 5.28 | 0.780 | -1.74 | 6.61 | 0.975 | -1.74 | 6.61 | 0.975 | 17.60 | 8.26 | 1.220 | 78.6% | 9.7% | 9.7% | 98.1% |
| 5.34 | 0.780 | -1.78 | 6.68 | 0.975 | -1.78 | 6.68 | 0.975 | 17.97 | 8.35 | 1.220 | 78.6% | 9.7% | 9.7% | 98.1% |
| 5.39 | 0.780 | -1.82 | 6.75 | 0.975 | -1.82 | 6.75 | 0.975 | 18.34 | 8.44 | 1.220 | 78.6% | 9.7% | 9.7% | 98.1% |
| 5.45 | 0.780 | -1.88 | 6.81 | 0.975 | -1.88 | 6.81 | 0.975 | 18.72 | 8.52 | 1.220 | 78.6% | 9.7% | 9.7% | 98.1% |
| 5.50 | 0.780 | -1.89 | 6.88 | 0.975 | -1.89 | 6.88 | 0.975 | 19.10 | 8.61 | 1.220 | 78.6% | 9.7% | 9.7% | 98.1% |

GROUP 3 / 7% GAP / NEW DESIGN VS

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| | Do | Di | PIT DEPTH | PIT CNT | GAP (% OF Do) | Ds/CALC (ie Db) | Do MIN | Do MIN AS A % OF Ds/CALC | Do MAX | Do MAX AS A% OF Ds/CALC | Di MIN | Di MIN AS A % OF Ds/CALC | Di MAX | Di MAX AS A% OF Ds/CALC | Astd(Ds=Di, Do, Di) | Ae(Ds_CALC, Do_MIN, Di_MIN) |
| 1 | 1.5 | 0.75 | 0.375 | 20 | 7.0% | 1.06 | 1.40 | 132% | 1.61 | 152% | 0.70 | 65.9% | 0.80 | 75.8% | 0.438 | −0.12 |
| 2 | 1.6 | 0.8 | 0.4 | 20 | 7.0% | 1.13 | 1.49 | 132% | 1.71 | 152% | 0.74 | 65.9% | 0.86 | 75.8% | 0.499 | −0.14 |
| 3 | 1.7 | 0.85 | 0.425 | 20 | 7.0% | 1.20 | 1.58 | 132% | 1.82 | 152% | 0.79 | 65.9% | 0.91 | 75.8% | 0.563 | −0.15 |
| 4 | 1.8 | 0.9 | 0.45 | 20 | 7.0% | 1.27 | 1.67 | 132% | 1.93 | 152% | 0.84 | 65.9% | 0.96 | 75.8% | 0.631 | −0.17 |
| 5 | 1.9 | 0.95 | 1.475 | 20 | 7.0% | 1.34 | 1.77 | 132% | 2.03 | 152% | 0.88 | 65.9% | 1.02 | 75.8% | 0.703 | −0.19 |
| 6 | 2 | 1 | 0.5 | 20 | 7.0% | 1.41 | 1.86 | 132% | 2.14 | 152% | 0.93 | 65.9% | 1.07 | 75.8% | 0.779 | −0.21 |
| 7 | 2.1 | 1.05 | 0.525 | 20 | 7.0% | 1.48 | 1.95 | 132% | 2.25 | 152% | 0.98 | 65.9% | 1.12 | 75.8% | 0.859 | −0.23 |
| 8 | 2.2 | 1.1 | 0.55 | 20 | 7.0% | 1.55 | 2.05 | 132% | 2.35 | 152% | 1.02 | 65.9% | 1.18 | 75.8% | 0.943 | −0.26 |
| 9 | 2.3 | 1.15 | 0.575 | 20 | 7.0% | 1.62 | 2.14 | 132% | 2.46 | 152% | 1.07 | 65.9% | 1.23 | 75.8% | 1.030 | −0.28 |
| 10 | 2.4 | 1.2 | 0.6 | 20 | 7.0% | 1.69 | 2.23 | 132% | 2.57 | 152% | 1.12 | 65.9% | 1.28 | 75.8% | 1.122 | −0.30 |

FIG. 24B

STANDARD CARTIRDGE WITH SEAL ON I.D.

| 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|
| $Ds_1$=Ds AS A FUNCTION OF Do_MIN & Dl_MIN | $Ds_1$ AS A % OF Db | Ae($Ds\_CALC$, Do_MIN, Dl_MAX) | $Ds_1$=Ds AS A FUNCTION OF Do_MIN & Dl_MAX | $Ds_1$ AS A % OF Db | Ae($Ds\_CALC$, Do_MAX, Dl_MIN) | $Ds_1$=Ds AS A FUNTION OF Do_MAX & Dl_MIN | $Ds_1$ AS A % OF Db | Ae($Ds\_CALC$, Do_MAX, Dl_MAX) | $Ds_1$=Ds AS A FUNTION OF Do_MAX & Dl_MAX | $Ds_1$ AS A % OF Ds CALC (ie % OF Db Col.6) | Ae(Ds=Db, Do_MIN, Dl_MIN) % ASTD | Ae(Ds=Db, Do_MIN, Dl_MAX) % ASTD | Ae(Ds=Db, Do_MAX, Dl_MIN) % ASTD | Ae(Ds=Db, Do_MAX, Dl_MAX) % ASTD |
| 0.98 | 0.930 | 0.00 | 1.06 | 0.998 | 0.00 | 1.06 | 0.998 | 0.13 | 1.13 | 1.070 | 27.1% | 1.0% | 1.0% | 29.1% |
| 1.05 | 0.930 | 0.00 | 1.13 | 0.998 | 0.00 | 1.13 | 0.998 | 0.15 | 1.21 | 1.070 | 27.1% | 1.0% | 1.0% | 29.1% |
| 1.12 | 0.930 | -0.01 | 1.20 | 0.998 | -0.01 | 1.20 | 0.998 | 0.16 | 1.28 | 1.070 | 27.1% | 1.0% | 1.0% | 29.1% |
| 1.18 | 0.930 | -0.01 | 1.27 | 0.998 | -0.01 | 1.27 | 0.998 | 0.16 | 1.36 | 1.070 | 27.1% | 1.0% | 1.0% | 29.1% |
| 1.25 | 0.930 | -0.01 | 1.34 | 0.998 | -0.01 | 1.34 | 0.998 | 0.20 | 1.43 | 1.070 | 27.1% | 1.0% | 1.0% | 29.1% |
| 1.31 | 0.930 | -0.01 | 1.41 | 0.998 | -0.01 | 1.41 | 0.998 | 0.23 | 1.51 | 1.070 | 27.1% | 1.0% | 1.0% | 29.1% |
| 1.36 | 0.930 | -0.01 | 1.46 | 0.998 | -0.01 | 1.46 | 0.998 | 0.25 | 1.59 | 1.070 | 27.1% | 1.0% | 1.0% | 29.1% |
| 1.44 | 0.930 | -0.01 | 1.55 | 0.998 | -0.01 | 1.55 | 0.998 | 0.27 | 1.66 | 1.070 | 27.1% | 1.0% | 1.0% | 29.1% |
| 1.51 | 0.930 | -0.01 | 1.62 | 0.998 | -0.01 | 1.62 | 0.998 | 0.30 | 1.74 | 1.070 | 27.1% | 1.0% | 1.0% | 29.1% |
| 1.58 | 0.930 | -0.01 | 1.69 | 0.998 | -0.01 | 1.69 | 0.998 | 0.33 | 1.81 | 1.070 | 27.1% | 1.0% | 1.0% | 29.1% |

FIG. 25

FIG. 25A — GROUP 3 / 12% GAP / NEW DESIGN VS STANDARD CARTRIDGE WITH SEAL ON I.D.

FIG. 25B

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| | Do | Di | PIT DEPTH | PIT CNT | GAP (% of Do) | Ds/CALC (ie Db) | Do MIN | Do MIN AS A % OF Ds/CALC | Do MAX | Do MAX AS A% OF DS/CALC | Di MIN | Di MIN AS A % OF Ds/CALC | Di MAX | Di MAX AS A % OF Ds/CALC | Astd(Ds=Di, Do, DI) | Ae(Ds_CALC, Do_MIN, DI_MIN) | Ds1=Ds AS A FUNCTION OF Do_MIN & DI_MIN | Ds1 AS A % OF Db | Ae(Ds_CALC, Do_MIN, DI_MAX) | Ds1=Ds AS A FUNCTION OF Do_MIN & DI_MAX | Ds1 AS A % OF Db | Ae(Ds_CALC, Do_MAX, DI_MIN) | Ds1=Ds AS A FUNCTION OF Do_MAX & DI_MIN | Ds1 AS A % OF Db | Ae(Ds_CALC, Do_MAX, DI_MAX) | Ds1=Ds AS A FUNCTION OF Do_MAX & DI_MAX | Ds1 AS A % OF Ds CALC (ie % OF Db Col.6) | Ae(Ds=Db, Do_MIN, DI_MIN) ASTD % | Ae(Ds=Db, Do_MIN, DI_MAX) ASTD % | Ae(Ds=Db, Do_MAX, DI_MIN) ASTD % | Ae(Ds=Db, Do_MAX, DI_MAX) ASTD % |
| 1 | 1.5 | 0.75 | 0.375 | 20 | 12.0% | 1.06 | 1.32 | 125% | 1.68 | 159% | 0.66 | 62.4% | 0.84 | 79.4% | 0.438 | -0.20 | 0.93 | 0.880 | -0.01 | 1.05 | 0.993 | -0.01 | 1.05 | 0.993 | 0.22 | 1.19 | 1.120 | 45.3% | 2.9% | 2.9% | 51.1% |
| 2 | 1.6 | 0.8 | 0.4 | 20 | 12.0% | 1.13 | 1.41 | 125% | 1.79 | 159% | 0.70 | 62.4% | 0.90 | 79.4% | 0.499 | -0.23 | 0.99 | 0.880 | -0.01 | 1.12 | 0.993 | -0.01 | 1.12 | 0.993 | 0.25 | 1.26 | 1.120 | 45.3% | 2.9% | 2.9% | 51.1% |
| 3 | 1.7 | 0.85 | 0.425 | 20 | 12.0% | 1.20 | 1.50 | 125% | 1.90 | 159% | 0.75 | 62.4% | 0.95 | 79.4% | 0.563 | -0.25 | 1.06 | 0.880 | -0.02 | 1.19 | 0.993 | -0.02 | 1.19 | 0.993 | 0.29 | 1.34 | 1.120 | 45.3% | 2.9% | 2.9% | 51.1% |
| 4 | 1.8 | 0.9 | 0.45 | 20 | 12.0% | 1.27 | 1.58 | 125% | 2.02 | 159% | 0.79 | 62.4% | 1.01 | 79.4% | 0.631 | -0.29 | 1.12 | 0.880 | -0.02 | 1.26 | 0.993 | -0.02 | 1.26 | 0.993 | 0.32 | 1.42 | 1.120 | 45.3% | 2.9% | 2.9% | 51.1% |
| 5 | 1.9 | 0.95 | 0.475 | 20 | 12.0% | 1.34 | 1.67 | 125% | 2.13 | 159% | 0.84 | 62.4% | 1.06 | 79.4% | 0.703 | -0.32 | 1.18 | 0.880 | -0.02 | 1.33 | 0.993 | -0.02 | 1.33 | 0.993 | 0.36 | 1.50 | 1.120 | 45.3% | 2.9% | 2.9% | 51.1% |
| 6 | 2 | 1 | 0.5 | 20 | 12.0% | 1.41 | 1.76 | 125% | 2.24 | 159% | 0.88 | 62.4% | 1.12 | 79.4% | 0.779 | -0.35 | 1.24 | 0.880 | -0.02 | 1.40 | 0.993 | -0.02 | 1.40 | 0.993 | 0.40 | 1.58 | 1.120 | 45.3% | 2.9% | 2.9% | 51.1% |
| 7 | 2.1 | 1.05 | 0.525 | 20 | 12.0% | 1.48 | 1.85 | 125% | 2.35 | 159% | 0.92 | 62.4% | 1.18 | 79.4% | 0.859 | -0.39 | 1.30 | 0.880 | -0.02 | 1.47 | 0.993 | -0.02 | 1.47 | 0.993 | 0.44 | 1.66 | 1.120 | 45.3% | 2.9% | 2.9% | 51.1% |
| 8 | 2.2 | 1.1 | 0.55 | 20 | 12.0% | 1.55 | 1.94 | 125% | 2.46 | 159% | 0.97 | 62.4% | 1.23 | 79.4% | 0.943 | -0.43 | 1.37 | 0.880 | -0.03 | 1.54 | 0.993 | -0.03 | 1.54 | 0.993 | 0.48 | 1.74 | 1.120 | 45.3% | 2.9% | 2.9% | 51.1% |
| 9 | 2.3 | 1.15 | 0.575 | 20 | 12.0% | 1.62 | 2.02 | 125% | 2.58 | 159% | 1.01 | 62.4% | 1.29 | 79.4% | 1.030 | -0.47 | 1.43 | 0.880 | -0.03 | 1.61 | 0.993 | -0.03 | 1.61 | 0.993 | 0.53 | 1.82 | 1.120 | 45.3% | 2.9% | 2.9% | 51.1% |
| 10 | 2.4 | 1.2 | 0.6 | 20 | 12.0% | 1.69 | 2.11 | 125% | 2.69 | 159% | 1.06 | 62.4% | 1.34 | 79.4% | 1.122 | -0.51 | 1.49 | 0.880 | -0.03 | 1.68 | 0.993 | -0.03 | 1.68 | 0.993 | 0.57 | 1.90 | 1.120 | 45.3% | 2.9% | 2.9% | 51.1% |

FIG. 25A

GROUP 3 / 12% GAP / NEW DESIGN VS

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| | Do | DI | PIT DEPTH | PIT CNT | GAP (% of Do) | Ds/CALC (ie Db) | Do MIN | Do MIN AS A % OF Ds/CALC | Do MAX | Do MAX AS A% OF Ds/CALC | DI MIN | DI MIN AS A % OF Ds/CALC | DI MAX | DI MAX AS A% OF Ds/CALC | Astd(Ds=DI, Do, DI) | Ae(Ds_CALC, Do_MIN, DI_MIN) |
| 1 | 1.5 | 0.75 | 0.375 | 20 | 12.0% | 1.06 | 1.32 | 125% | 1.68 | 159% | 0.66 | 62.4% | 0.84 | 79.4% | 0.438 | −0.20 |
| 2 | 1.6 | 0.8 | 0.4 | 20 | 12.0% | 1.13 | 1.41 | 125% | 1.79 | 159% | 0.70 | 62.4% | 0.90 | 79.4% | 0.499 | −0.23 |
| 3 | 1.7 | 0.85 | 0.425 | 20 | 12.0% | 1.20 | 1.50 | 125% | 1.90 | 159% | 0.75 | 62.4% | 0.95 | 79.4% | 0.563 | −0.25 |
| 4 | 1.8 | 0.9 | 0.45 | 20 | 12.0% | 1.27 | 1.58 | 125% | 2.02 | 159% | 0.79 | 62.4% | 1.01 | 79.4% | 0.631 | −0.29 |
| 5 | 1.9 | 0.95 | 1.475 | 20 | 12.0% | 1.34 | 1.67 | 125% | 2.13 | 159% | 0.84 | 62.4% | 1.06 | 79.4% | 0.703 | −0.32 |
| 6 | 2 | 1 | 0.5 | 20 | 12.0% | 1.41 | 1.76 | 125% | 2.24 | 159% | 0.88 | 62.4% | 1.12 | 79.4% | 0.779 | −0.35 |
| 7 | 2.1 | 1.05 | 0.525 | 20 | 12.0% | 1.48 | 1.85 | 125% | 2.35 | 159% | 0.92 | 62.4% | 1.18 | 79.4% | 0.859 | −0.39 |
| 8 | 2.2 | 1.1 | 0.55 | 20 | 12.0% | 1.55 | 1.94 | 125% | 2.46 | 159% | 0.97 | 62.4% | 1.23 | 79.4% | 0.943 | −0.43 |
| 9 | 2.3 | 1.15 | 0.575 | 20 | 12.0% | 1.62 | 2.02 | 125% | 2.58 | 159% | 1.01 | 62.4% | 1.29 | 79.4% | 1.030 | −0.47 |
| 10 | 2.4 | 1.2 | 0.6 | 20 | 12.0% | 1.69 | 2.11 | 125% | 2.69 | 159% | 1.06 | 62.4% | 1.34 | 79.4% | 1.122 | −0.51 |

FIG. 25B

STANDARD CARTIRDGE WITH SEAL ON I.D.

| 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|
| Ds1=Ds AS A FUNCTION OF Do_MIN & Dl_MIN | Ds1 AS A % OF Db | Ae(Ds_CALC, Do_MIN, Dl_MAX | Ds1=Ds AS A FUNTION OF Do_MIN & Dl_MAX | Ds1 AS A % OF Db | Ae(Ds_CALC, Do_MAX, Dl_MIN) | Ds1=Ds AS A FUNTION OF Do_MAX & Dl_MIN | Ds1 AS A % OF Db | Ae(Ds_CALC, Do_MAX, Dl_MAX) | Ds1=Ds AS A FUNTION OF Do_MAX & Dl_MAX | Ds1 AS A % OF Ds CALC (ie % OF Db Col.6) | Ae(Ds=Db, Do_MIN, Dl_MIN) % ASTD | Ae(Ds=Db, Do_MIN, Dl_MAX) % ASTD | Ae(Ds=Db, Do_MAX, Dl_MIN) % ASTD | Ae(Ds=Db, Do_MAX, Dl_MAX) % ASTD |
| 0.93 | 0.880 | −0.01 | 1.05 | 0.993 | −0.01 | 1.05 | 0.993 | 0.22 | 1.19 | 1.120 | 45.3% | 2.9% | 2.9% | 51.1% |
| 0.99 | 0.880 | −0.01 | 1.12 | 0.993 | −0.01 | 1.12 | 0.993 | 0.25 | 1.26 | 1.120 | 45.3% | 2.9% | 2.9% | 51.1% |
| 1.06 | 0.880 | −0.02 | 1.19 | 0.993 | −0.02 | 1.19 | 0.993 | 0.29 | 1.34 | 1.120 | 45.3% | 2.9% | 2.9% | 51.1% |
| 1.12 | 0.880 | −0.02 | 1.26 | 0.993 | −0.02 | 1.26 | 0.993 | 0.32 | 1.42 | 1.120 | 45.3% | 2.9% | 2.9% | 51.1% |
| 1.18 | 0.880 | −0.02 | 1.33 | 0.993 | −0.02 | 1.33 | 0.993 | 0.36 | 1.50 | 1.120 | 45.3% | 2.9% | 2.9% | 51.1% |
| 1.24 | 0.880 | −0.02 | 1.40 | 0.993 | −0.02 | 1.40 | 0.993 | 0.40 | 1.58 | 1.120 | 45.3% | 2.9% | 2.9% | 51.1% |
| 1.30 | 0.880 | −0.02 | 1.47 | 0.993 | −0.02 | 1.47 | 0.993 | 0.44 | 1.66 | 1.120 | 45.3% | 2.9% | 2.9% | 51.1% |
| 1.37 | 0.880 | −0.03 | 1.54 | 0.993 | −0.03 | 1.54 | 0.993 | 0.48 | 1.74 | 1.120 | 45.3% | 2.9% | 2.9% | 51.1% |
| 1.43 | 0.880 | −0.03 | 1.61 | 0.993 | −0.03 | 1.61 | 0.993 | 0.53 | 1.82 | 1.120 | 45.3% | 2.9% | 2.9% | 51.1% |
| 1.49 | 0.880 | −0.03 | 1.68 | 0.993 | −0.03 | 1.68 | 0.993 | 0.57 | 1.90 | 1.120 | 45.3% | 2.9% | 2.9% | 51.1% |

GROUP 3 / 22% GAP / NEW DESIGN VS STANDARD CARTIRDGE WITH SEAL ON I.D.

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| | Do | Di | PIT DEPTH | PIT CNT | GAP (% OF Do) | Ds/CALC (ie Db) | Do MIN | Do MIN AS A % OF Ds/CALC | Do MAX | Do MAX AS A % OF Ds/CALC | Di MIN | Di MIN AS A % OF Ds/CALC | Di MAX | Di MAX AS % OF Ds/CALC | Astd(Ds=Di, Do, DI) | Ae(Ds_CALC, Do_MIN, DI_MIN) |
| 1 | 1.5 | 0.75 | 0.375 | 20 | 22.0% | 1.06 | 1.17 | 111% | 1.83 | 173% | 0.59 | 55.3% | 0.92 | 86.4% | 0.438 | −0.34 |
| 2 | 1.6 | 0.8 | 0.4 | 20 | 22.0% | 1.13 | 1.25 | 111% | 1.95 | 173% | 0.62 | 55.3% | 0.98 | 86.4% | 0.499 | −0.39 |
| 3 | 1.7 | 0.85 | 0.425 | 20 | 22.0% | 1.20 | 1.33 | 111% | 2.07 | 173% | 0.66 | 55.3% | 1.04 | 86.4% | 0.563 | −0.44 |
| 4 | 1.8 | 0.9 | 0.45 | 20 | 22.0% | 1.27 | 1.40 | 111% | 2.20 | 173% | 0.70 | 55.3% | 1.10 | 86.4% | 0.631 | −0.50 |
| 5 | 1.9 | 0.95 | 0.475 | 20 | 22.0% | 1.34 | 1.48 | 111% | 2.32 | 173% | 0.74 | 55.3% | 1.16 | 86.4% | 0.703 | −0.55 |
| 6 | 2 | 1 | 0.5 | 20 | 22.0% | 1.41 | 1.56 | 111% | 2.44 | 173% | 0.78 | 55.3% | 1.22 | 86.4% | 0.779 | −0.61 |
| 7 | 2.1 | 1.05 | 0.525 | 20 | 22.0% | 1.48 | 1.64 | 111% | 2.56 | 173% | 0.82 | 55.3% | 1.28 | 86.4% | 0.859 | −0.68 |
| 8 | 2.2 | 1.1 | 0.55 | 20 | 22.0% | 1.55 | 1.72 | 111% | 2.68 | 173% | 0.86 | 55.3% | 1.34 | 86.4% | 0.943 | −0.74 |
| 9 | 2.3 | 1.15 | 0.575 | 20 | 22.0% | 1.62 | 1.79 | 111% | 2.81 | 173% | 0.90 | 55.3% | 1.40 | 86.4% | 1.030 | −0.81 |
| 10 | 2.4 | 1.2 | 0.6 | 20 | 22.0% | 1.69 | 1.87 | 111% | 2.93 | 173% | 0.94 | 55.3% | 1.46 | 86.4% | 1.122 | −0.88 |

FIG. 26B

| | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|
| | Ds1=Ds AS A FUNCTION OF Do_MIN & DI_MIN | Ds1 AS A % OF Db | Ae(Ds_CALC, Do_MIN, DI_MAX | Ds1=Ds AS A FUNTION OF Do_MIN & DI_MAX | Ds1 AS A % OF Db | Ae(Ds_CALC, Do_MAX, DI_MIN) | Ds1=Ds AS A FUNTION OF Do_MAX & DI_MIN | Ds1 AS A % OF Db | Ae(Ds_CALC, Do_MAX, DI_MAX) | Ds1=Ds AS A FUNTION OF Do_MAX & DI_MAX | Ds1 AS A % OF Db CALC (ie % OF Db Col.6) | Ae(Ds=Db, Do_MIN, DI_MIN) %STD | Ae(Ds=Db, Do_MIN, DI_MAX) %STD | Ae(Ds=Db, Do_MAX, DI_MIN) %STD | Ae(Ds=Db, Do_MAX, DI_MAX) %STD |
| 1 | 0.83 | 0.780 | −0.04 | 1.03 | 0.975 | −0.04 | 1.03 | 0.975 | 0.43 | 1.29 | 1.220 | 78.6% | 9.7% | 9.7% | 98.1% |
| 2 | 0.88 | 0.780 | −0.05 | 1.10 | 0.975 | −0.05 | 1.10 | 0.975 | 0.49 | 1.38 | 1.220 | 78.6% | 9.7% | 9.7% | 98.1% |
| 3 | 0.94 | 0.780 | −0.05 | 1.17 | 0.975 | −0.05 | 1.17 | 0.975 | 0.55 | 1.46 | 1.220 | 78.6% | 9.7% | 9.7% | 98.1% |
| 4 | 0.99 | 0.780 | −0.06 | 1.24 | 0.975 | −0.06 | 1.24 | 0.975 | 0.62 | 1.55 | 1.220 | 78.6% | 9.7% | 9.7% | 98.1% |
| 5 | 1.05 | 0.780 | −0.06 | 1.31 | 0.975 | −0.06 | 1.31 | 0.975 | 0.69 | 1.64 | 1.220 | 78.6% | 9.7% | 9.7% | 98.1% |
| 6 | 1.10 | 0.780 | −0.07 | 1.38 | 0.975 | −0.07 | 1.38 | 0.975 | 0.76 | 1.72 | 1.220 | 78.6% | 9.7% | 9.7% | 98.1% |
| 7 | 1.16 | 0.780 | −0.08 | 1.45 | 0.975 | −0.08 | 1.45 | 0.975 | 0.84 | 1.81 | 1.220 | 78.6% | 9.7% | 9.7% | 98.1% |
| 8 | 1.21 | 0.780 | −0.09 | 1.51 | 0.975 | −0.09 | 1.51 | 0.975 | 0.92 | 1.89 | 1.220 | 78.6% | 9.7% | 9.7% | 98.1% |
| 9 | 1.27 | 0.780 | −0.10 | 1.58 | 0.975 | −0.10 | 1.58 | 0.975 | 1.01 | 1.98 | 1.220 | 78.6% | 9.7% | 9.7% | 98.1% |
| 10 | 1.32 | 0.780 | −0.11 | 1.65 | 0.975 | −0.11 | 1.65 | 0.975 | 1.10 | 2.07 | 1.220 | 78.6% | 9.7% | 9.7% | 98.1% |

FIG. 26A

GROUP 3 / 22% GAP / NEW DESIGN

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| | Do | Di | PIT DEPTH | PIT CNT | GAP (% of Do) | Ds/CALC (ie Dp) | Do MIN | Do MIN AS A % OF Ds/CALC | Do MAX | Do MAX AS A% OF Ds/CALC | Di MIN | Di MIN AS A % OF Ds/CALC | Di MAX | Di MAX AS A% OF Ds/CALC | Astd(Ds=Di, Do, DI) | Ae(Ds_CALC, Do_MIN, DI_MIN) |
| 1 | 1.5 | 0.75 | 0.375 | 20 | 22.0% | 1.06 | 1.17 | 111% | 1.83 | 173% | 0.59 | 55.3% | 0.92 | 86.4% | 0.438 | −0.34 |
| 2 | 1.6 | 0.8 | 0.4 | 20 | 22.0% | 1.13 | 1.25 | 111% | 1.95 | 173% | 0.62 | 55.3% | 0.98 | 86.4% | 0.499 | −0.39 |
| 3 | 1.7 | 0.85 | 0.425 | 20 | 22.0% | 1.20 | 1.33 | 111% | 2.07 | 173% | 0.66 | 55.3% | 1.04 | 86.4% | 0.563 | −0.44 |
| 4 | 1.8 | 0.9 | 0.45 | 20 | 22.0% | 1.27 | 1.40 | 111% | 2.20 | 173% | 0.70 | 55.3% | 1.10 | 86.4% | 0.631 | −0.50 |
| 5 | 1.9 | 0.95 | 1.475 | 20 | 22.0% | 1.34 | 1.48 | 111% | 2.32 | 173% | 0.74 | 55.3% | 1.16 | 86.4% | 0.703 | −0.55 |
| 6 | 2 | 1 | 0.5 | 20 | 22.0% | 1.41 | 1.56 | 111% | 2.44 | 173% | 0.78 | 55.3% | 1.22 | 86.4% | 0.779 | −0.61 |
| 7 | 2.1 | 1.05 | 0.525 | 20 | 22.0% | 1.48 | 1.64 | 111% | 2.56 | 173% | 0.82 | 55.3% | 1.28 | 86.4% | 0.859 | −0.68 |
| 8 | 2.2 | 1.1 | 0.55 | 20 | 22.0% | 1.55 | 1.72 | 111% | 2.68 | 173% | 0.86 | 55.3% | 1.34 | 86.4% | 0.943 | −0.74 |
| 9 | 2.3 | 1.15 | 0.575 | 20 | 22.0% | 1.62 | 1.79 | 111% | 2.81 | 173% | 0.90 | 55.3% | 1.40 | 86.4% | 1.030 | −0.81 |
| 10 | 2.4 | 1.2 | 0.6 | 20 | 22.0% | 1.69 | 1.87 | 111% | 2.93 | 173% | 0.94 | 55.3% | 1.46 | 86.4% | 1.122 | −0.88 |

FIG. 26B

STANDARD CARTIRDGE WITH SEAL ON I.D.

| 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|
| Ds1=Ds AS A FUNCTION OF Do_MIN & DI_MIN | Ds1 AS A % OF Db | Δe(Ds_CALC, Do_MIN, DI_MAX) | Ds1=Ds AS A FUNTION OF Do_MIN & DI_MAX | Ds1 AS A % OF Db | Δe(Ds_CALC, Do_MAX, DI_MIN) | Ds1=Ds AS A FUNTION OF Do_MAX & DI_MIN | Ds1 AS A % OF Db | Δe(Ds_CALC, Do_MAX, DI_MAX) | Ds1=Ds AS A FUNTION OF Do_MAX & DI_MAX | Ds1 AS A % OF Ds CALC (ie % OF Db Col.6) | Δe(Ds=Db, Do_MIN, DI_MIN) % ASTD | Δe(Ds=Db, Do_MIN, DI_MAX) % ASTD | Δe(Ds=Db, Do_MAX, DI_MIN) % ASTD | Δe(Ds=Db, Do_MAX, DI_MAX) % ASTD |
| 0.83 | 0.780 | −0.041 | 1.03 | 0.975 | −0.041 | 1.03 | 0.975 | 0.43 | 1.29 | 1.220 | 78.6% | 9.7% | 9.7% | 98.1% |
| 0.88 | 0.780 | −0.051 | 1.10 | 0.975 | −0.051 | 1.10 | 0.975 | 0.49 | 1.38 | 1.220 | 78.6% | 9.7% | 9.7% | 98.1% |
| 0.94 | 0.780 | −0.051 | 1.17 | 0.975 | −0.051 | 1.17 | 0.975 | 0.55 | 1.46 | 1.220 | 78.6% | 9.7% | 9.7% | 98.1% |
| 0.99 | 0.780 | −0.061 | 1.24 | 0.975 | −0.061 | 1.24 | 0.975 | 0.62 | 1.55 | 1.220 | 78.6% | 9.7% | 9.7% | 98.1% |
| 1.05 | 0.780 | −0.061 | 1.31 | 0.975 | −0.061 | 1.31 | 0.975 | 0.69 | 1.64 | 1.220 | 78.6% | 9.7% | 9.7% | 98.1% |
| 1.10 | 0.780 | −0.071 | 1.38 | 0.975 | −0.071 | 1.38 | 0.975 | 0.76 | 1.72 | 1.220 | 78.6% | 9.7% | 9.7% | 98.1% |
| 1.16 | 0.780 | −0.081 | 1.45 | 0.975 | −0.081 | 1.45 | 0.975 | 0.84 | 1.81 | 1.220 | 78.6% | 9.7% | 9.7% | 98.1% |
| 1.21 | 0.780 | −0.091 | 1.51 | 0.975 | −0.091 | 1.51 | 0.975 | 0.92 | 1.89 | 1.220 | 78.6% | 9.7% | 9.7% | 98.1% |
| 1.27 | 0.780 | −0.101 | 1.58 | 0.975 | −0.101 | 1.58 | 0.975 | 1.01 | 1.98 | 1.220 | 78.6% | 9.7% | 9.7% | 98.1% |
| 1.32 | 0.780 | −0.111 | 1.65 | 0.975 | −0.111 | 1.65 | 0.975 | 1.10 | 2.07 | 1.220 | 78.6% | 9.7% | 9.7% | 98.1% |

# FILTER CARTRIDGE FOR LIQUID FILTERATION; ASSEMBLY; AND, METHODS

CROSS-REFERENCE TO RELATED APPLICATIONS

The present application is a continuing application of U.S. Ser. No. 14/543,023, filed Nov. 17, 2014, which is a continuation application of U.S. Ser. No. 13/905,267, filed May 30, 2013, and issued as U.S. Pat. No. 9,180,390. U.S. Ser. No. 13/905,267 is a continuation of U.S. Ser. No. 13/282,967, filed Oct. 27, 2011, and issued as U.S. Pat. No. 8,453,848. U.S. Ser. No. 13/282,967 is a continuation of U.S. Ser. No. 11/098,242 filed Apr. 4, 2005, which issued as U.S. Pat. No. 8,167,142. The present application includes the disclosure of U.S. Ser. No. 13/905,267; U.S. Ser. No. 13/282,967; U.S. Ser. No. 11/098,242 and, with edits, U.S. Provisional Application 60/562,045 filed Apr. 13, 2004. The complete disclosures of U.S. Ser. No. 13/905,267; U.S. Ser. No. 13/282,967; U.S. Ser. No. 11/098,242 and U.S. Application 60/562,045 are incorporated herein by reference. Also a claim of priority to each of U.S. Ser. No. 13/905,267; U.S. Ser. No. 13/282,967; U.S. Ser. No. 11/098,242 and U.S. Provisional application 60/562,045 is made, to the extent appropriate.

FIELD OF THE DISCLOSURE

The present disclosure relates to liquid filters. It particularly concerns liquid filters which utilize a serviceable filter cartridge that has a preferred seal arrangement and, in some instances, no axial load support liner. The liquid filters can be used for a variety of applications. Assemblies and methods of preparation and use are provided.

BACKGROUND

Liquid filters are used for a variety of applications, for example to filter lubricating fluids, fuels or hydraulic fluids. During use, liquid to be filtered is passed through a filter media, as filtration occurs. A well-known configuration, is to position the filter media as a cylinder surrounding a central clean liquid volume, with filtration flow occurring with an outside to inside (out-to-in) flow through the filter media. In other arrangements filtering flow is from inside the cartridge to outside (in-to-out).

In many instances, the filter media is provided in the form of filter cartridge, in extension between first and second, opposite, end caps. Typically, the arrangement is also provided with a liner. For an out-to-in flow, an inner liner provides for both: (a) radial support of the media against collapse or damage, due to radial pressure during normal use; and (b) axial support against cartridge collapse and damage. Examples of filter cartridges which utilize such constructions, are described for example in WO 02/070869 A1 published 12 Sep. 2002, (FIGS. 1 and 2), the complete disclosure of WO 02/070869 being incorporated herein by reference.

With an in-to-out flow, an outer liner can be used to provide media radial support and also axial support.

In many assemblies, the filter cartridge is constructed as a removable and replaceable (i.e., serviceable) component, see for example FIGS. 1 and 2 of WO 02/070869 A1. It is desirable to provide for liquid filter designs that allow for desired options in construction of service cartridges.

SUMMARY

According to the present disclosure, a liquid filter cartridge is provided. A liquid filter cartridge generally has first and second opposite end caps, with media extending therebetween. The media is configured to define an open central volume, which in use defines an internal receiving volume for liquid. At least one of the end caps is an open end cap, i.e., it has an aperture providing fluid flow communication with the internal volume. In some applications both end caps are open end caps. In some embodiments, the liquid filter cartridge is configured for out-to-in flow, during filtering; although alternatives (for in-to-out flow) are possible.

Preferred seal arrangements are provided for one or more of the end caps. In preferred applications, the seal is provided at selected locations for advantageous net surface axial forces on one or more of the end caps, in use. In some applications a seal arrangement is provided with respect to each end cap, in order to provide for a preferred level of surface axial force balance.

Example assemblies are provided. In addition methods of design, assembly and use are described. Also, techniques for estimating the net axial surface force operating on one or each end cap, in the overall filter cartridge, are provided. Also, some preferred seal configurations are described and shown.

BRIEF DESCRIPTION OF THE DRAWINGS

FIG. 15 is a table showing calculated values for parameters, when other variables are fixed, as shown.

FIG. 18A is a plot of pleat cartridge definition and calculated definitions, in accord with the descriptions herein.

FIG. 18B is another plot of pleat cartridge definition and calculated definitions, in accord with the descriptions herein.

FIG. 19A is another plot of pleat cartridge definition and calculated definitions, in accord with the descriptions herein.

FIG. 19B is another plot of pleat cartridge definition and calculated definitions, in accord with the descriptions herein.

FIG. 20A is another plot of pleat cartridge definition and calculated definitions, in accord with the descriptions herein.

FIG. 20B is another plot of pleat cartridge definition and calculated definitions, in accord with the descriptions herein.

FIG. 21B is another plot of pleat cartridge definition and calculated definitions, in accord with the descriptions herein.

FIG. 21C is another plot of pleat cartridge definition and calculated definitions, in accord with the descriptions herein.

FIG. 21D is another plot of pleat cartridge definition and calculated definitions, in accord with the descriptions herein.

FIG. 22A is another plot of pleat cartridge definition and calculated definitions, in accord with the descriptions herein.

FIG. 22B is another plot of pleat cartridge definition and calculated definitions, in accord with the descriptions herein.

FIG. 22C is another plot of pleat cartridge definition and calculated definitions, in accord with the descriptions herein.

FIG. 22D is another plot of pleat cartridge definition and calculated definitions, in accord with the descriptions herein.

FIG. 23A is another plot of pleat cartridge definition and calculated definitions, in accord with the descriptions herein.

FIG. 23B is another plot of pleat cartridge definition and calculated definitions, in accord with the descriptions herein.

FIG. 23C is another plot of pleat cartridge definition and calculated definitions, in accord with the descriptions herein.

FIG. 23D is another plot of pleat cartridge definition and calculated definitions, in accord with the descriptions herein.

FIG. 24A is another plot of pleat cartridge definition and calculated definitions, in accord with the descriptions herein.

FIG. 24B is another plot of pleat cartridge definition and calculated definitions, in accord with the descriptions herein.

FIG. 24C is another plot of pleat cartridge definition and calculated definitions, in accord with the descriptions herein.

FIG. 24D is another plot of pleat cartridge definition and calculated definitions, in accord with the descriptions herein.

FIG. 25A is another plot of pleat cartridge definition and calculated definitions, in accord with the descriptions herein.

FIG. 26B is another plot of pleat cartridge definition and calculated definitions, in accord with the descriptions herein.

DETAILED DESCRIPTION

In general, this disclosure relates to configurations of liquid filter cartridges and systems. In certain applications, the components of the filter cartridge are provided in manners that allow for advantageous filter cartridge integrity, during operation. In some instances, the techniques are applied in filter cartridges which are serviceable with filter cartridges, meaning they are removed from and replaced in filter assemblies during use. In other instances the filter cartridges are maintained within the filter assemblies, and are changed out with the housing component, as opposed to independently of a housing component.

Disclosed herein are general configurations and features that can be advantageously applied, to accomplish such results. In addition, a presentation is made of theoretical principles underlying the advantages achieved from preferred applications of the various mechanical configurations shown, which can be applied in a variety of applications to accomplish similar, desirable, results.

In general, a serviceable filter cartridge is a filter cartridge that is removed from, and is replaced in, a housing, during typical operation. A liquid filter cartridge is generally a filter cartridge for filtering liquid. Typical ones include a cylindrical extension of filter media extending between opposite end caps. At least one of the end caps is generally an open end cap, allowing for flow therethrough of filtered liquid. In some instances, both end caps are open.

The filter media in such cartridges, is typically pleated. Indeed the techniques described herein, are particularly adapted to arrangements which involve pleated media, although pleated media is not required in all instances. Further, in some instances media packs may include pleated media plus other types of media.

Figure 1:
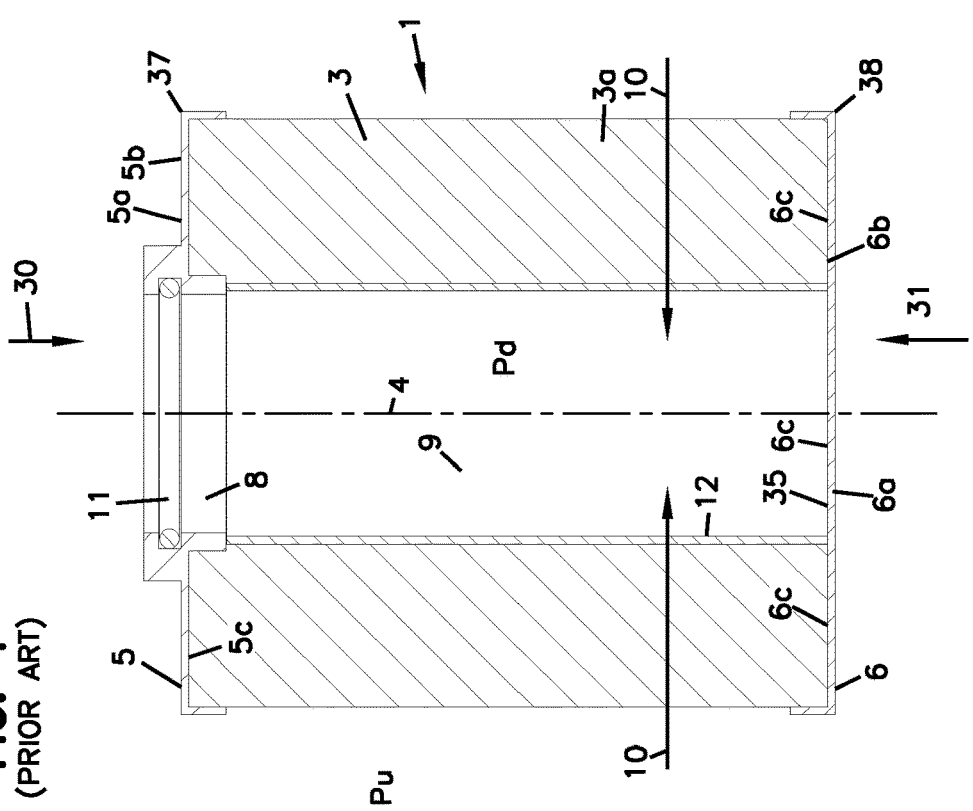
FIG. 1 is a schematic, side, cross-sectional view of a conventional filter cartridge.

I. General Features of Liquid Filter Cartridges, Relating to Structural Integrity with Respect to Axial Forces In association with FIGS. 1 and 2, a simplified model of a cartridge filter is presented, to facilitate an understanding of principles of net surface axial forces relevant to the present disclosure. In particular, reference numeral 1, of FIG. 1, depicts a filter cartridge. In general, filter cartridge 1 comprises filter media 3, for example pleated filter media 3a arranged in a cylindrical or star pattern around a central axis 4. The media 3 extends between opposite end caps 5 and 6. End cap 5 is an open end cap, 5a, defining central aperture 8 for liquid flow out from interior 9. End cap 6, is a closed end cap 6a, i.e., it has no central aperture therethrough. Herein, an end cap aperture which opens into an inner volume surrounded by filter media, will generally be characterized as an aperture in direct fluid flow communication with the inner volume. By the term "in direct fluid flow communication" it is meant that liquid in the inner volume can pass directly through the aperture, without passing through filter media.

The liquid filter cartridge can be configured for either in-to-out flow or out-to-in flow. The term "out-to-in flow" in this context, is meant to refer to a liquid filter cartridge which is configured for liquid flow therethrough, from outside the cartridge to inside of the cartridge, as it passes through the filter media. An "in-to-out" flow liquid filter would have an opposite direction of flow during use.

The particular liquid filter cartridge 1 depicted, is an out-to-in flow liquid cartridge. Thus, during a filtering operation, liquid to be filtered generally passes through media 3 in the direction of arrows 10, from a region outside of cartridge 1 to interior 9. The filtered liquid then passes out of cartridge 1 through aperture 8. For the cartridge 1 depicted in FIG. 1, aperture 8 is lined by a radial seal arrangement 11, which can form a seal to an exit tube or similar structure. In the example shown, the radial seal arrangement 11 will form a seal diameter (Ds) about the same as a diameter of aperture 8, and no greater than an ID (internal diameter) of the media. Indeed the example seal diameter (Ds) shown will be slightly smaller than the media internal diameter (i.d. or Di) minus the thickness of liner 12. Herein the term "seal diameter" (Ds) is meant to refer to the diameter of the seal surface in engagement between the seal member and a housing component, such as an outlet tube. Thus, it is meant to refer to the operational seal diameter, which may be slightly different from the diameter in the uninstalled component. The seal diameter (Ds) can be the diameter of an inwardly directed seal or an outwardly directed seal, depending on the system.

As the liquid filters through the media 3, contaminant material carried within the liquid is deposited on or in the media 3. Thus, the media 3 provides a barrier to liquid flow. Of course, in time media 3 will become occluded, and the filter cartridge 1 will need to be replaced in the equipment of concern, i.e., serviced.

Herein the terms "axial," "axial direction" and variants thereof, are generally meant to refer to forces directed generally in line with, or parallel to, a central longitudinal axis 4 of the cartridge 1 identified; whereas the term "radial," "radial forces" or similar terms are meant to refer to forces directed toward or away from such a central longitudinal axis 4.

As a result of the media 3 operating as a barrier, in general an upstream pressure (Pu) in a region upstream of the media is higher than the downstream pressure (Pd) in a region downstream side of the media. This means that, in use for out-to-in flow, the media 3 is under a biasing pressure radially toward the interior 9, i.e., in the direction of arrows 10. To support the media with respect to this, a radial support liner 12 is provided. The support liner 12 will typically comprise a perforated tube or an expanded metal tube.

Of course the seal arrangement 11, when element 1 is installed, also separates regions subject to Pu from regions subject to Pd. The function and purpose of the seal arrangement 11 is to provide for inhibition of leakage of liquid between two such regions; specifically to prevent fluid from getting into volume or interior 9 without passing through filter media 3.

The liner 12 provides an additional important support function. This function is an axial support function, inhibiting collapse or buckling of the media 3 in an axial direction, between the end caps 5 and 6. To evaluate this function, it is important to understand the net surface forces (axial) operating on the end caps.

Herein, in reference to an end cap, the term "outside" or "outside surface" is used to refer to a surface of the end cap which is directed away from the media and away from the opposite end cap. Referring to FIG. 1, the outside surface of end cap 5 is indicated at 5*b*, and the outside surface of end cap 6 is indicated at 6*b*. The inside surface of an end cap, is generally the surface directed toward the media and toward the opposite end cap. Thus, the inside surface of end cap 5 is indicated at 5*c*, and the inside surface of end cap 6 is indicated at 6*c*.

Figure 2:
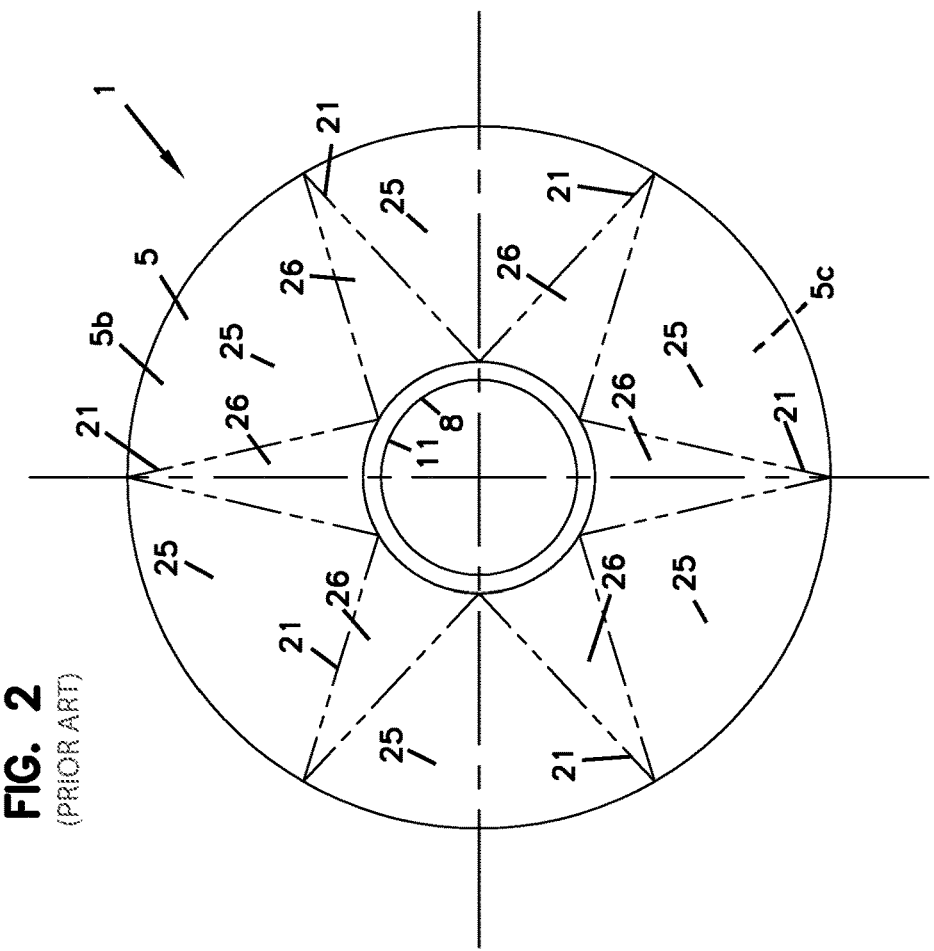
FIG. 2 is a schematic top plan view of a portion of the filter cartridge shown in FIG. 1.

A review of FIG. 2, leads to an understanding of the types of forces that cause axial stress on the cartridge 1. Specifically, FIG. 2 is a top plan view of end cap 5. In FIG. 2, pleated media 3 is depicted embedded in end cap 5, with a phantom line indicating the media location. For the particular embodiment shown in FIG. 2, media 3 is represented with only six pleats 21, for convenience. In a typical arrangement, many more pleats (usually 8 to 12 per inch along the inside) will be present.

Again, the seal 11 and/or the media 3 separates an upstream region subject to pressure Pu from downstream area subject to pressure Pd, during use.

In FIG. 2, regions 25 generally depict portions of end cap 5 at which both the outside surface 5*b* and the inside surface 5*c* of the end cap 5 are positioned upstream of the media 3. As a result, surface portions of end cap 5 in region 25 are subjected to equal opposite pressures (Pu) on both sides thereof. On the other hand, regions 26 are regions in which the outside surface 5*b* of the end cap 5 is subjected to the upstream pressure (Pu), but the inside surface or underneath surface of the end cap 5 is positioned downstream of the media 3, and thus is subject to an internal pressure Pd. Since Pu>Pd (and since force=pressure×area) in region 26, there will generally be, during operation, pressures on end cap 26 which result in a net downward pressure (away from the viewer in FIG. 2, and in the direction of arrow 30, FIG. 1). Herein, the net axial force operating on a selected end cap, due to liquid pressures against the opposite surfaces (outside and inside) thereof, will be referred to as the "net surface axial force" for the identified end cap. For end cap 5 of FIGS. 1 and 2, the net surface axial force during use, is in the direction of end cap 6.

A similar net force, but in an opposite (upward) direction, i.e., the direction of arrow 31, FIG. 1, would be present for end cap 6, in use. It is noted, however, that in region 35, which is the center region of end cap 6 where no aperture is present, additional force in the direction of arrow 31 is provided, since there would be a pressure differential across this surface portion.

What is apparent from the schematic of FIGS. 1 and 2, and the above discussion, is that in a typical operation with a pressure differential across the media 3, end cap 5 will be under a net surface axial pressure toward end cap 6, and end cap 6 will be under a net surface axial pressure in the general direction of end cap 5. In order to prevent the media 3 from axially buckling or collapsing due to these forces, a typical filter cartridge such as cartridge 1 includes an axial load core or liner 12, in axial extension between the end caps 5 and 6. This provides axial strength in addition to the media 3, to inhibit media collapse.

In a typical arrangement, end caps 5 and 6 are either molded from a moldable plastic or polymeric material, or the end caps 5 and 6 comprise metal, for example with media 3 potted or secured thereto by a sealant such as plastisol. In either case, the inner liner or core 12 is typically secured in the end caps at an appropriate position for providing axial strength to the arrangement. Thus, the typical axial load liner 12 cannot be removed from the cartridge 1, without damaging to the filter cartridge 1 to allow for its removal. In such an arrangement the liner or core 12 will be said herein to be "integral" with a remainder of the filter cartridge or "permanently" included in the filter cartridge.

As indicated in the background discussion above, if the filter assembly uses a replaceable (or serviceable) filter cartridge, periodically the filter cartridge 1 needs to be removed and replaced. If the filter cartridge is such as cartridge 1, FIG. 1, when the cartridge 1 is replaced, so is the core 12. However, in general the inner liner 12 is constructed of a material such as a perforated metal or rigid plastic or expanded metal, that will not readily wear out. Thus, the replacement of the cartridge 1 periodically, with a liner 12 permanently positioned therein, can lead to a waste of material that has not worn out in its lifetime of use. In addition, the inner core 12 can be problematic with respect to disposal. For example, if it is manufactured from metal, incineration can be a problem. Also, the inner or liner core 12 represents an expense, in assembly of the filter cartridge 1, that would be avoided if possible. In addition, the presence of the liner 12 makes the cartridge 5 more difficult to compress or compact during disposal.

Herein, a liner or core 12 which is permanently positioned within a cartridge 5, at least in part in order to control axial load during use, will sometimes be referred to as an "axial load liner" or by similar terms. The term "axial load liner" is not meant to refer to all types of liners that may be located on a side of the media. Wire or plastic nets or similar structures, that do not provide adequate axial strength to significantly resist significant axial loads, are not included within the term axial load liner. In general, if a liner is not adequately strong to resist an axial load of at least 20 lbs. applied thereto, it will not be considered an axial load liner herein.

Still referring to FIG. 1, it is noted that if seals were located at or near outer peripheral regions positions 37, 38, with an out-to-in flow arrangement, the general net forces would be such that the end caps 5, 6 are biased away from one another. This principle is described, for example, in U.S. Pat. No. 6,626,299.

II. General Principles Leading to Advantageous Constructions of Liquid Filter

The principles generally discussed in section I above, may be summarized by the following considerations:

1. In general, each seal of the filter cartridge, and also the media of a cartridge, separates surface portions of the two opposite end caps into upstream regions, in which components are subject to an operating pressure Pu, from downstream regions in which components are subject to an operating pressure Pd. In general, Pu>Pd.

2. The net axial surface forces acting upon a selected end cap can be approximated by evaluating the amount of surface area subject to Pu on each side of the end cap and the amount of area subjected to Pd on each side of the end cap, since in general force (F) is equal to pressure (P) times Area (A). In regions where the same pressure is operating on the same area on opposite sides of the end cap, there is no net directional pressure that would affect the axial integrity of the media or contribute to a net surface axial force for that end cap.

3. In a filter cartridge (out-to-in flow) having one open end lined by an internal radial seal aligned with, or smaller than, an ID or downstream edge of the media, and either an identical opposite end cap or a closed opposite end cap, during operation there is a net surface axial force for each end cap such that each end cap is under pressure toward the other. An axial load liner, which is contained within a conventional cartridge and extends between the two end caps, provides structural integrity by resisting this collapsing or buckling force.

In general, according to the principles of the present disclosure, preferred arrangements can be provided in which seal location is used to provide desirable net surface axial forces on the end caps.

Optionally, this can be implemented in arrangements having no axial load liners provided as a permanent part of the service part (i.e., the filter cartridge).

A detailed discussion of the principles involved in selecting seal location to accomplish these results, is provided in section IV below. Before the presentation of that section, several embodiments are described which take advantage of, and demonstrate, the principles. A feature of preferred embodiments is selection of the seal location(s) to provide for no, or a desirably low level of, net surface axial pressure differential with respect to each end cap.

Figure 4:
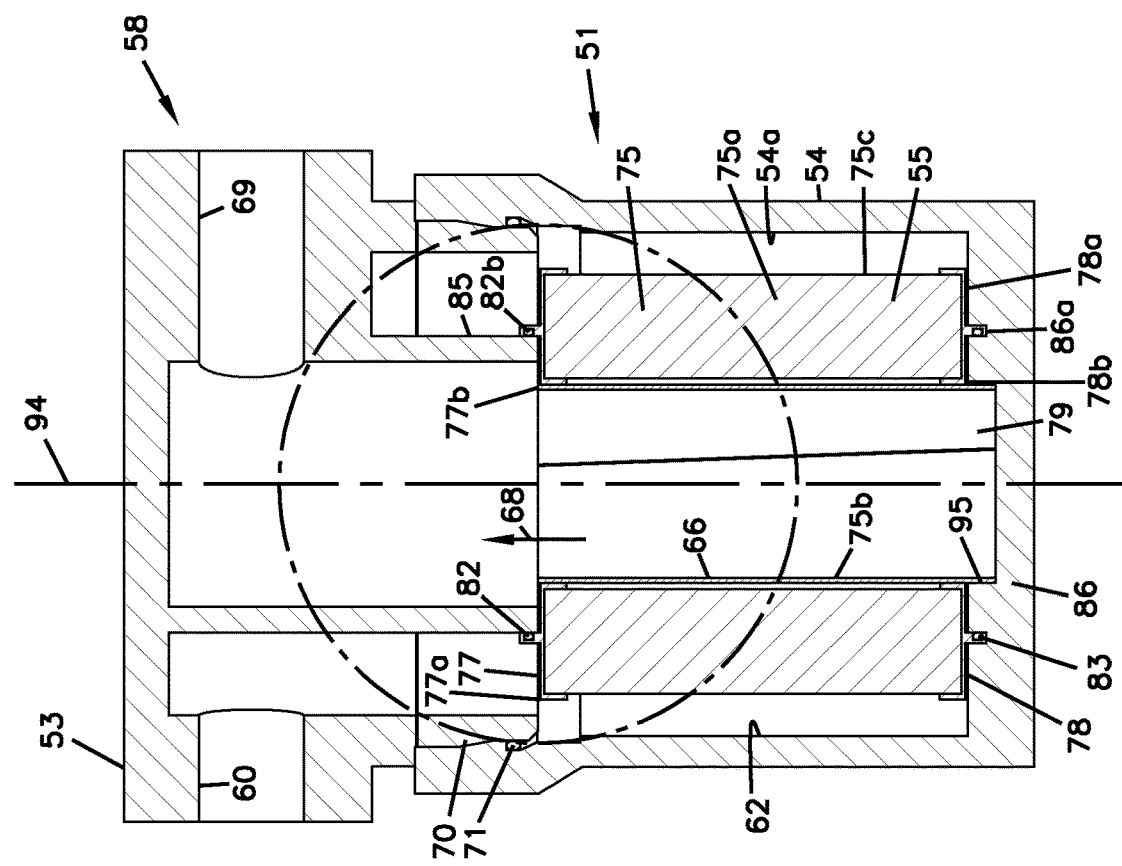
FIG. 4 is a schematic, side cross-sectional view of the assembly depicted in FIG. 3.
Figure 3:
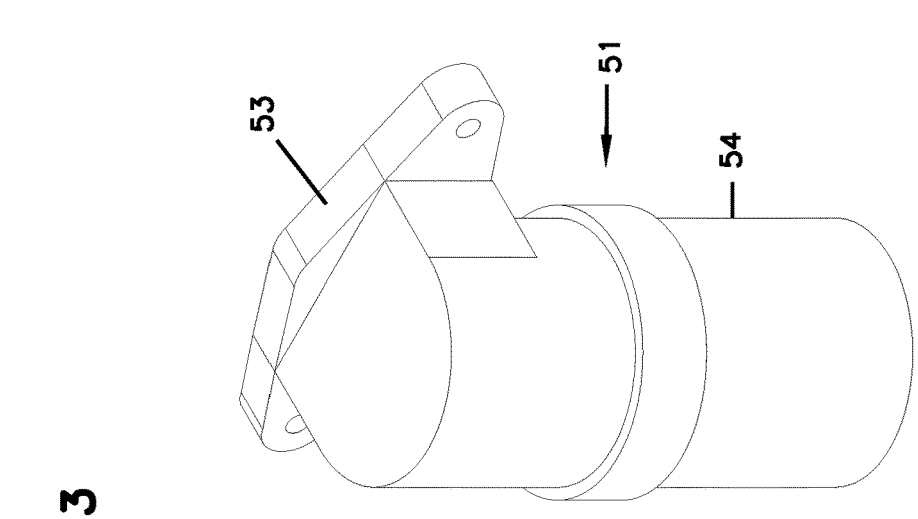
FIG. 3 is a schematic, upper, side perspective view of a first embodiment of a filter assembly according to the present disclosure.
Figure 5:
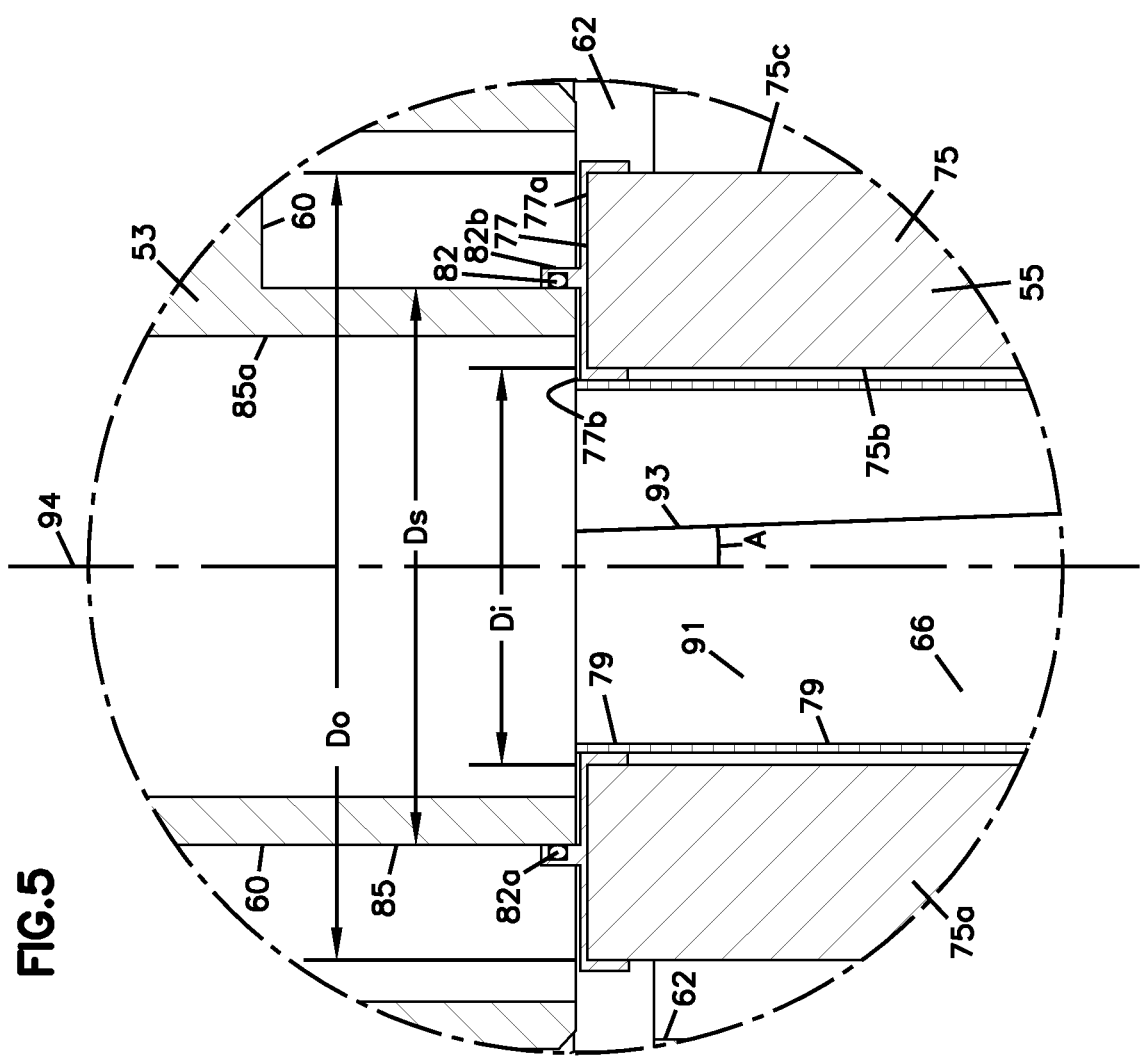
FIG. 5 is a schematic, fragmentary, enlarged view of a first portion of FIG. 4.
Figure 9:
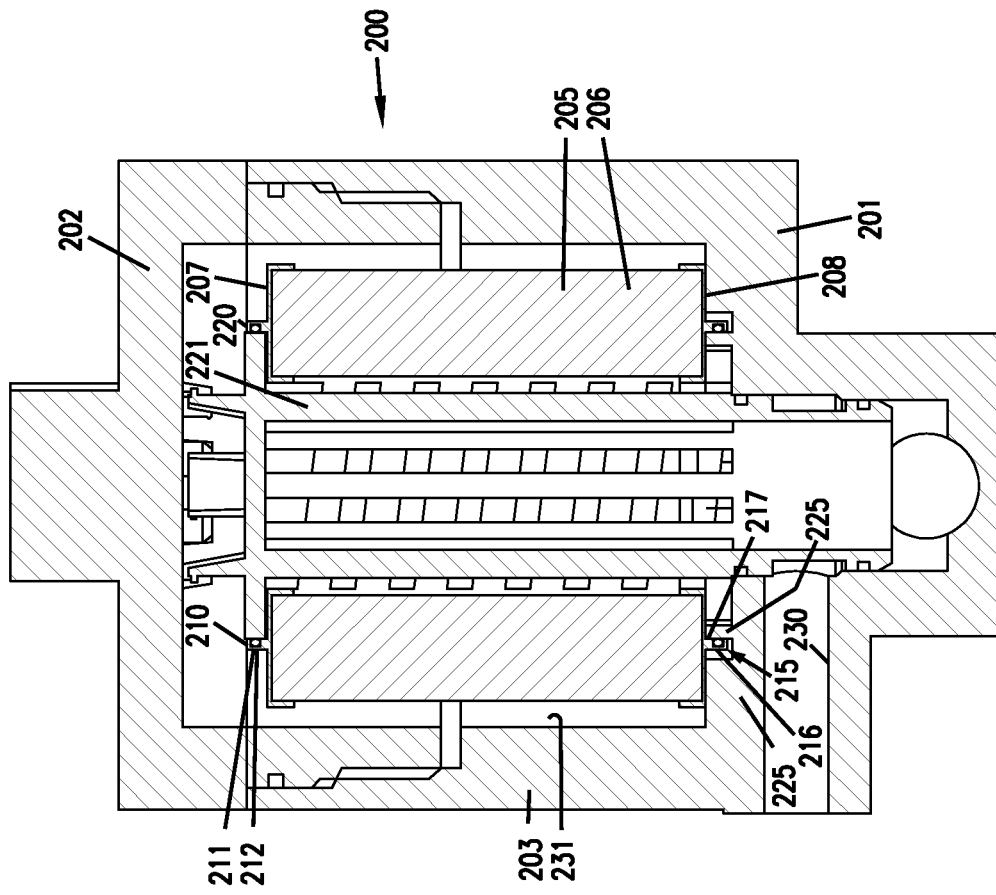
FIG. 9 is a cross-sectional view of an alternate embodiment.

III. Balancing the Axial Forces to Achieve Preferred Arrangements; FIGS. 3-5; FIG. 9

A. FIGS. 3-5.

The reference numeral 51, FIG. 3, generally designates a liquid filter assembly according to the present disclosure. Liquid filter assembly 51 generally includes a filter head 53 and a filter housing 54. The particular liquid filter assembly 51 includes a removable and replaceable (i.e., serviceable) filter cartridge 55 is positioned within the housing 54 (FIG. 4).

The liquid filter assembly 51 may be configured for a variety of liquid filter operations; for example, as a lubricating oil filter, a hydraulic fluid filter or as fuel filter. The particular liquid filter assembly 51 depicted is configured for use as oil filter assembly 58, with out-to-in flow. However, the basic principles described, and componentry shown, can be applied in the instance of other types of, or configurations of, liquid filters, including ones configured for in-to-out flow.

Referring to FIG. 4, during a normal filtering operation, liquid to be filtered enters the filter head 53 (from a flow circuit within the equipment) and passes through the filter head 53, via inlet channel 60. For a typical application, the channel 60 is configured to provide for an annular flow of inlet liquid. The liquid then flows into the housing 54, specifically into annular region 62, surrounding cartridge 55 between cartridge 55 and sidewall 54a of housing 54. During filtering, the liquid flows through cartridge 55 and into central clean liquid volume 66. The liquid then exits volume 66 in the direction of arrow 68, into an outlet flow channel 69, in filter head 53. The outlet flow channel 69 would then provide fluid flow communication with appropriate equipment on which the filter head 53 is mounted. Such equipment could include, for example, a vehicle, or various construction equipment or other equipment (stationary or mobile).

In a typical assembly, the housing 54 is openable. Referring to FIG. 4, in the instance of liquid filter assembly 51, the housing 54 is openable by separating the housing 54 from filter head 53, at threads 70. A seal 71 to prevent leakage is provided by an o-ring.

Periodically, filter media 75, in filter cartridge 55, will become occluded due to build up in (or on) the media 75 of contaminants filtered from the liquid flow. When the occlusion has reached an appropriately defined level, for example detected through pressure differential measurements or as a result of operation to a pre-defined service interval, the media 75 is generally serviced, by replacement. Typically, service of media 75 is accomplished through removal and replacement of serviceable cartridge 55.

The typical serviceable cartridge 55, generally comprises the media 75, positioned to extend between first and second, opposite, end caps 77, 78. The end caps 77, 78 may be constructed from a variety of materials, for example they may be molded from a polymer or they may be configured from metal, for example with the media secured thereto. For the particular embodiment shown, the end caps 77, 78 are shown as molded end caps made from an appropriate polymeric material.

In the arrangement shown, the media 75 is a pleated media cylinder 75a, defining inner pleat tips or edges 75b, and outer pleat tips or edges 75c, FIG. 5. The pleats extend axially, between the end caps 77, 78, FIG. 4.

For the particular arrangement shown, the filter cartridge 55 is a "double open end" filter cartridge 55a. By this, it is meant that each of the end caps 77, 78 is an "open" end cap 77a, 78a, each having a central aperture (77b, 78b respectively) therethrough, positioned for fluid flow communication with central region 66.

A reason that the filter cartridge 55 is a "double open end" filter cartridge 55a is that, during servicing, it is slid over support tube 79. The support tube 79 is discussed in greater detail below. In the example shown, support tube 79 remains affixed to the bowl or housing 54, during a service operation in which the filter cartridge 55 is removed and replaced. Of course in alternate systems, the support tube could be constructed to not be permanently positioned in the housing.

Because the filter cartridge 55 is a serviceable component, to periodically be removed and be replaced, it is necessary that a seal arrangement be provided, to ensure that there is no leakage of unfiltered fluid into volume 66. For the particular embodiment depicted in FIG. 3, the seal arrangement comprises a first seal 82 and a second seal 83. The first seal 82 is positioned for sealing between the end cap 77 of cartridge 55 and portion 85 of filter head 53; and, the second seal 83 is positioned to provide a seal between end cap 78 of the cartridge 55 and portion 86a of housing 54.

In general, seal 82 comprises an o-ring 82a, FIG. 5, mounted on an axially directed seal support 82b which extends axially outwardly from end cap 77. Further, referring to FIG. 4, seal 83 comprises an analogous o-ring mounted on an axially directed extension, extending axially outwardly, away from the media 75, from end cap 78.

In general, portion 85 of filter head 53, is an outside surface portion of a center liquid flow exit tube 85a (FIG. 5); and, portion 86a of housing 54 (FIG. 4) comprises a portion of a housing base 86. Outer sidewall 54a, of housing 54 projects (in the embodiment of FIGS. 3-5) upwardly toward filter head 53 from base 86. Inner liner, tube or core 79 is secured to housing base 86.

A filter cartridge such as filter cartridge 55, FIGS. 4 and 5, will be characterized herein as a "coreless cartridge," since it contains (as an integral component of the filter cartridge) no inner liner, tube or core, to support axial load, secured permanently therein, in extension between end caps 77, 78. It is noted that the term "coreless" in this context is meant to refer to arrangements that do not have as an integral part therein, an inner tubular support for axial load (as opposed to having no type of support at all). For example the media could have a pleated extension of light wire mesh or plastic mesh along an inside thereof, and it would still be "coreless" in accord with this definition. In general, if structure integral with the filter cartridge along an inside of the media capable of supporting an axial compressive load of at least 20 lbs. (9.1 kg), is not permanently present in the filter cartridge, the filter cartridge will be considered "coreless" in accord with this definition. The term "axial" in this context meaning force in the direction of extension of axis 94, FIG. 4; i.e., a direction between the opposite end caps 77, 78.

It is noted that a filter cartridge will be considered "coreless" within the above definition, even if a core not permanently installed in the cartridge itself, is present elsewhere in the assembly 51.

Still referring to FIGS. 3-5, it will also be apparent that for the preferred embodiment shown the filter cartridge 55 also includes no integral outer support structure, to support axial load, extending continuously between the end caps 77, 78. Such an arrangement will be referred to herein as an "outer axial load liner free" filter cartridge or as a filter cartridge with no axial load outer liner.

Herein a filter cartridge will be considered to have no outer axial load liner or to be outer axial load liner free, even if it contains (integral with the filter cartridge) a pleated light mesh such as a light wire mesh or light plastic mesh or other structure around the outside, that does not significantly resist compressive axial load. Herein, a filter cartridge will be considered to be outer axial load liner free, as long as any outer liner present (integral with the filter cartridge) is not capable of supporting an axial load of at least 20 lbs (9.1 kg).

If the filter cartridge is both outer axial load liner free and coreless, it may sometimes be referred to herein as "axial load liner free."

For the arrangements in FIGS. 4 and 5, support in this instance, both radial and axial, for the media 75 of the filter cartridge 55 is provided by inner core 79. The inner core 79 is a porous tubular member 91, FIG. 5, positioned within liquid filter assembly 51 such that, during a service operation to replace the serviceable cartridge 55, the porous tubular member 91 is not removed and replaced. That is, the serviceable cartridge 55 is coreless, because the inner core 79 (i.e., the porous tubular member 91) is not part of the filter cartridge 55.

For the particular embodiment shown, the inner core 79 is secured to a remainder of housing 54, FIG. 4. A particularly convenient method of providing for a secure fit, is to optionally use, as the tubular member 91, FIG. 4, a member that is not radially continuous, but rather has a gap or open seam 93, FIG. 5, therein. The particular seam 93 shown, is not axial, but rather extends at an angle (A) to central axis 94, FIG. 5 in accord with a similar liner (but integral the filter cartridge) shown in U.S. Pat. No. 6,206,205, the complete disclosure of which is incorporated herein by reference. The gap presented by seam 93 allows the perforated tubular member 91 to be radially compressed (under pressure) somewhat, to a smaller circumference, and thus it can be secured by press fit into a receiver 95 in base 86 of housing 54. A typical gap will be selected to have an angle A of no more than 15°, preferably at least 0.5°, typically 1° to 15°.

For the particular assembly 51 depicted in FIGS. 4 and 5, the outside diameter for the inner core 79 is selected such that cartridge 55 can be slid thereover, in use. Preferably the outside diameter of the support 91 is of a size such that it will operate as an inner radial support to the pleated media 75a. In a typical application, to accomplish this, the OD of tubular support should preferably be chosen to be no more than 0.09 inches (2.3 mm) from the ID of the inner pleat tips 75b of pleated media 75a.

If desired, the porous tubular member 91 can be provided with bumps, ribs or other constructions on an outer surface thereof, to provide for closer engagement to the inner pleat tips 75b. The tubular member 91 may comprise metal or a molded plastic.

In general, end cap 77 will be referred to herein as an "upper" end cap since in the normal installation position, FIG. 4, end cap 77 is positioned directed upwardly. In contrast, end cap 78 will generally be referred to herein as a lower or bottom end cap, since in a normal installation position of FIG. 4, it is directed downwardly.

End cap 78 can be configured to include a contaminant containment and collection feature, not shown thereon. The contaminant containment and collection feature may be according to PCT Publication WO 02/081052 published Oct. 17, 2002, incorporated herein by reference.

Referring to FIG. 4, in order for liner 91 to provide for axial support between end caps 77, 78, during a normal use, it is preferable to construct the filter cartridge 55, such that, between the end caps 77, 78, (i.e., on the filter cartridge 55 as a whole, during use), there is little or no net surface axial force on the element 55; and also such that there is little or no net surface axial force on each end cap 77, 78.

If the filter cartridge 55 was constructed generally in accord with the cartridge 1, FIG. 1, except for both end caps being open, such a low net force would not be created. This is because the net surface axial force on end cap 5, FIG. 1, would be toward end cap 6; and, the net surface axial force on end cap 6, FIG. 1, would be toward end cap 5.

In order to modify from this, preferred seal locations for end caps 77, 78 are selected. It is the location of these seals, which will generate a preferred force profile at end cap 78, and will thus allow for little or no net force on filter cartridge 55, or net surface force on each end cap 77, 78.

As indicated above, referring to FIGS. 4 and 5, the seal location for end cap 77 is at 82. As indicated above with respect to FIG. 4, the seal location for end cap 78, is at 83. Herein the diameter of a seal is referred to as Ds. The inside diameter defined by the pleats, will be referred to as Di. The outside diameter defined by the pleat tips, will be referred to as Do.

Herein the diameter of a seal which, for that end cap, provides for a balance of forces or a net axial surface force on that end cap, will be referred to as Db or DsB.

From the discussions in Section II, it should be apparent that, for an end cap A, diameter DbA can be identified such that in normal use the surface axial forces toward the outer surface of the end cap A and the inside surface of the end cap A are in balance. That is, a seal having a diameter DbA is one that would provide for no net surface axial forces operating on the associated end cap A, in use.

For an arrangement having two end caps, designated end cap A and end cap B, if the seal in end cap A is located at DbA, and the seal at end cap B is located at DbB, each end cap will be in balance with respect to net surface axial forces, and there will be no net surface axial force operating on the associated cartridge. This would be the case even if one of the end caps is closed, and thus does not require the seal to protect against unfiltered liquid from entering the internal volume of the filter cartridge. That is, even with a closed end cap, a seal can be provided engaging that end cap with a portion of the housing. This seal would separate regions subjected to Pu from regions subjected to Pd. Thus, its location could be provided at a balance point Db. However this unique latter seal would not be used to protect against unfiltered flow by-passing the media.

Again, herein, the diameter Ds of a seal which provides for a balance of forces against each surface of an associated end cap, is generally referred to as Db. An end cap A will be considered to be within a preferred level of balance, with respect to net axial surface forces, for a typical liquid filter cartridge, provided the seal diameter Ds is at a diameter within plus or minus 15% of DbA, i.e., within the range of 0.85-1.15 DbA, inclusive. Typically, the seal diameter Ds is within the range of 0.9-1.1 DbA, inclusive, often 0.92-1.08 DbA. Most typically it will be selected to be within the range of 0.95-1.05 DbA, inclusive. As discussed below, the principles described herein can be applied outside of these ranges, however.

The range stated is meant to indicate that in some instances axial loads may be accepted, which are not zero but rather are sufficiently small to accommodate advantages structure as a result of axial loads acceptable for the filter cartridge, under typical conditions of use expected. Although alternatives are possible, typically, the seal location will be positioned outwardly from the inner pleat diameter (Di) at least 2 mm, often at least 5 mm, and sometimes at least 10 mm; and, also be at a location recessed from the outer pleat diameter (Do) at least 2 mm, often at least 5 mm and sometimes at least 10 mm. Preferred locations can be calculated for any given system, as discussed below.

In general, at least a first open end cap configured for fluid flow into and out of the element, will have a seal diameter Ds as defined above. This would correspond to end cap 77, FIG. 3. Most preferably both end caps (77, 78) have a seal diameter as defined above.

The principle of a balanced arrangement (seal(s) at Db) can be applied in either a top load or a bottom load configuration. An example of bottom load configuration utilizing these principles was provided in FIGS. 3-5.

Attention is now directed to FIG. 9. In FIG. 9 a liquid filter arrangement 200 is depicted, comprising a filter base 201 and a removable cover 202. Secured within housing 203 formed by cover 202 and base 201, is a filter cartridge 205. The filter cartridge 205 comprises pleated media 206 in extension between opposite end caps 207 and 208. End cap 207 is an open end cap, the radial seal indicated at 210 formed by an o-ring 211 mounted on an outwardly directed (relative to the media) axial extension 212 of end cap 207.

At end cap 208 a seal 215 is shown formed by an o-ring 216 mounted on an outwardly directed axial extension 217 of end cap 208.

It is noted that seal 210 is provided between o-ring 211 on end cap 207 and a portion 220 of support liner 221. It is noted that seal 215 is formed between o-ring 216 on a portion of end cap 208, and a portion 225 of base 203.

In use, service occurs by removing end cover 202, and then dislodging element 205 from its seal.

The assembly 200 is a top load arrangement, and includes a drain arrangement 230, to allow standing liquid to drain from interior 231, as cover 202 is being removed. General principles of such arrangements are described in PCT Application US04/02074, filed Jan. 27, 2004, incorporated herein by reference.

Preferably seals 210 and 216 are each positioned at a location for a balanced seal diameter, Db (i.e., each is within 0.85-1.15 Db), in accord with the above definitions.

IV. Methods for Evaluating Net Axial Forces Acting Upon an End Cap Arrangement of a Filter Cartridge; Approaches to Design A. Background Principles A mathematical method for estimating the net axial forces for any given end cap or cartridge, is provided. In general the techniques are applicable to a variety of sizes of liquid filter cartridges, which use pleated media. The various assumptions useable to support the calculation are pointed out where appropriate.

Although liquid filter cartridges can be located in any position relative to gravity, for the sake of the simplicity, the concepts will be discussed assuming an axis of the filter cartridge normal to the plane of the earth. Thus, in this section of the disclosure, forces acting toward the earth (downward) will be defined as negative (−), and opposite forces as positive (+).

For initial purposes of this discussion, it will be assumed that the filter cartridge is cylindrical, utilizes pleated media, and has end caps which are circular.

Figure 6:
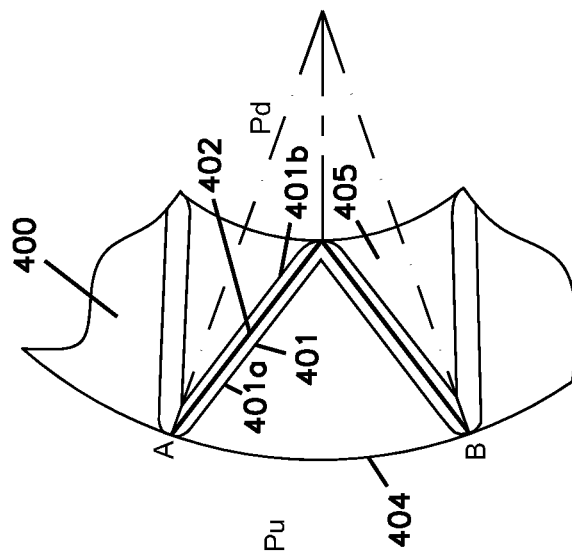
FIG. 6 is a schematic view of a portion of a filter cartridge end cap.

FIG. 6 illustrates a portion of a filter cartridge. An end cap is shown at 400, and the pleated media at 401. The geometry of the pleated media 401 is configured in a "V" shape. The arc A-B describes one complete pleat. Pu is the upstream pressure and Pd is the downstream pressure. Because the thickness of the media 401 is small compared to the overall area of media, it is assumed that the pressure drop across the media occurs at the media centerline 402 and is a step function. This assumption means that the pressure on the upstream side of the media 401a is considered to remain constant through the first half of the media thickness; and, that at a centerline of the media thickness the pressure drops to that of the downstream pressure and remains constant through the last half of the media to the downstream side 401b.

This idealization does not differ much from the actual pressure situation significantly. However, this idealization of the pressure drop across the media simplifies the mathematics related to defining the various surface areas on the end caps that are effected by the pressure drop across the media. Also, it is assumed that the Pressures Pu and Pd, acting on the end cap surfaces, are uniform across those surfaces.

Figure 7:
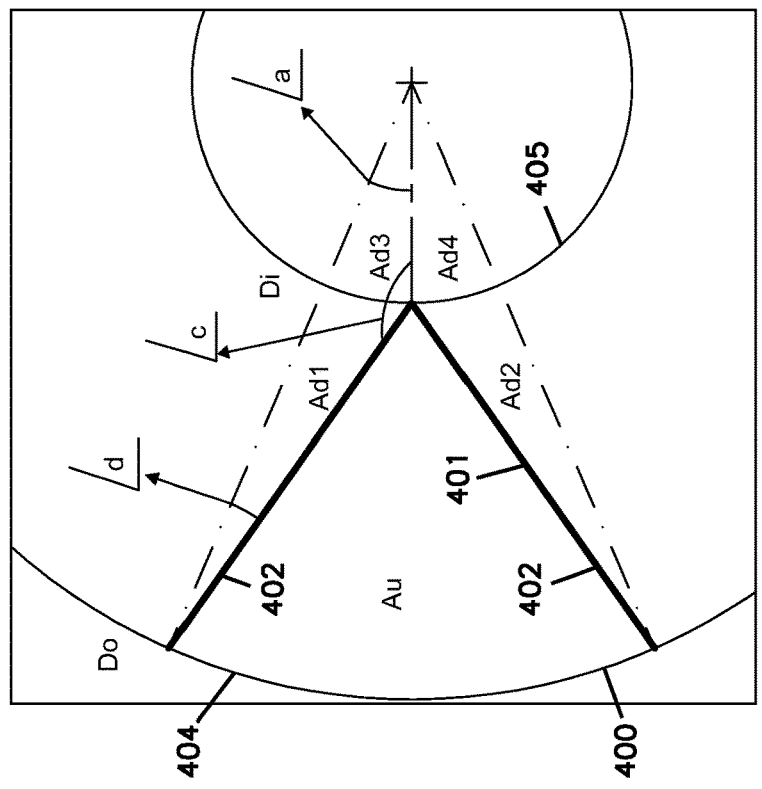
FIG. 7 is a schematic view analogous to FIG. 6.

For the current model evaluated in FIGS. 6 and 7, it will be assumed that the end cap 400 under consideration is an open end cap, having an outside edge 404 and an inside edge 405 corresponding to the outer (Do) and inner (Di) pleat tips, respectively.

In FIG. 7, the illustration in FIG. 6 has been modified to calculate the areas effected by the pressure drop. A centerline 402 of the media 401 is used rather than the full media thickness (as explained above). Au is the area of the upper end cap 400 that is subject to the upstream pressure on both sides of the end cap 400. Because of this the pressure on both sides cancel each other out and do not contribute to the net surface axial compressive force that is applied to the corresponding end cap or filter cartridge. Ad1+Ad2 is the combined area on the upper end cap that is subject to upstream pressure (Pu) on the outside surface of the end cap and to downstream pressure on the inside surface of the end cap. This combined area relates to one complete pleat. To know the total effect on the upper end cap, the number of pleats in the filter cartridge have to be used. Therefore the pressure drop across the filter cartridge creates a downward force equal to (Ad1+Ad2)×(pressure drop)×(number of pleats).

The mathematics used to calculate Ad1 and Ad2 come from various applied trigonometric equations. An approach is to first find angle a, this can then be used in an equation that will give us the combined area (Ad1+Ad3). Next is to find the combined area (Ad3+Ad4). By examination of FIG. 7 one also knows from symmetry that:

$$Ad_3 = Ad_4 \quad (Eq. 1)$$

Finding ∠a°
From FIG. 7 it can be shown that:

$$Au + Ad_1 + Ad_2 + Ad_3 + Ad_4 = At$$

∠a° is equal to one half of the entire angle that describes the area At. Since this area represents one cycle of pleats, the entire angle can be found by simply dividing 360° by the number of pleats. ∠a° is one half of that.

$$\angle a° = \frac{360°}{(2)(PC)} = \frac{180°}{PC} \quad (Eq. 2)$$

Where PC is the Pleat Count (number of pleats in the entire filter cartridge).
The area defined by $Ad_1+Ad_3$ is an oblique triangle with two sides known and the included angle known. The equation for the area of this triangle according to *Machinery's Handbook,* 24th Edition, Page 83, second panel is:

$$Ad_1 + Ad_3 = \left(\frac{Di}{2}\right)\left(\frac{Do}{2}\right)\left(\frac{\operatorname{Sin}\angle a°}{2}\right) \quad (Eq. 3)$$

Substituting Eq. 2 into Eq. 3 one gets:

$$Ad_1 + Ad_3 = \left(\frac{Di}{8}\right)(Do)\left(\operatorname{Sin}\left(\frac{180°}{PC}\right)\right) \quad (Eq. 4)$$

Area $Ad_3+Ad_4$ can be defined by the equation for the area of a circular sector, from *Machinery's Handbook,* 24th Edition, p. 58:

$$Ad_3 + Ad_4 = .5\left(\frac{Di}{2}\right)(Di)\left(\frac{\pi}{PC}\right)$$

Reducing the equation down:

$$Ad_3 + Ad_4 = \left(\frac{Di^2}{4}\right)\left(\frac{\pi}{PC}\right) \quad (Eq. 5)$$

Also, by symmetry we know that $Ad_3=Ad_4$. Eq. 5 then becomes:

$$Ad_3 = \left(\frac{Di^2}{8}\right)\left(\frac{\pi}{PC}\right) \quad (Eq. 6)$$

Substituting Eq. 6 into Eq. 4 and solving for $Ad_1$:

$$Ad_1 = \left(\left(\frac{Di}{8}\right)(Do)\left(\operatorname{Sin}\left(\frac{180°}{PC}\right)\right)\right) - \left(\left(\frac{Di^2}{8}\right)\left(\frac{\pi}{PC}\right)\right) \quad (Eq. 7)$$

For each pleat, the area on the downstream side that has pressure drop across it is $Ad_1$ and $Ad_2$. Also from symmetry, $Ad_1=Ad_2$. Therefore the total area Atu of the upper end cap effected by the pressure drop is equal to the number of pleats×2×$Ad_1$:

$$Atu = 2(PC)(Ad_1) \quad (Eq. 8)$$

or $$Atu = \left((PC)\left(\frac{Di}{4}\right)(Do)\left(\operatorname{Sin}\left(\frac{180°}{PC}\right)\right)\right) - \left(\left(\frac{Di^2}{4}\right)(\pi)\right)$$

EXAMPLES

Example 1—A Filter Cartridge with Conventional ID Seals

A filter cartridge configuration considered in this example is one which is similar to FIG. 1, except it has two opposite open end caps similar to end cap 5, and has an outside pleat diameter (Do) of 4 inches; an inside pleat diameter (Di) of 2 inches; a pleat count (PC) of 40; and, a pressure drop (ΔP or PD) across the media of 100 psid in use. A seal is provided along the ID of each end cap.

Do=4; Di=2; number of pleats=40. Plugging these values into the above equation gives a total area on the upper end cap Atu=3.135 inches$^2$
The total force (Ftu) acting in a negative axial direction (in direction of gravity) on the top end cap Ftu=−100 psid×Atu $Ftu$=(−100)(3.135)=−313.5 pound$f$ (pounds of force)

With the conventional filter cartridge as defined 313.5 pounds of force is acting on both the upper and lower end cap in opposite directions. The force (−) on the upper end cap is acting downward. The force (+) on the lower end cap is acting upward. The net result is that the filter cartridge is experiencing a compressive force along its vertical axis of 313.5 pounds. By design (in the conventional cartridge) the majority of this force is transmitted through the end caps to the inner liner. The media pack will experience a portion of this force because the force is distributed over the areas Ad1 and Ad2 for each pleat. This distribution of force creates a bending moment on the end caps that transfers a small portion of the total load to the media pack.

Example 2—Moving the Lower Seal to the Outside Diameter

Moving the seal from the inside diameter to the outside diameter changes the magnitude and direction of the force acting on the lower end cap. Whereas in the conventional design discussed, the force on the lower end cap is in the upward or positive (+) direction, relocating the seal to the outside diameter causes the force to act on the lower end cap in a downward or negative (−) direction. In addition, the area is larger and therefore the force is larger.

Keep in mind that the pressure upstream of the media (Pu) is greater than the pressure downstream of the media (Pd). By examination of FIG. 7 it can be concluded that Pu acts on the upper surface of the end cap defined by Au; and that Pd acts on the lower surface of the end cap defined by Au. Knowing that Pu>Pd indicates that the net force on Au for each pleat is acting in the downward or negative (−) direction.

Areas Ad1 and Ad2 are on the downstream side of the media. By placing the seal on the outside diameter of the lower end cap, the downstream pressure Pd now acts on both sides of the areas Ad1 and Ad2; thereby canceling each other out resulting in a net axial force of zero acting on those areas.

Using trigonometric equations and some of the equations derived earlier, one can find the area Au as a function of the known parameters Do, Di and the number of pleats.

Again using the equation for the area of a circular sector one knows that:

$$Au + Ad_1 + Ad_2 + Ad_3 + Ad_4 = \frac{(\pi)(Do^2)}{(4)(PC)} \qquad \text{(Eq. 9)}$$

Also, by symmetry we know:

$$Ad_1 = Ad_2 \qquad \text{(Eq. 10)}$$

We also have previously derived the equation for Ad1 (Eq. 7)

$$Ad_1 = \left(\left(\frac{Di}{8}\right)(Do)\left(\operatorname{Sin}\left(\frac{180°}{PC}\right)\right)\right) - \left(\left(\frac{Di^2}{8}\right)\left(\frac{\pi}{PC}\right)\right)$$

And from the equation for a circular sector we know that:

$$Ad_3 + Ad_4 = \left(\frac{Di^2}{4}\right)\left(\frac{\pi}{PC}\right) \qquad \text{(Eq. 5)}$$

By substituting Eq. 5, 7, and 10 into Eq. 9, and solving for Au one gets:

$$Au = \left(\left(\frac{\pi}{4}\right)\left(\frac{Do^2}{PC}\right)\right) - \left(\left(\frac{Di}{4}\right)(Do)\left(\operatorname{Sin}\left(\frac{180°}{PC}\right)\right)\right) \qquad \text{Eq. 12)}$$

Using the dimensions from the previous example, except this time the lower end cap uses a seal on the outside diameter instead of the inside diameter:

Do=4; Di=2; number of pleats=40; Pressure differential or drop (PD)=100 psid.

From the previous example, one knows that the total force acting in a negative axial direction (in direction of gravity) on the top end cap Ftu=−313.5 pounds.

By examination of FIG. 6, one can conclude that the pressure acting on the lower end cap surfaces, for one pleat, upstream of the filter media combine to create a net force of Pressure drop×Au in a downward or negative (−) direction. The pressure acting on the lower end cap surfaces, for one pleat, downstream of the filter media combine to create a net axial force of zero.

The total force acting on the lower end cap surfaces for all the pleats is:

$Ftl$=(−$PD$)($Au$)($PC$)

Using Eq. 12 one gets:

$$Ftl = (-PD)\left(\left(\frac{\pi}{4}\right)\left(\frac{Do^2}{PC}\right)\right) - \left(\left(\frac{Di}{4}\right)(Do)\left(\operatorname{Sin}\left(\frac{180°}{PC}\right)\right)\right)(PC)$$

Plugging in the numbers:

$$Ftl = (-100)\left(\left(\frac{\pi}{4}\right)\left(\frac{4^2}{40}\right)\right) - \left(\left(\frac{2}{4}\right)(4)\left(\operatorname{Sin}\left(\frac{180°}{40}\right)\right)\right)(40) = -629.0 \text{ pound}f$$

The net surface force on the lower end cap, not counting the force from the upper end cap, with the seal on the outside diameter, is acting in the opposite direction of the force that is acting on the lower end cap of the conventional design. Also, the magnitude of the force is larger than on the conventional design.

The net result is that the filter cartridge with the end cap using the seal on the outside diameter will be moved downward in the housing until it is stopped.

Example 3—Locating Seal(s) at an Intermediate Location

It is noted that it is not necessary to have the seal on the lower end cap to be at the outside diameter of the end cap in order to achieve this downward force Ftl described earlier. All that is needed to obtain a downward force Ftl is enough downward force to ensure that the filter cartridge will bottom out on the bowl thereby positioning the upper end cap such that it can transfer the majority of the force Ftu on the upper end cap through the inner liner.

One approach would be to decrease the diameter of the seal on the lower end cap such that the net axial forces on the lower end cap would be zero. The force on the upper end cap Ftu operating in a downward direction would ensure that the filter cartridge would bottom out against a bottom of the housing. Reducing the seal diameter further would cause the net force to begin to increase in an upward direction. Continuing to reduce the seal diameter will eventually reach a point where this diameter is the same diameter as the seal on the upper end cap, which would have axial forces the same as on a conventional filter cartridge. An electronic spreadsheet can be used to explore various diameters and forces to achieve a specific result.

Figure 8:
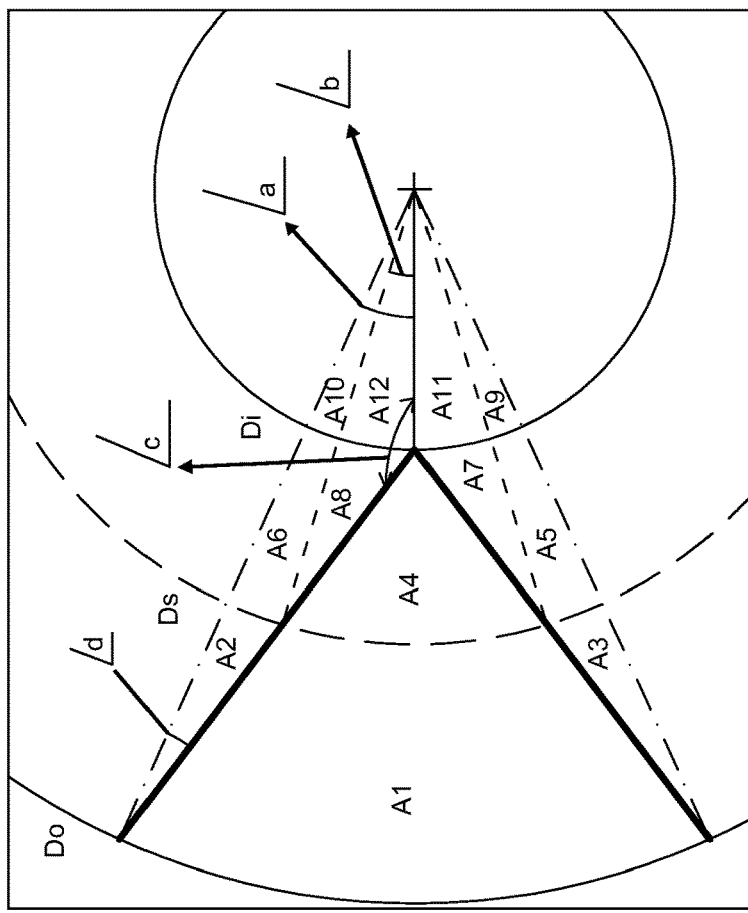
FIG. 8 is a schematic view analogous to FIG. 6.

Referring to FIG. 8 one can see that it is similar to FIG. 7 except that an additional diameter Ds has been added. This is the seal diameter on the lower end cap shown at a diameter other than at the outside or inside diameter. As a result the surface areas Ad1 and Ad2 (from FIG. 7) are now divided into three sections each A2, A6, & A8 for Ad1 and A3, A5, & A7 for Ad2.

The areas of interest are A2, A3, and A4. By inspection it can be seen that upstream pressure, applied to A1, is outside the diameter Ds of the seal. This means that the pressure on both sides of A1 are the same and therefore cancel each other out. This same condition, on the downstream side, can be found for areas A5, A6, A7 & A8.

Again, by inspection one can see that the pressure on area A4 acts in a downward (−) direction with a magnitude of pressure drop×A4. Also, by inspection one can see that due to symmetry, A2=A3. And the pressure on A2 & A3 acts in an upward (+) direction with a magnitude each of pressure drop×A2.

Through trigonometric equations one can find areas A4, A2, and A3 as a function of: Ds, the seal diameter; Do, the outside diameter of the media pack; Di, the inside diameter of the media pack; and, the number of pleats.

To find area A4 one must first find the angles ∠a, ∠d, ∠c, & ∠b as illustrated in FIG. 8. ∠a has been found previously.

$$\angle a° = \frac{180°}{PC} \quad \text{(Eq. 2)}$$

From the Solutions of Oblique angled triangles one knows that:

$$\angle d° = \left( \frac{\operatorname{Tan}^{-1}\left(\left(\frac{Di}{2}\right)(\operatorname{Sin}\angle a°)\right)}{\frac{Do}{2}} \right) - \left(\left(\frac{Di}{2}\right)(\operatorname{Cos}\angle a°)\right)$$

and $$\angle c° = 180° - (\angle a° + \angle d°)$$

and using the solutions of Oblique angled triangles:

$$\angle b° = 180° - \left(\angle c° + \operatorname{Sin}^{-1}\left((Di)\left(\frac{\operatorname{Sin}\angle c°}{Ds}\right)\right)\right)$$

Again from the equation for the area of a circular sector one knows that:

$$A_4 + A_7 + A_8 + A_{11} + A_{12} = 0.008727(2)(\angle b°)\left(\frac{Ds^2}{4}\right) \quad \text{(Eq. 14)}$$

And from symmetry one knows that:

$$A_7 = A_8; \& A_{11} = A_{12}$$

Combining and solving for A4 one gets:

$$A_4 = \left(0.008727(2)(\angle b°)\left(\frac{Ds^2}{4}\right)\right) - (2(A_8 + A_{12})) \quad \text{(Eq. 15)}$$

From the Solutions of Oblique angled triangles one knows that:

$$A_8 + A_{12} = \left(\frac{Di}{2}\right)\left(\frac{Ds}{2}\right)\left(\frac{\operatorname{Sin}\angle b°}{2}\right) \quad \text{(Eq. 16)}$$

Substituting Eq. 16 into Eq. 15 one gets:

$$A_4 = \left(0.008727(2)(\angle b°)\left(\frac{Ds^2}{4}\right)\right) - \left(2\left(\frac{Di}{2}\right)\left(\frac{Ds}{2}\right)\left(\frac{\operatorname{Sin}\angle b°}{2}\right)\right)$$

Reducing down one gets:

$$A_4 = (0.004364(\angle b°)(Ds^2)) - (0.25(Di)(S)(\operatorname{Sin} \angle b°)) \quad \text{(Eq.17)}$$

From basic trigonometry one knows that the area of a section of a flat ring described by an outside diameter (Do), an inside diameter (Di), and angle θ° describing the arc of the section, is:

$$\text{Area} = \left(\frac{\theta°}{360°}\right)\left(\frac{\pi}{4}\right)(Do^2 - Di^2) \quad \text{(Eq. 18)}$$

Therefore:

$$A_1 + A_2 + A_3 = 2\left(\frac{\angle a°}{360°}\right)\left(\frac{\pi}{4}\right)(Do^2 - Di^2)$$

and knowing that A2=A3, Eq. 18 becomes:

$$A_1 + 2(A_2) = 2\left(\frac{\angle a°}{360}\right)\left(\frac{\pi}{4}\right)(Do^2 - Ds^2)$$

And solving for A2:

$$A_2 = \left(\frac{\angle a°}{360°}\right)\left(\frac{\pi}{4}\right)(Do^2 - Ds^2) - \left(\frac{A_1}{2}\right) \quad \text{(Eq. 19)}$$

And again from symmetry:

$$A_2 + A_6 + A_8 + A_{10} + A_{12} = A_3 + A_5 + A_7 + A_9 + A_{11} \quad \text{(Eq.20)}$$

Also from the equation of a circular arc:

$$A_1 + A_2 + A_3 + A_4 + A_5 + A_6 + A_7 + A_8 + \quad \text{(Eq. 21)}$$
$$A_9 + A_{10} + A_{11} + A_{12} = .008727(2)(\angle a°)\left(\frac{Do^2}{4}\right)$$

Applying Eq. 20 to Eq. 21 one gets:

$$A_1 + A_4 + 2(A_2 + A_6 + A_8 + A_{10} + A_{12}) = .008727(2)(\angle a°)\left(\frac{Do^2}{4}\right) \quad \text{(Eq. 22)}$$

From the Solutions of Oblique angled triangles we know that:

$$A_2 + A_6 + A_{10} + A_{12} = \left(\frac{Di}{2}\right)\left(\frac{Do}{2}\right)\left(\frac{\sin \angle a°}{2}\right) \quad \text{(Eq. 23)}$$

Applying Eq. 23 to Eq. 22 and solving for $A_1$:

$$A_1 = .008727(\angle a°)\left(\frac{Do^2}{2}\right) - A_4 - 2\left(\frac{Di}{2}\right)\left(\frac{Do}{2}\right)\left(\frac{\sin \angle a°}{2}\right)$$

Simplifying we get:

$$A_1 = 0.004364(\angle a°)(Do^2) - A_4 - 0.25(Di)(Do)(\sin \angle a°) \quad \text{(Eq. 24)}$$

Substituting Eq. 24 into Eq. 19 and simplifying:

$$A_2 = .002182(\angle a°)(Do^2 - Ds^2) - (.002182(\angle a°)(Do^2)) + \frac{A_4}{2} + (.125(Di)(Do)(\sin \angle a°)) \quad \text{(Eq. 25)}$$

Now both areas A2 and A4 are known in terms of known parameters (Do, Di, number of pleats). By inspection (FIG. 8) one knows that; A2=A3; that the upstream pressure Pu acts on the area A4, while the downstream pressure Pd acts on the areas A2 and A3; and that on the rest of the areas (A1, A5, A6, A7, and A8) the pressure on either side of the end cap is the same and therefore cancel each other out in the axial direction.

In order to achieve a force balance on the end cap such that the next axial force is equal to zero, one must find a geometry such that:

$$A_2 + A_3 = A_4 \quad \text{(Eq. 26)}$$

Since A2=A3, one can rewrite Eq. 26:

$$2(A_2) = A_4 \quad \text{(Eq. 27)}$$

Substituting Eq. 25 into Eq. 27 we get:

$$0.004364(\angle a°)(Do^2 - Ds^2) - (0.04364(\angle a°)(Do^2)) + A_4 + (0.25(Di)(Do)(\sin \angle a°)) = A_4$$

Rearranging the equation gives us:

$$0.004364(\angle a°)(Do^2) - (0.04364(\angle a°)(Ds^2)) - 0.04364(\angle a°)(Do^2) + (0.25(Di)(Do)(\sin \angle a°)) = A_4 - A_4 = 0$$

Reducing the equation:

$$0.004364(\angle a°)(Ds^2) = 0.25(Di)(Do)(\sin \angle a°) \quad \text{(Eq. 28)}$$

Recalling Eq. 2:

$$\angle a° = \frac{180°}{PC}$$

gives us the following equation:

$$.004364\left(\frac{180°}{PC}\right)(Ds^2) = .25(Di)(Do)\left(\sin\left(\frac{180°}{PC}\right)\right)$$

And solving Eq. 28 for Ds:

$$Ds = \sqrt{\frac{(Do)(Di)\left(\sin\left(\frac{180°}{PC}\right)\right)}{.017452\left(\frac{180°}{PC}\right)}}$$

Further simplifying the equation:

$$Ds = \sqrt{.3183(Do)(Di)\left(\sin\left(\frac{180°}{PC}\right)\right)(PC)}$$

And recognizing that 0.3183 is the reciprocal of π:

$$Ds = \sqrt{(Do)(Di)\left(\sin\left(\frac{180°}{PC}\right)\right)\left(\frac{PC}{\pi}\right)} \quad \text{(Eq. 29)}$$

Solving Eq. 28 for Di:

$$Di = \frac{\pi(Ds^2)}{(PC)(Do)\left(\sin\left(\frac{180°}{PC}\right)\right)} \quad \text{(Eq. 30)}$$

Solving Eq. 28 for Do:

$$Do = \frac{\pi(Ds^2)}{(PC)(Di)\left(\sin\left(\frac{180°}{PC}\right)\right)} \quad \text{(Eq. 31)}$$

For example, using the earlier dimensions of Do=4 inches, Di=2 inches, and number of pleats=40; applying Eq. 29:

$$Ds = \sqrt{(4)(2)\left(\sin\left(\frac{180°}{40}\right)\right)\left(\frac{40}{\pi}\right)} = 2.827 \text{ inches}$$

In order to achieve a force balance on the end cap such that the net axial force on the end cap is equal to zero, with a pleat pack outside diameter (Do) of 4 inches; an inside diameter (Di) of 2 inches; and total number of pleats of 40, one would need a seal diameter (Ds) of 2.83 inches. Thus, at 2.83 inches, for the system defined, Ds=Db. This would be the diameter where the seal and the sealing surface make contact.

With respect to the overall element, lab testing can be used to evaluate the net axial load on the element. In particular, as an approach, a load cell can be placed on the inside diameter of the filter cartridge. One end of the load cell would be attached to the upper end cap, the other end attached to the lower end cap. The filter cartridge would be placed into the filter housing. Oil, at a standard test flow, would pass through the filter cartridge. Test dust or other contaminant would be injected upstream of the filter cartridge. As the filter collects the test duster contaminant, pressure drop across the filter would increase, thereby increasing the axial load in the filter cartridge. A filter cartridge using a standard sealing arrangement will generate an axial force on the load cell. This force will increase in proportion of the pressure drop across the filter. A filter cartridge using the preferred seal arrangements characterized, would have resolved all or most of the axial forces on the filter cartridge. This would be assessed, as the pressure drop would increase across the media, by observations of relatively little, if any, increase on the axial force of the load cell.

Figure 10:
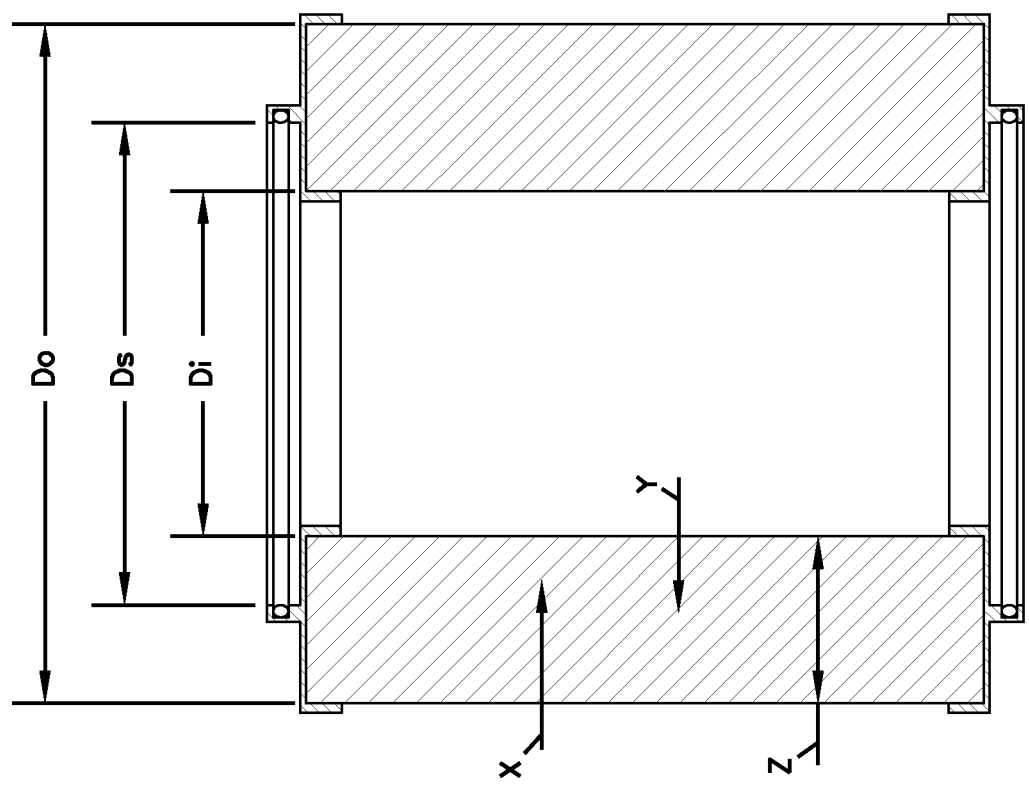
FIG. 10 is a schematic depiction useable to define terms used in FIG. 11.
Figure 11:
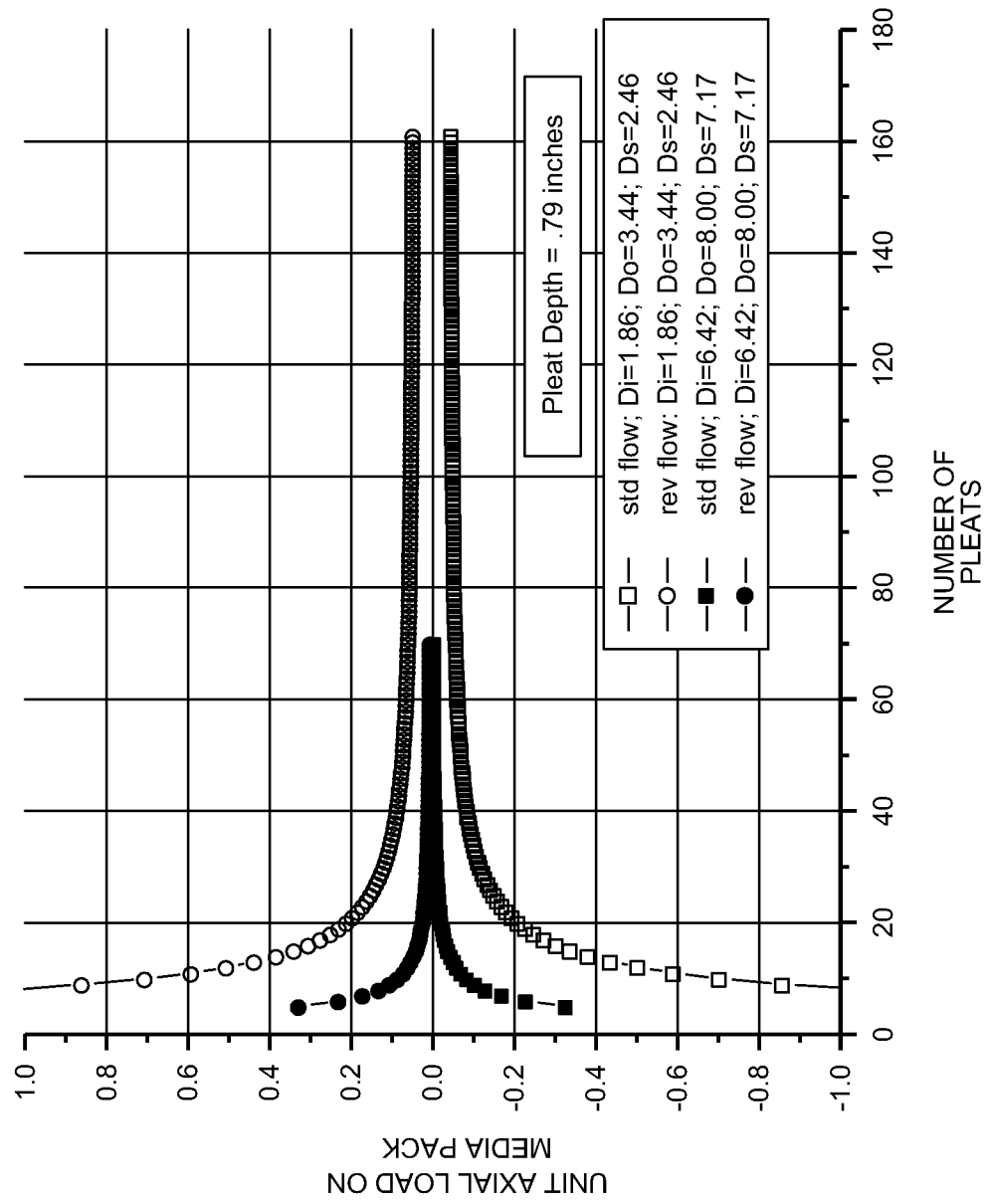
FIG. 11 is a graph showing the relationship between pleat number and preferred seal location, for several different systems.

It is noted that the above formulations indicate the number of pleats as a variable in the formulation. As a practical matter, with typical liquid cartridges, once the pleat population is sufficiently high, its increase does not substantially change the preferred location for Db. This is exemplified by the mathematical model plotted in FIG. 11. In FIG. 11, the number of pleats is plotted on the X axis, and the Y axis represents unit axial load. The dimensions refer to FIG. 10. It can be seen that above a pleat population of about 20, for example 20-30, there is relatively little change in axial load, as the number of pleats change. Referring to FIG. 10, arrow X indicates a direction of out-to-in flow or standard (std) flow. Arrow Y indicates a direction of in-to-out flow or reverse (rev) flow. Dimension Z indicates pleat depth.

These variables are identified in the graph on FIG. 11.

B. Design Approaches Using the Principles

The above principles allow one to create a coreless (no inner liner at all or none having capability to withstand an axial load above 20 lb.) filter cartridge which is not subject to excessive axial loads on the media pack during filter loading. The following design guidelines assume that the cartridge is open on both ends and that an inner liner for pleat support (radial) is part of the filter housing.

One can start with the outside diameter (Do) and inside diameter (Di) of the pleat pack and the pleat count (PC).

Using the following equation derived from the above calculations, the seal diameter (DsB) that will give an axial load of zero can be calculated:

$$DsB = \sqrt{\frac{(Do)(Di)(\mathrm{Sin}(180/PC))(PC)}{\pi}}$$

For example: Do=3.27 inches; Di=1.59 inches; PC=50

$$DsB = \sqrt{\frac{(3.27)(1.59)(\mathrm{Sin}(180/50))(50)}{\pi}} = 2.28 \text{ inches}$$

DsB represents the tube outside diameter that seals on the I.D. of the o-ring. Looking up this diameter in a catalogue for standard sized o-rings (such as Parker Seals GL-10/91) indicates the closest tube O.D. to be 2.25 inches (page A5-5, o-ring size 2-035).

Depending upon the particular requirements one could choose to use the standard 2-035 o-ring with a tube O.D. of 2.25 inches and accept some axial load on the media pack. A second option would be to use the following equations to calculate the proper dimensions of the cartridge having DsB=2.25 instead of 2.28.

To maintain an axial load of zero, use the standard o-ring 2-035, and keep PC=50; and Di=1.59; the following equation calculates the new Do:

$$Do = \left(\frac{\pi(Ds^2)}{(PC)(Di)(\mathrm{Sin}(180/PC))}\right)$$

Plugging in the numbers gives:

$$Do = \left(\frac{(\pi)(2.25^2)}{(50)(1.59)(\mathrm{Sin}(180/50))}\right) = 3.19 \text{ inches}$$

If, in the alternative, one wanted to keep PC=50; and Do=3.27; the following equation calculates the new Di:

$$Di = \left(\frac{(\pi)(Ds^2)}{(PC)(Do)(\mathrm{Sin}(180/PC))}\right); \text{ and thus,}$$

$$Di = \left(\frac{(\pi)(2.25^2)}{(50)(3.27)(\mathrm{Sin}(180/50))}\right) = 1.55 \text{ inches}$$

If one wanted to keep the original media pack dimensions along with the standard tube diameter (Do=3.27; Di=1.59; Ds0=2.25), the following equation will calculate the amount of axial load (Fa) that will be applied to the media pack. To do this one needs one more piece of information; the pressure drop (PD) across the media pack. For this example 200 psid will be used (many hydraulic filter cartridges are designed to withstand up to 200 psid).

$$Fa = (0.25)(PD)(\pi(Ds^2) - (PC)(Di)(Do)(\mathrm{Sin}(180/PC)))$$

Again, plugging in the numbers:

$$Fa = (0.25)(200)(\pi(2.25^2) - (50)(1.59)(3.27)(\mathrm{Sin}(180/PC))) = -21.0 \text{ lbf (pounds of force)}$$

The minus (−) indicates the media pack is under compression.

As long as one stays at or above 20 pleats (PC ⊒ 20), change in PC has little affect in any of the above equations.

It is also recognized that for any type of filter cartridge design, there is an annular area surrounding the media pack which is formed by the outside diameter of the pleat pack and the inside diameter of the filter housing (Gap 1). Since there can be more than one type of housing used for a given filter cartridge, there will be a range of gaps that can be used. This gap allows for some design flexibility in choosing the pleat pack O.D.

Therefore, when designing a filter cartridge using the described design approach, one needs to take into account the flexibility this gap (Gap 1) provides.

Also, there is another annular gap that is critical to the structural integrity of the filter cartridge (Gap 2). This annular gap is formed by the inside diameter of the media pack and the outside diameter of the liner. Under standard flow condition (fluid flowing radially inward through the media pack), the primary job of the liner is to provide radial support to the media. As fluid flows through the media, the pressure drop across the media creates a force on the media that is directed radially inward. The liner supports the media against the force. If there is a gap between the I.D. of the media pack and the O.D. of the liner, the media pack will have to move the distance of the gap before the liner can provide any support. Because the media is somewhat flexible, a certain amount of gap is acceptable. If the gap becomes too large the media will flex too much and will prematurely fail.

Because of Gap 2 between the media and the liner, it is advisable to maintain a minimum gap for any of the coreless cartridge designs. This means defining an appropriate (Di) that relates to a properly sized liner. As mentioned earlier, PC can be any number ∃ 20. Next, select an initial Do based on the requirements needed for Gap 1. Then, using the above equation for DsB, one can calculate the tube diameter for the seal.

Next, determine the maximum axial load (Fmax) that can be applied to the media and use the following equation to calculate the maximum Do for a filter cartridge that has a fixed Di and DsB.

As an example, we shall use the information previously calculated. Di=1.59 inches; PC=50; and assume a Gap 1 which gives Do=3.27. Using the equation for DsB gives DsB=2.28.

Now lets assume a maximum axial load (Fmax) of −100 lbf at a pressure drop (PD) of 200 psid.

$$Do = \frac{((\pi)(Ds0^2)) - ((4)(Fmax/PD))}{(PC)(Di)(\mathrm{Sin}(180/PD))}$$

Plugging in the numbers:

$$Do = \frac{((\pi)(2.28^2)) - ((4)(-100/200))}{(50)(1.59)(\mathrm{Sin}(180/50))} = 3.67 \text{ inches}$$

So for this design, (Do) can range from 3.27 to 3.67 without exceeding the maximum acceptable axial load on the media pack of −100 lbf.

Figure 14:
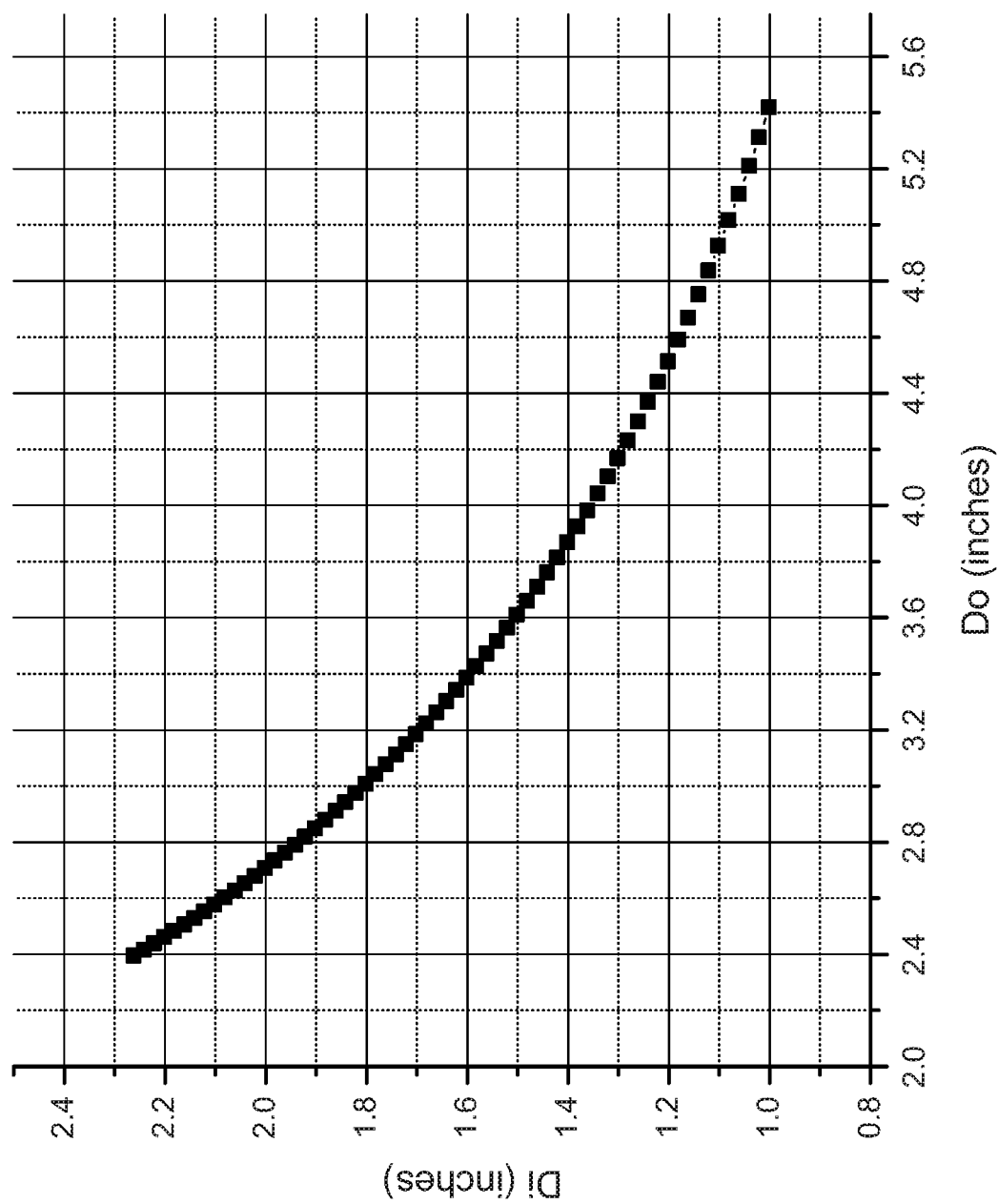
FIG. 14 is a graph showing relationship between Di and Do for a defined system.

Attention is now directed to FIG. 14. In FIG. 14 a graph is presented showing a plot of Di vs. Do, for: a given pressure (PD) max (200 psig); defined acceptable force max on the filter cartridge (40 pounds of force) a defined Ds; a defined pleat count; and a defined maximum effective area that the pressure can differential can act upon, Ae. This figure (Ae) of course would be zero, if the seal was specifically at Db. Thus, Ae is the amount of area the pressure differential can act upon to stay within the limited force range desired.

From the plot of FIG. 14, it can be seen that under the conditions specified there is an inverse relationship between Di and Do. Thus, if the intent is to increase Do, Di would be reduced, and vice versa.

Attention is now directed to FIG. 15. Here some examples of calculations are shown, for fixed variables. The parameters are stated in the figure.

For the particular example evaluated, the pressure differential max is identified as 200 psid, the force max acceptable on the filter cartridge is 40 pounds of force.

The pleat count was fixed at 50, initially Do at 3.27 inches and Di at 1.59 inches.

When this was the case, Ds was calculated as being at 2.28 inches, for Db.

The next several lines indicate how Do could be changed, and what its ultimate affect on the force. Do could be increased to 3.43 inches, maintaining Di and Ds fixed, with the force max going up to 40 pounds. Do could be decreased to 3.11 inches, with Di and Ds fixed, the force max changing to 40 pounds in the opposite direction.

The next two lines in the table show the effect of maintaining Do and Ds fixed, and moving Di. Di could be moved up to a maximum of 1.67, while maintaining the force and no higher than 40 pounds. Di could be decreased to 1.51 inches, with a force going up to 40 pounds in the opposite direction.

The next two lines indicate how the seal Ds could be moved, with Do and Di figures fixed. The seal can be moved down to 2.22 inches, with the force not exceeding the 40 pound range; and the seal could be moved up to 2.33 inches, with the seal not exceeding the 40 pounds.

Certain other figures in the table indicate relative percents from some of the calculations.

The lower table shows a calculation for an element having a different size assumed.

V. A Specific Example, FIGS. 12 and 13

Figure 12:
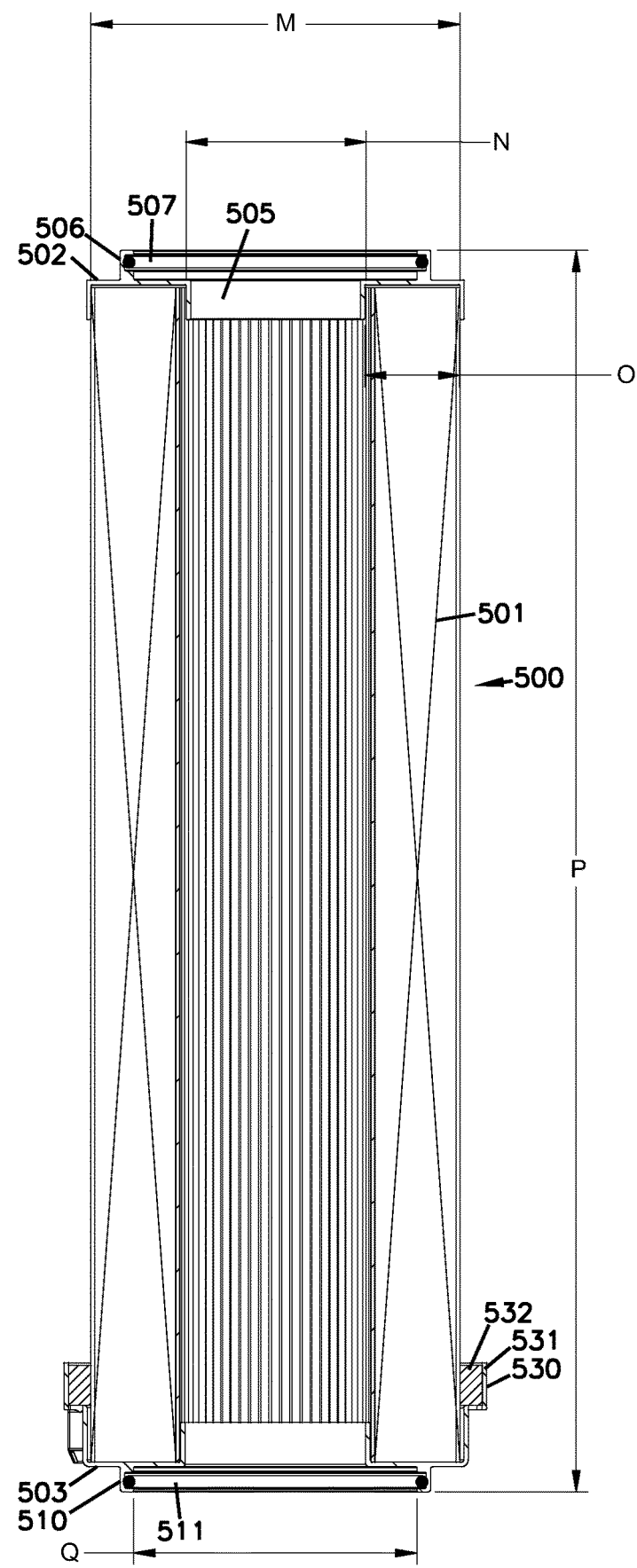
FIG. 12 is a cross-sectional view of an example filter cartridge.

In FIG. 12, an example filter cartridge employing principles according to the present disclosure is provided. The cartridge 500 comprises pleated media 501 extending between first and second opposite end caps 502, 503. The particular construction is coreless, and has no inner core or outer core. End cap 502 is open, with aperture 505 therein. End cap 503 is also open. Projecting axially outwardly from cap 502 is seal support 506 with seal 507 thereon. Seal 507 is configured for radial sealing in an inward direction.

Axially projecting outwardly from end cap 503 is seal support 510 with seal 511 thereon. Seal 511 is also configured for sealing radially inwardly.

To create a balance in the sealing with: the outside pleat diameter (M) being 83.0 mm; the inside diameter of the pleats (N) being 40.5 mm, and the pleat depth (O) being 21.3 mm; the seal diameter Ds (indicated at Q) is 57.9 mm, for each of seals 507, 511. In this instance Ds corresponding to Q, would be Db.

For the example shown, the pleat length is 279 mm.

Still referring to FIG. 12, the cartridge 500 further includes a contaminant and containment collection feature 530. The feature comprises an extension 531 having media 532 therein. When the cartridge 500 is installed, as it is removed liquid flow through media 532 filters the standing liquid in the cartridge. Principles relating to contaminant containment arrangements are described for example in PCT Publication WO 02/081052, of Oct. 17, 2002, incorporated herein by reference.

Figure 13:
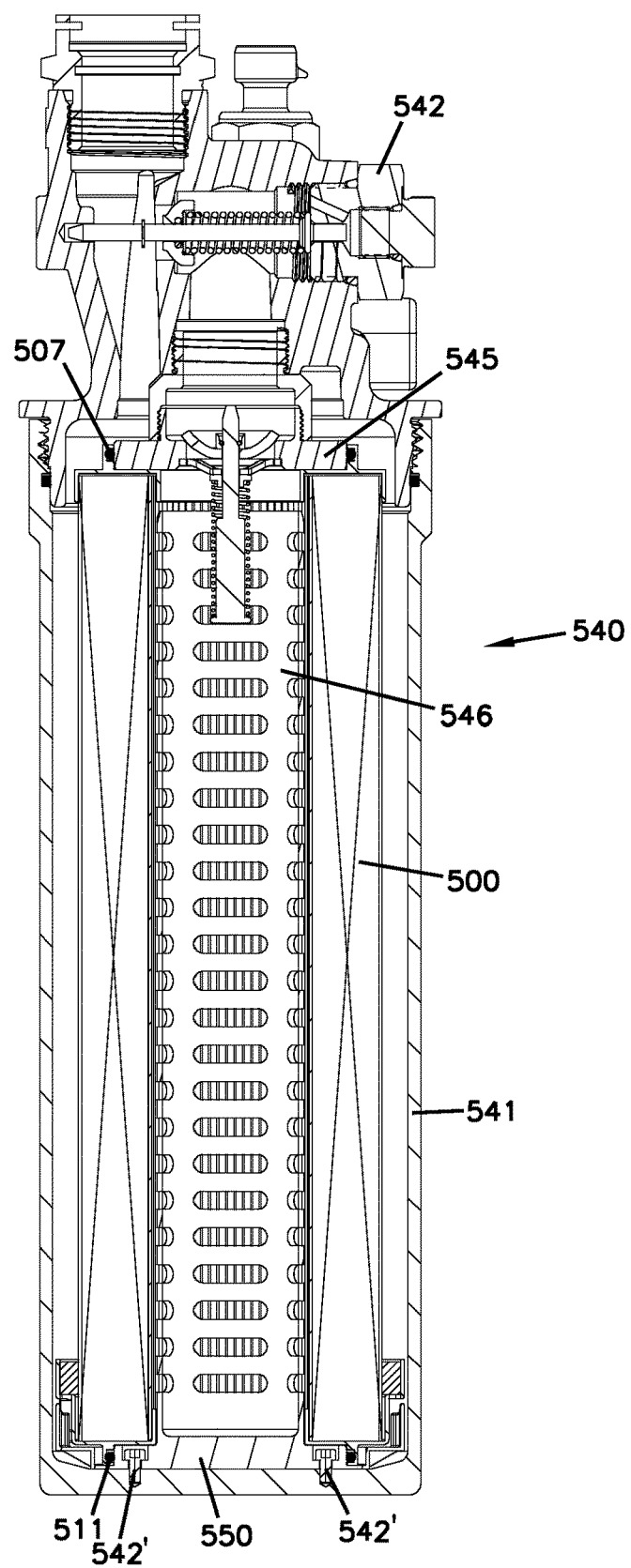
FIG. 13 is a cross-sectional view of an assembly depicting the filter cartridge of FIG. 12 in a housing.

In FIG. 13 cartridge 500 is shown installed in an overall filter arrangement 540 comprising a housing 541 secured to a filter head 542. Seal 507 is shown sealing to structure 545, in this instance a portion of an inner pipe or core arrangement 546. Seal 511 is shown secured to a portion of housing base 550. In this instance portion 550 is secured to a remainder of the housing 541 by bolts 542'. Thus, portion 550 is an adaptor positioned in housing 541, at a bottom thereof, to accommodate seal 511. Portion 550 also helps center cartridge 500 in housing 541, during installation.

VI. Selected General Observations Concerning Mechanical Structures; Assemblies; and, Methods

A. Mechanical Filter Cartridge Structures.

The present disclosure provides for a variety of alternate configurations for filter cartridges, from conventional ones. Preferred ones have been previously described, in which one or more seal locations are defined with respect to Db, or in general with respect to location were certain surface axial forces will result in use, in the corresponding end cap.

In this section, some various additional or alternative mechanical constructions and features are characterized. These can be used, advantageously, to provide for desirable filter cartridges. However, not all are required to be used together, to obtain some benefit.

1. Provision of a closed end cap which nevertheless has an axial seal support projecting axially outwardly therefrom, preferably with a seal member thereon.
2. Provision of filter cartridge with at least one end cap thereon, which has a radial seal support thereon, at a location intermediate: (a) an outer location at an outer edge of the media; and, (b) an inner location radially equal to a most radially inward projection of media. Typically and preferably the axially outwardly projecting support is located to support a seal at a location at least 10% of the distance across the end cap, (from outer pleat tip to the inner pleat tip) from either pleat tip edge, typically at least 15% of that distance.
3. A filter cartridge with two end caps as described at 2 above.
4. A filter cartridge in accord with any of the above three general characterizations, which has no inner axial load support core.
5. A filter cartridge in accord with any of the above four characterizations, which has no outer axial load support liner.

Based on the above principles, an approach to design of a filter cartridge for liquid system can be as follows:

1. Determine a ΔP across the filter media (max.) and capability of the filter cartridge for accepting axial load (F max) for a given housing system with a diameter of a pleat tip support tube (which will establish Di) as well as maximum housing diameter (which will establish Do), the seal location Ds can be located to provide DsB (the balanced location) at a location with a range such that under normal operating conditions, F max will not be exceeded.
2. Similarly, each of the identified parameters can be treated as a variable with the others fixed or fixed over range, allowing for their specific calculation and preferred filter cartridge configurations.

Herein, an example was provided relating to a hydraulic filter which there was an assumed ΔP max with a 200 psid, as is typical for many hydraulic filters. F max, the maximum amount of load the filter cartridge can accept would not be fixed in all instances, it would be a function of the material chosen. For an example, a maximum force of −40 lbf (pounds of axial force) was used for purposes of calculation; however higher or lower figures could be used, depending on the system.

For a lube system, we can expect different limits. ΔP max for many lube systems would be lower than the 200 psid for hydraulic systems, for example in the range of 100-150 psid. F max again would be a function of the materials chosen. It could be −40 lbf, but could have other values as well.

It is again noted that when the seal diameter is discussed herein, seal diameter is meant to refer to the diameter of the interface between the seal ring and the corresponding housing component, when the cartridge is in place.

B. Assemblies.

Of course the present disclosure relates to overall filter assemblies, having cartridges as characterized herein within them. The overall filter assemblies may be configured for top load or bottom load. The features of the assemblies may be in accord with the general features characterized in the descriptions and/or examples above.

The liquid filter assemblies may, again, be configured, for example, as oil (lube) filters, fuel filters or hydraulic filters.

C. Methods of Assembly, Use and Servicing.

In general, methods of assembly and use are provided. The methods of assembly generally involve configuring components in accord with the descriptions herein. The methods of use generally involve directing liquid flow through a serviceable filter cartridge constructed in accord with the principles described herein, with net effects as characterized resulting. In some instances, a seal between the cartridge and the housing base also provides for centering, during servicing.

VII. Additional Examples, FIGS. 16 and 17

A. Spin-On Assembly, FIG. 16.

Figure 16:
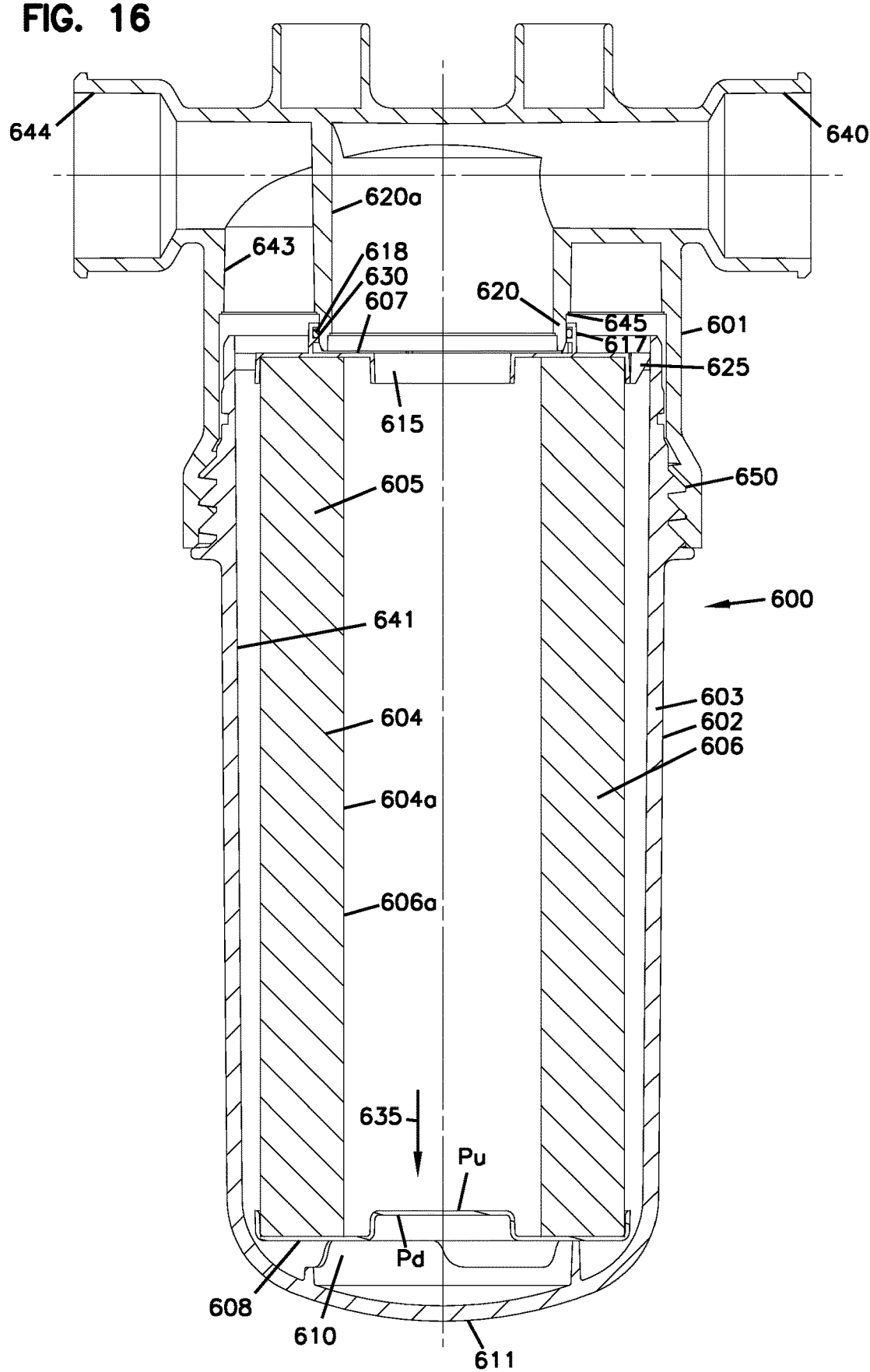
FIG. 16 is a side cross-sectional view of another alternate embodiment.

The reference numeral 600, FIG. 16 generally indicates a liquid filter arrangement according to a further embodiment of the present disclosure. The arrangement 600 includes a filter head 601 and a removable liquid filter assembly 602. The filter assembly 602 comprises an outer wall 603 and an internal cartridge 604.

The particular liquid filter assembly 602 depicted, is a "spin-on" assembly, meaning that the componentry 602 is generally removed and replaced during a service operation. That is, the cartridge 604 is generally received in the housing 603 such that when the housing 603 is disconnected from the filter head 601, in use, servicing involves replacement of the liquid filter assembly 602 with a new housing 603 and new cartridge 604, previously assembled together. That is, the cartridge 604 is not removed from housing 603 during servicing.

Referring still to FIG. 16, the cartridge 604 comprises media 605, in this instance pleated media 606 extending between first and second opposite end caps 607, 608 respectively. End cap 608 is a closed end cap, shown supported on support structure 610 within bottom 611 of housing 603. The cartridge 604 includes an inner liner at 604*a*.

End cap 607 is an open end cap, having flow aperture 615 therethrough. End cap 607 includes seal support arrangement 617 supporting o-ring seal 618, for sliding over post 620 during installation, and sealing around post 620 during use.

End cap 607 further includes outwardly projecting flange 625, which can be in positioned to engage structure on housing 603, to inhibit removal of cartridge 604 from housing 603, after initial installation.

It is noted that the particular cartridge 604 depicted, is outer liner free.

The seal 630 defined in this instance by o-ring 618 has a sealed diameter Ds located, for example, at or near the balance point Db, discussed previously.

End cap 608, is supported against motion downwardly in the direction of arrow 635, by supports 610.

Assembly 600 is configured for out-to-in flow, with flow of unfiltered liquid to be filtered into the head 601 occurring at 644, and then through entry 643 into annulus 641 around filter cartridge 604. The liquid would then filtered, by passage through the media 606 into inner region 606*a*. The filtered liquid would then flow into channel 620*a* in head 601, and outwardly through outlet flow exit 640.

Having an out-to-in flow pattern, will generate a higher upstream pressure region Pu versus a lower downstream pressure $P_d$, on end cap 608, which will generally drive the end cap 608 upwardly, i.e., opposite the direction of arrow 635.

Post 620 includes stop 645 thereon, which will be engaged by seal support arrangement 617, should the cartridge begin to slide in the opposite direction of arrow 635, under the biasing forces indicated.

On end cap 607, the location of seal 630, again, can be positioned essentially at a balance point $D_b$, so there would be no upper or downward forces from the liquid pressure differential on the end cap 607, if desired. Alternatively, the seal 630 can be positioned alternately, within the range of locations around Db, as described herein.

Still referring to FIG. 16, the particular method of engagement between assembly 602 and filter head 601 is through threaded engagement as shown at 650.

Of course spin-on assemblies analogous to assembly 602 could be configured for "in-to-out" flow, across the media pack 604, if desired.

B. An Alternate Liquid Filter Cartridge Arrangement, FIG. 17.

Figure 17:
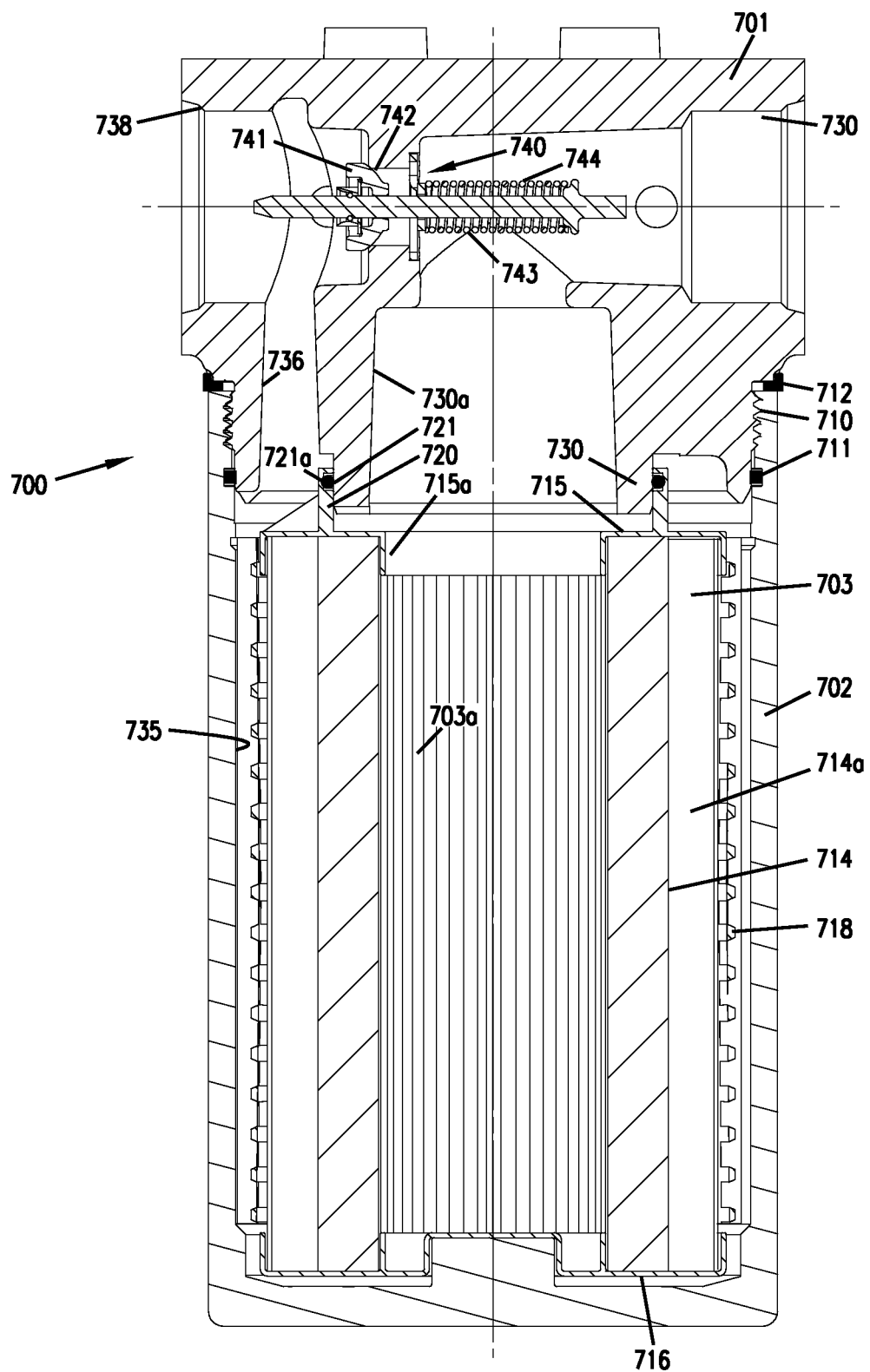
FIG. 17 is a side cross-sectional view of still another alternate embodiment.

In FIG. 17, liquid filter arrangement 700 is depicted comprising a filter head 701, a removable housing 702 and a filter cartridge 703. In this instance, the cartridge 703 is a serviceable cartridge, that can be removed and replaced by disconnecting housing 702 from head 701, at threads 710, replacing the cartridge 703 within bowl 702, and then remounting bowl 702 on head 701.

Seal 711, 712 are shown to inhibit leakage outwardly from bowl 702.

The cartridge 703 is shown configured for in-to-out flow, although alternate configurations are possible. The cartridge 703 comprises media pack 714, in this instance comprising pleated media 714a, extending between upper end cap 715 and lower end cap 716. For the example shown, lower end cap 716 is closed. Around the media pack 714 is provided an outer support 718, which can comprise a coiled roving or liner, as desired.

End cap 715 is open having central aperture 715a. End cap 715 further includes seal support 720 thereon, supporting seal member 721, in this instance comprising o-ring 721a.

The cartridge 703 is positioned with seal member 721 sealed against post 730 in which flow aperture 730a is provided, in communication with open interior 703a of cartridge 703.

During a normal operation, liquid flow would enter through inlet 730 and head 701, and be transported through conduit 730a into open region 703a. The liquid would then be filtered upon passage through the media pack 714 into outer annulus 735. The liquid, now filtered, would enter conduit 736 and head 701, and exit through liquid flow outlet 738. Assembly 700 includes a bypass valve arrangement 740 therein, allowing for a liquid flow to bypass cartridge 703, should the cartridge 703 become sufficiently occluded. The bypass valve 740 comprises a valve head 741 maintained closing aperture 742 by biasing arrangement 743 comprising in this instance a coiled spring 744.

The seal support 720 is shown positioned on end cap 715, at a location appropriate to support the seal arrangement 721 and sealing against post 730, at a location either corresponding to Db, or modified from Db as described herein.

VIII. Further Regarding Approach to Liquid Filter Design

Based on the above principles, still further definitions regarding filter design to take advantage of principles according to the present disclosure, have been developed. These are indicated herein with respect to FIGS. 18-32. In FIGS. 18-32, all linear dimension figures are in inches and all area figures are in square inches.

A. Data Presentation, FIGS. 18-26

In FIGS. 18-26, plots of selected data and calculated data, for liquid filter arrangements utilizing variations and principles according to the present disclosure are provided. In reviewing the tables of FIGS. 18-26, the following definitions should be considered:

1. Column 1

In the first column labeled Do is provided a selected outside diameter of the pleat pack. The outside diameter of a pleat pack having pleated media, is the diameter defined by the pleat tips. For the tables of FIGS. 18-20 (Group 1), Do is ranged from 2.5 inches (63.5 mm) up to 5.5 inches (139.7 mm) in 0.1 inch (2.54 mm) increments, herein these are called "Group 1." In FIGS. 21-23, Do is ranged from 5.6 inch (142.2 mm) to 10 inch (254 mm) in 0.1 inch (2.54 mm) increments, herein these are sometimes called "Group 2." In FIGS. 24-26, Do is ranged from 1.5 inch (38.1 mm) to 2.4 inch (61 mm) in 0.1 inch (2.54 mm) increments; these are sometimes called "Group 3."

The grouping of Group 1, Group 2 and Group 3, for the tables of FIGS. 18-26, is a grouping based on selected outside diameter or size, for consideration. The groups are not meant to be otherwise significantly distinct. The transitions between the group (over a step of 0.1 inch (2.54 mm)) are not intended to be discounted. As discussed below in connection with the graphs of FIGS. 26-32, the graphs can b considered as continuous across all regions identified.

The groupings could be of some assistance in considering application of the techniques described herein, to liquid filter applications, since the groupings do generally relate to small, medium and large size filter cartridges.

2. Column 2

In the tables of FIGS. 18-26 the term Di stands for the inside diameter of an identified pleat pack. For pleated media this would typically be the inside diameter defined by the pleat tips. In many filter cartridges, the optimum pleat depth is considered to be the outside diameter (od or Do) divided by 4. Under such circumstances, Di=Do−(Do÷4). Or, alternately stated, Di=0.5×Do. For the tables of FIGS. 18-26, this formulation was used to define Di for a given definition of Do.

3. Column 3

In FIGS. 18-26, in column 3 the "Plt Dpth" stands for pleat depth. Of course pleat depth is related to Do as previously defined. Thus, for the entries in the column entitled "Plt Dpth," a calculation of (Do−Di)/2 is used.

4. Column 4

The fourth column in the table entitled "Plt Cnt" refers to the number of pleats or pleat count, for the example. As previously discussed herein, once the pleat count has reached 20, in general addition of still more pleats does not change significantly the calculation of Db. Thus, for the examples analyzed in the tables of FIGS. 18-26, the pleat count in all instances was set at 20.

5. Column 5

The next column in the tables of FIGS. 18-26 is termed "Gap." The "gap" is a variable selected, for purposes of the calculations reported in FIGS. 18-26, as an amount that Do and Di will be varied against the fixed seal location of col. 6 for comparison discussed below.

For the data presentations in the tables, three sizes of gaps were used, to show data ranges. The sizes are "7%," "12%," and "22%." The use of these figures, to develop calculated data for comparison, will be apparent from the definitions of further columns.

6. Column 6

The next column in the tables of FIGS. 18-26 is entitled either "Ds=Db (calculated)" or "Ds/calc." This is an indication of where the seal location would be if it was at a calculated balance point Db, for Do (col. 1), Di (col. 2), and pleat count 20 (col. 4) in accord with the descriptions herein such that calculated forces on opposite sides of the end cap would be equal to each other. The calculation approach would be in accord with the descriptions previously provided herein, using the identified Do, Di and pleat count. Of course, again, once pleat count is 20 or higher, it is considered not to affect the equation when varied, substantially.

For each of the identified locations of Db, in the sixth column, the seal location when at Db is at a position spaced across the end cap from each pleat tip edge.

The location of Db, col. 6 would be the same for cartridge having Do (col. 1) and Di (col. 2) as defined, without regard to whether the cartridge is designed for in-to-out flow or out-to-in flow as discussed herein.

7. Column 7

The seventh column in the tables of FIGS. 18-26 is entitled "Do min." The term Do min" is meant to indicate a variation in the cartridge of the identified line, in which Do has been reduced by the selected "Gap" of col. 6, even though Di and seal location (Ds) have remained fixed. In general Do min=(1−Gap)×Do. Thus, for the first line in the table of FIG. 18, Do min=(1-0.07)(2.5); i.e., 0.93 (Do) or 2.33 inch.

8. Column 8

In the eighth column, Do min (col. 7) is stated as a percent of Db (col. 6). That is, the value on the table is equal to Do min/Db.

9. Column 9

The ninth column, entitled "Do max," is meant to indicate another variation in the cartridge diameter, in this instance by adding to Do the value of "Gap." Thus Do max=(1+Gap)×Do. For the first line in the table of FIG. 18, Do max=(1+0.07)×2.5, i.e., 1.07 (2.5) or 2.68 inch.

10. Column 10

The tenth column reflects Do max (col. 9) as a % of Db (col. 6). Thus the value given equals Do max/Db.

11. Column 11

The eleventh column is entitled "Di min." It reflects a variation in Di, by using the value chosen for Gap. Thus Di min=(1−Gap)×Di. For the first line in the table of FIG. 18, Di min=(1−0.07)×1.25; i.e., 0.93 (1.25) or 1.16 inch.

12. Column 12

Column 12 is a report of Di min (col. 11) as a % of Db (col. 6). Thus, the values in column 12 for any given line comprise Di min/Db.

13. Column 13

Column 13 is entitled "Di max." It is equal to the value of Di modified by addition of the Gap. In general Di max equal (1+Gap) times Di. For the first line of the table of FIG. 18, Di max=(1+0.07)×1.25; i.e., 1.07 (1.25) or 1.34 inch.

14. Column 14.

Column 14 reflects Di max (col. 13) as a % of Db (col. 6). It is a calculated value of Di max/Db.

15. Column 15

Column 15 is entitled "Astd(Ds=Di,Do,Di)." It is the area of the defined end cap (Do (col. 1), Di (col. 2), plt. count (col. 4)) that would be effected by axial load for a cartridge in which the seal is located on the inside diameter (Ds=Di) of the pleat pack. Thus it is a calculated effected area (Ae) or (Astd) for a standard cartridge design with a seal on the inside of the pleat pack. The term "effected area" in this context, is meant to refer to an amount (in terms of surface area on one side of the cartridge) which is subject to a difference in pressure of Pu versus Pd. It is a figure that results from subtracting from the total area of one side of the end cap, an amount of area that is subject to the same pressure on both sides, whether it be Pu or Pd. (In the calculation, pleat count of 20 is used.)

The value of column 15 is a calculated value, using the functions described previously herein.

For a cartridge in which a seal is located at an inside diameter of the pleat pack and out-to-in flow, the resulting end cap is under a force toward the media pack. For the tables of FIGS. 18-26, this such a force is represented by positive numbers.

Of course if the flow was in the opposite direction "in-to-out," the absolute value of the effected area would be the same, but the direction of force would be opposite.

16. Column 16

Column 16 entitled "Ae(Ds calc, Do min, Di min)" is the calculated effected area of the end cap when Ds=the value of column 6, and the end cap parameters are an outside pleat pack diameter at Do min (col. 7) and an inside pleat diameter at Di min (col. 11), with the seal located at the calculated position of Db for Do and Di. This value in column 16, then, indicates how much variation in effected area (Ae) there has been from a balanced location (Ae=0), if the seal is maintained at the same location as col. 6, but Do and Di are modified to Do min and Di min. The absolute value of this can be compared to the value of column 15, to see whether the amount of total effected area (Ae) is smaller, and thus better, by comparison to a standard filter cartridge. When the value reported is negative, the pressure is away from the pleat pack (when an out-to-in flow is assumed). In the calculation, a pleat count of 20 is used.

17. Column 17

Column 17 entitled "Ds1=Ds as a function of Do min & Di min," is a figure called Ds1, which, for the calculations presented in the table, corresponds to a location for a seal at which balance (Ae×0) would occur (a new calculated Db), if the cartridge had an outside diameter Do min (col. 7) and an inside diameter Di min (col. 11) and a pleat count of 20.

18. Column 18

Column 18 entitled "Ds1 as a % of Db" is a statement of a calculation of Ds1 (column 17) as a percent of Db (column 6).

19. Column 19

Column 19 entitled "Ae(Ds calc, Do min, Di max" is the effected area (Ae) of the end cap when the seal is at the location Db (of column 6), but the pleat pack outside diameter is at Do min (col. 7), the inside diameter is a Di max (col. 13) and the pleat count is 20.

20. Column 20

Column 20 is entitled "Ds1=Ds as a function of Do min & Di max" is a calculated seal diameter balance point (Ae=0), for a cartridge in which the outside diameter is at Do min (col. 7), the inside diameter is at Di max (col. 13) and the pleat count is 20.

21. Column 21

Column 21 entitled "Ds1 as a % of Db" is a statement of Ds1 (Col. 20) as a percentage of Db (column 6).

22. Column 22

Column 22 entitled "Ae(Ds calc, Do max, Di min" is the effected area (Ae) of the end cap when the seal is located at Db (column 6), but the pleat pack outside diameter is at Do max (col. 9), the inside diameter is at Di min (col. 17) and the pleat count is 20.

23. Column 23

Column 23 entitled "Ds1=Ds as a function of Do max & Di min" is a calculation of where the seal will be located to be in balance (Ae=0), for a media pack with an outside diameter at Do max (col. 9), an inside diameter at Di min (col. 11) and a pleat count of 20.

24. Column 24

Column 24 is a statement of the calculated seal location of column 23, as a percent of the Db value of column 6.

25. Column 25

Column 25 entitled "Ae(Ds calc, Do max, Di max" is the effected area (Ae) of the end cap when a seal is located at Db (column 6) and the cartridge has a pleat pack outside diameter of Do max (col. 9), a pleat pack inside diameter of Di max (co. 13) and a pleat count of 20.

26. Column 26

Column 26 entitled "Ds1=Ds as a function of Do max & Di max" is the calculated seal location for a balance (Ae=0), for an end cap of Do max (col. 9), Di max (col. 13) and a pleat count of 20.

27. Column 27

Column 27 is a calculated value of the seal side of column 26 divided by the value of Db in column 6.

Columns 28-31, allow for comparison of effected area for each of the four variations in Do and Di (pleat count=20) previously discussed, against a standard cartridge for which the seal is located on the inside diameter, as is typical for many standard arrangements.

28. Column 28

Column 28 entitled "Ae(Ds=Db, Do min, Di min) % Astd" compares the effected area (Ae) of an end cap using the seal at Db (col. 6) for a media pack having Do min (col. 7), Di min (col. 11) and pleat count 20 as defined, against the effected area of an end cap (same dimensions and pleat count) using a seal located at Di min (i.e., at the inside diameter) which would be standard (Astd).

For example: for a cartridge with Ds=2.89 inches; Do=3.20 inches; Di=1.60 inches; and a pleat count of 20; the effected area (Ae) is 2.57 square inches as compared to 3.27 square inches for a corresponding standard style cartridge with the same Do, Di but with Ds=Di. The area Ae is 79% of Astd. This means that the axial load is also 79% of the axial load on the corresponding standard filter cartridge.

29. Column 29

Column 29 is entitled "Ae(Ds=Db, Do min, Di max) % Astd," and provides a similar comparison to col. 28, in this instance where the effected area (Ae) is calculated for a seal at Db (col. 6), and the pleat dimensions at Do min and Di max, against a similar cartridge with a seal located at the inside pleat diameter.

For example: for a cartridge with Ds=2.89 inches; Do=3.20 inches; Di=2.50 inches; and a pleat count of 10; the effected area (Ae) is 0.32 square inches as compared to 3.27 square inches for a corresponding standard filter cartridge having the same Do, Di but with Ds=Di. The area Ae is 10% of Astd. This means that the axial load is also 10% of the axial load on the corresponding standard filter cartridge.

30. Column 30

Column 30 is entitled "Ae(Ds=Db, Do max, Di min) % Astd," and provides a similar comparison (to col. 28, 29) of effected area (Ae) to effected area standard (Astd), where the seal is at Db (column 6) and the pleat dimensions are: outside dimension at Do max, and inside dimension at Di min. The comparison of Ae is against the same cartridge, but with a seal located at the inside diameter (Astd).

For example: for a cartridge with Ds=2.89 inches; Do=5.00 inches; Di=1.60 inches; and a pleat count of 20; the effected area (Ae) is 0.32 square inches as compared to 3.27 square inches for a corresponding standard filter cartridge of the same Do, Di but with Ds=Di. The area Ae is 10% of Astd. This means that the axial load is also 10% of the axial load on the corresponding standard filter cartridge.

31. Column 31

Column 31 is entitled "Ae(Ds=Db, Do max, Di max) % Astd," and is a similar comparison of effected areas to cols. 28-30, for a situation in which the seal would be located at Db (column 6) but the outside pleat diameter would be at Do max and the inside pleat diameter Di max. The comparison would be of effected area (Ae) for such a situation, against an effected area (Astd) of the same end cap but with the seal at the inside diameter.

For example: for a cartridge with Ds=2.89 inches; Do=5.00 inches; Di=2.50 inches; and a pleat count of 20; the effected area (Ae) is 3.21 square inches as compared to 3.27 square inches for a corresponding standard style cartridge of the same Do, Di but with Ds=Di. The area Ae is 98% of Astd. This means that the axial load is also 98% of the axial load on the corresponding standard style cartridge.

The comparisons of columns 28-31, allow an understanding of what percent of axial load (Ae) is left on the end cap, when the end cap is adjusted to have the dimensions and seal location identified in the particular example, by comparison to a standard style end cap in which the seal is provided at the inside diameter of the pleat tips, as opposed to spaced across the end cap between the inside diameter of the pleat tips and the outside diameter of the pleat tips, in accord with the definitions provided. For the examples of these four columns, the cartridge has not been optimized to obtain Ae=0. Thus the comparison of interest, indicates how much actual reduction in Ae and thus pressure, has occurred.

B. Selected Data Plots, FIGS. 27-32

Attention is now directed to the graphs of FIGS. 27-32. In FIGS. 27-32, the groups refer to groups of seal diameter (Ds) resulting from the data of FIGS. 18-26.

Figure 27:
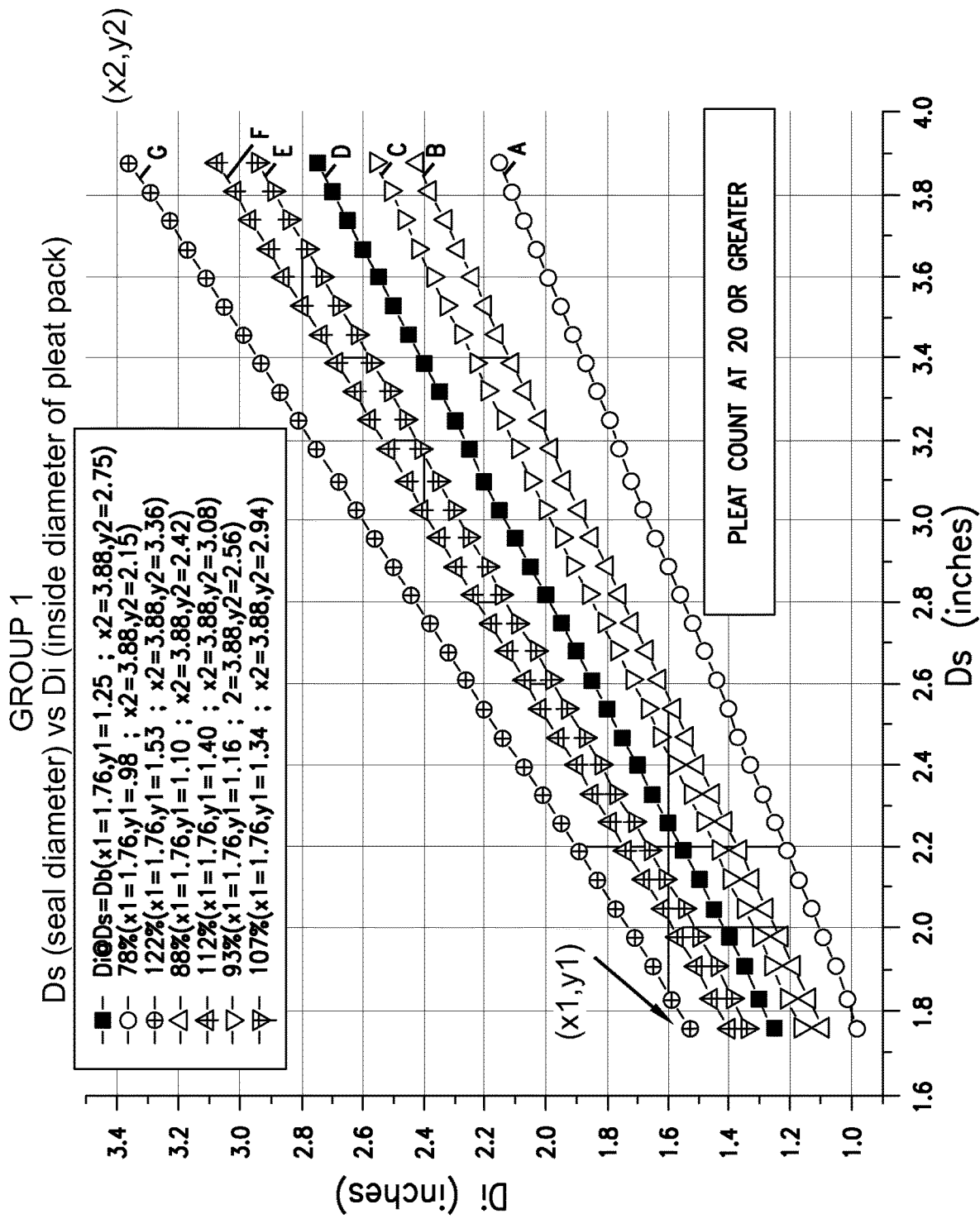
FIG. 27 is a plot of the inner pleat diameter (Di) versus seal diameter (Ds) for selected data, from FIGS. 18-26.
Figure 28:
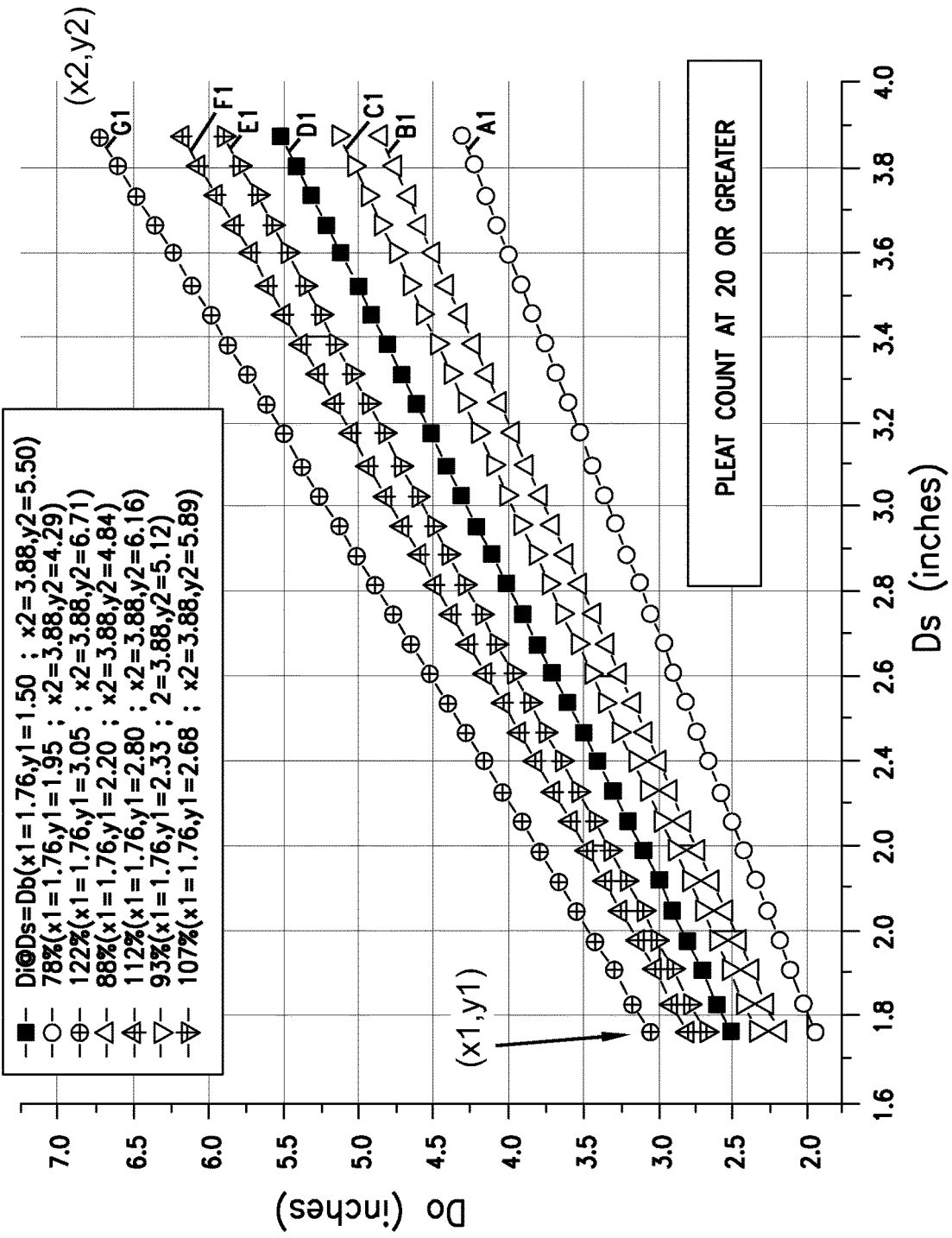
FIG. 28 is a plot of the outside diameter (Do) versus seal diameter (Ds) for selected points of data in the tables of FIGS. 18-26.

1. FIGS. 27 and 28

(a) FIG. 27

Figures 19, 19A:
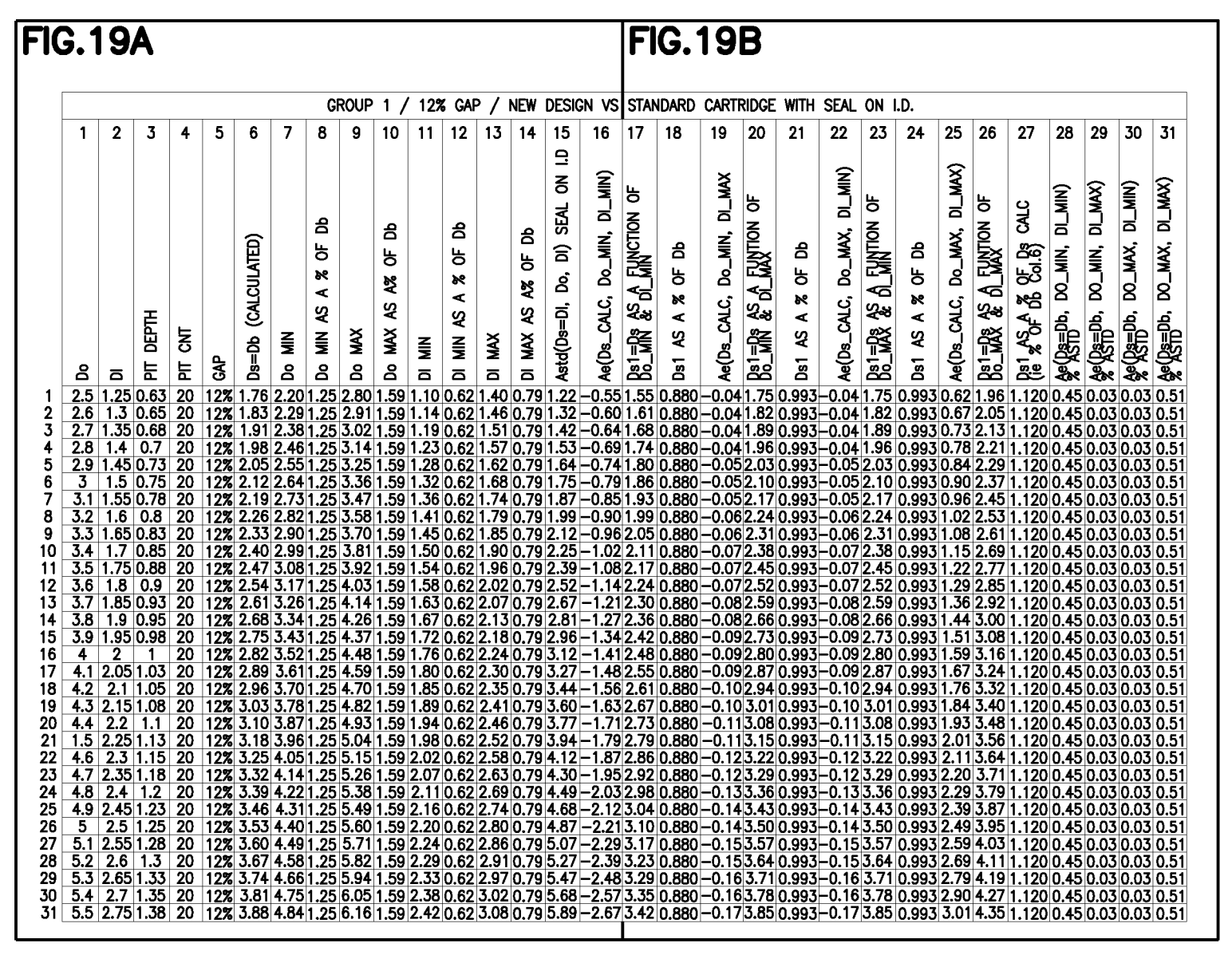

Referring first to the graph of FIG. 27, the graph includes a plot of certain information included in tables of FIGS. 18-20.

In particular, for the systems described in the tables of FIGS. 18-20, the plot of FIG. 27 is of the seal diameter Ds against Di. Seven lines are plotted. The lines are identified as A, B, C, D, E, F and G as follows:

Line A=for data in FIG. 20 a plot of the Ds value of column 6 (x-axis) against a Di value corresponding to Di min, column 11 (y-axis).

Line B=a plot for the data in FIG. 19 of the Ds value of column 6 (x-axis) against a Di value corresponding to Di min, column 11 (y-axis).

Line C=a plot for data of FIG. 18 of the Ds value of column 6 (x-axis) against a Di value corresponding to Di min, column 11 (y-axis).

Line D=a plot from any of FIGS. 18-20 of the Ds value of column 6 (x-axis) against a Di value corresponding to Di, column 2 (y-axis).

Line E=a plot from FIG. 18 of the Ds value of column 6 (x-axis) against a Di value corresponding to Di max, column 13 (y-axis).

Line F=a plot from FIG. 19 of the Ds value of column 6 (x-axis) against a Di value corresponding to Di max, column 13 (y-axis).

Line G=a plot from FIG. 20 of the Ds value of column 6 (x-axis) against a Di value corresponding to Di max, column 13 (y-axis).

(b) FIG. 28

For the systems described in the tables of FIGS. 18-20, the plot of FIG. 28 is of the seal diameter Ds against Do. Seven lines are plotted. The lines are identified as A1, B1, C1, D1, E1, F1 and G1 as follows:

Line A1=for data in FIG. 20 a plot of the Ds value of column 6 (x-axis) against a Do value corresponding to Do min, column 7 (y-axis).

Line B1=a plot for the data in FIG. 19 of the Ds value of column 6 (x-axis) against a Do value corresponding to Do min, column 7 (y-axis).

Line C1=a plot for data of FIG. 18 of the Ds value of column 6 (x-axis) against a Do value corresponding to Do min, column 7 (y-axis).

Line D1=a plot from any of FIGS. 18-20 of the Ds value of column 6 (x-axis) against a Do value corresponding to Do, column 2 (y-axis).

Line E1=a plot from FIG. 18 of the Ds value of column 6 (x-axis) against a Do value corresponding to Do max, column 9 (y-axis).

Line F1=a plot from FIG. 19 of the Ds value of column 6 (x-axis) against a Do value corresponding to Do max, column 9 (y-axis).

Line G1=a plot from FIG. 20 of the Ds value of column 6 (x-axis) against a Do value corresponding to Do max, column 9 (y-axis).

Figure 29:
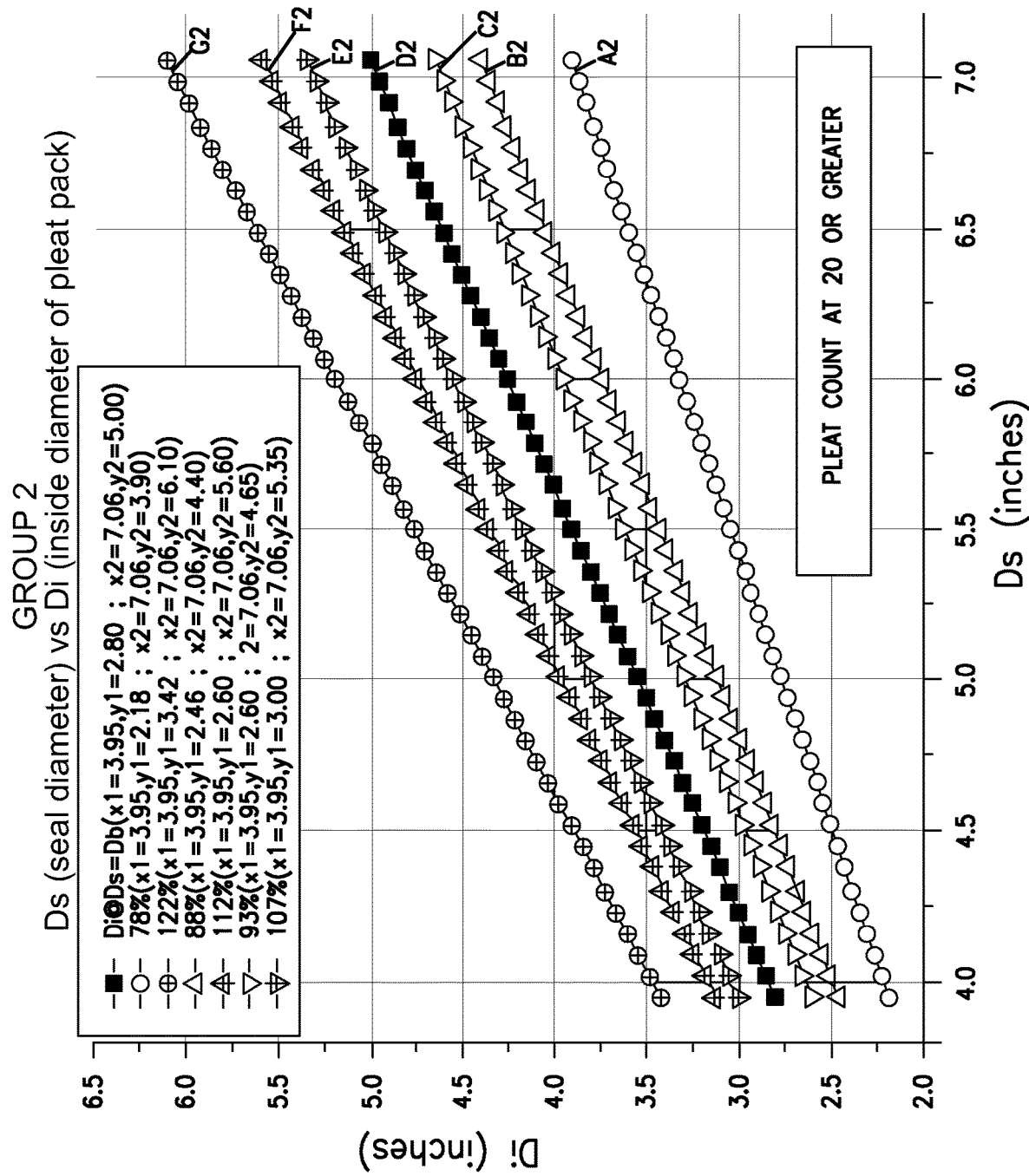
FIG. 29 is a plot of the inner pleat diameter (Di) versus seal diameter (Ds) for selected data, from FIGS. 18-26.
Figure 30:
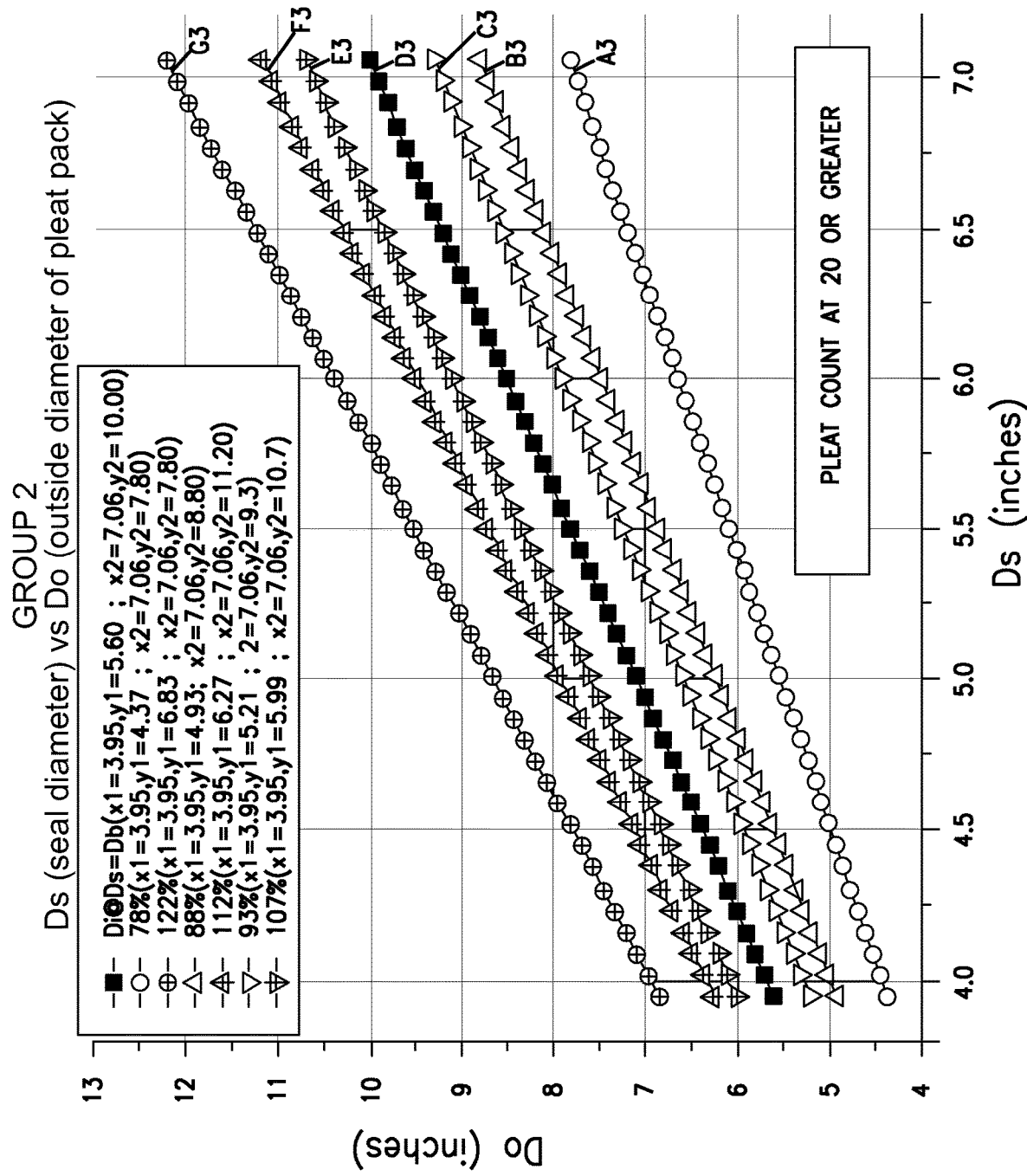
FIG. 30 is a plot of the outside diameter (Do) versus seal diameter (Ds) for selected points of data in the tables of FIGS. 18-26.

2. FIGS. 29 and 30

(a) FIG. 29

Figure 23:
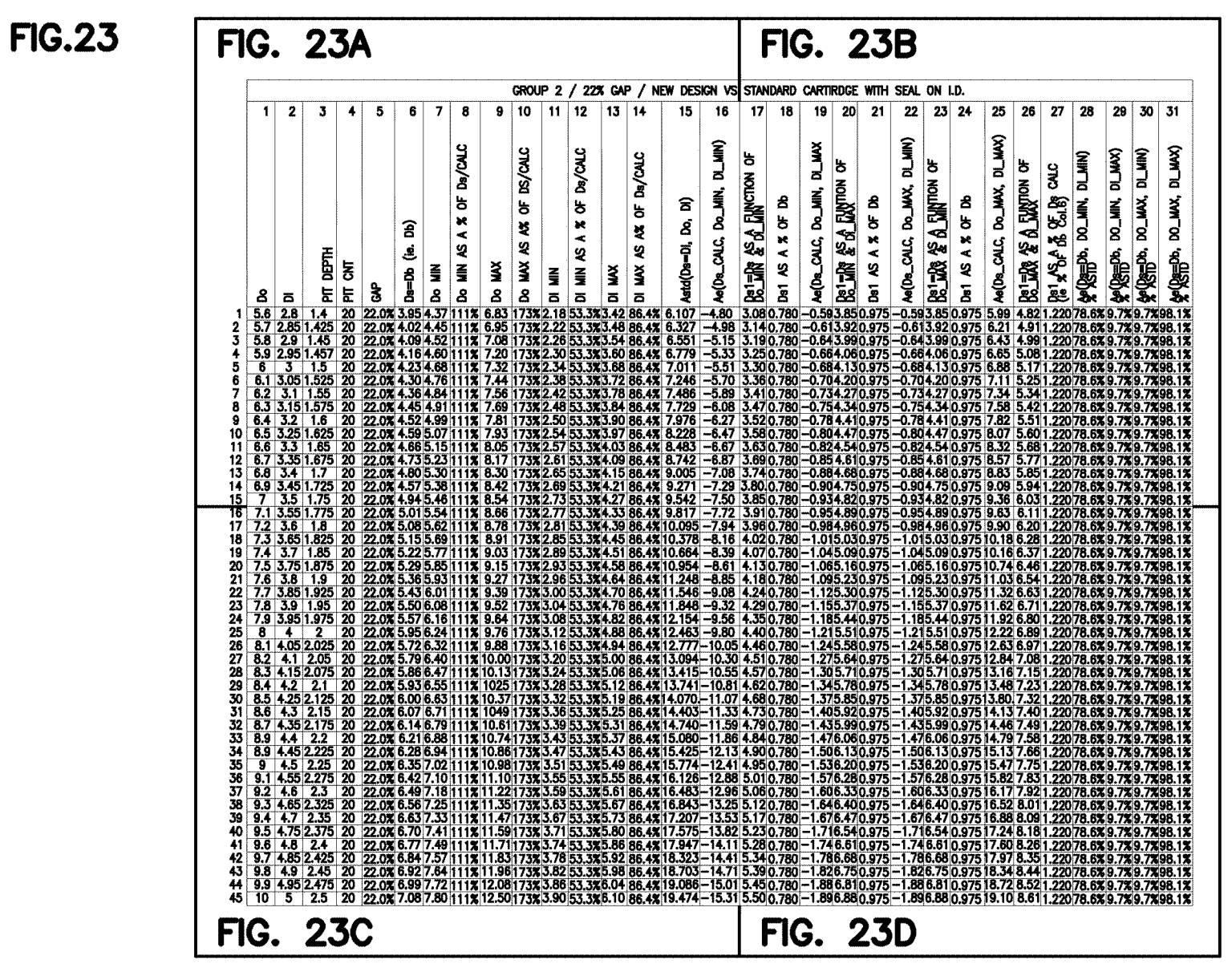

For the systems described in the tables of FIGS. 21-24, the plot of FIG. 29 is of the seal diameter Ds against Di. Seven lines are plotted. The lines are identified as A2, B2, C2, D2, E2, F2 and G2 as follows:

Line A2=for data in FIG. 23 a plot of the Ds value of column 6 (x-axis) against a Di value corresponding to Di min, column 11 (y-axis).

Figures 22, 22A, 22C:
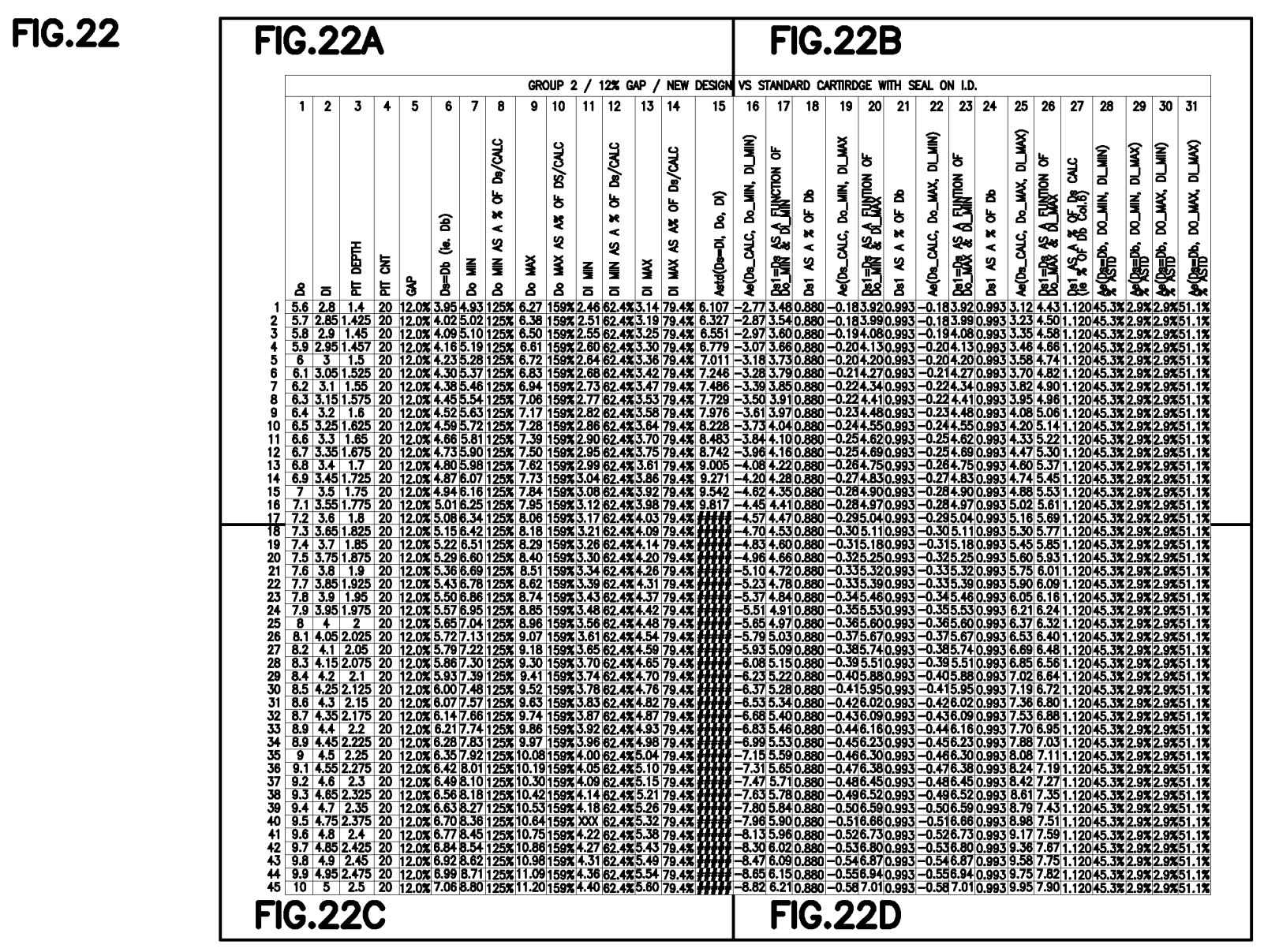

Line B2=a plot for the data in FIG. 22 of the Ds value of column 6 (x-axis) against a Di value corresponding to Di min, column 11 (y-axis).

Figures 21, 21A, 21C:
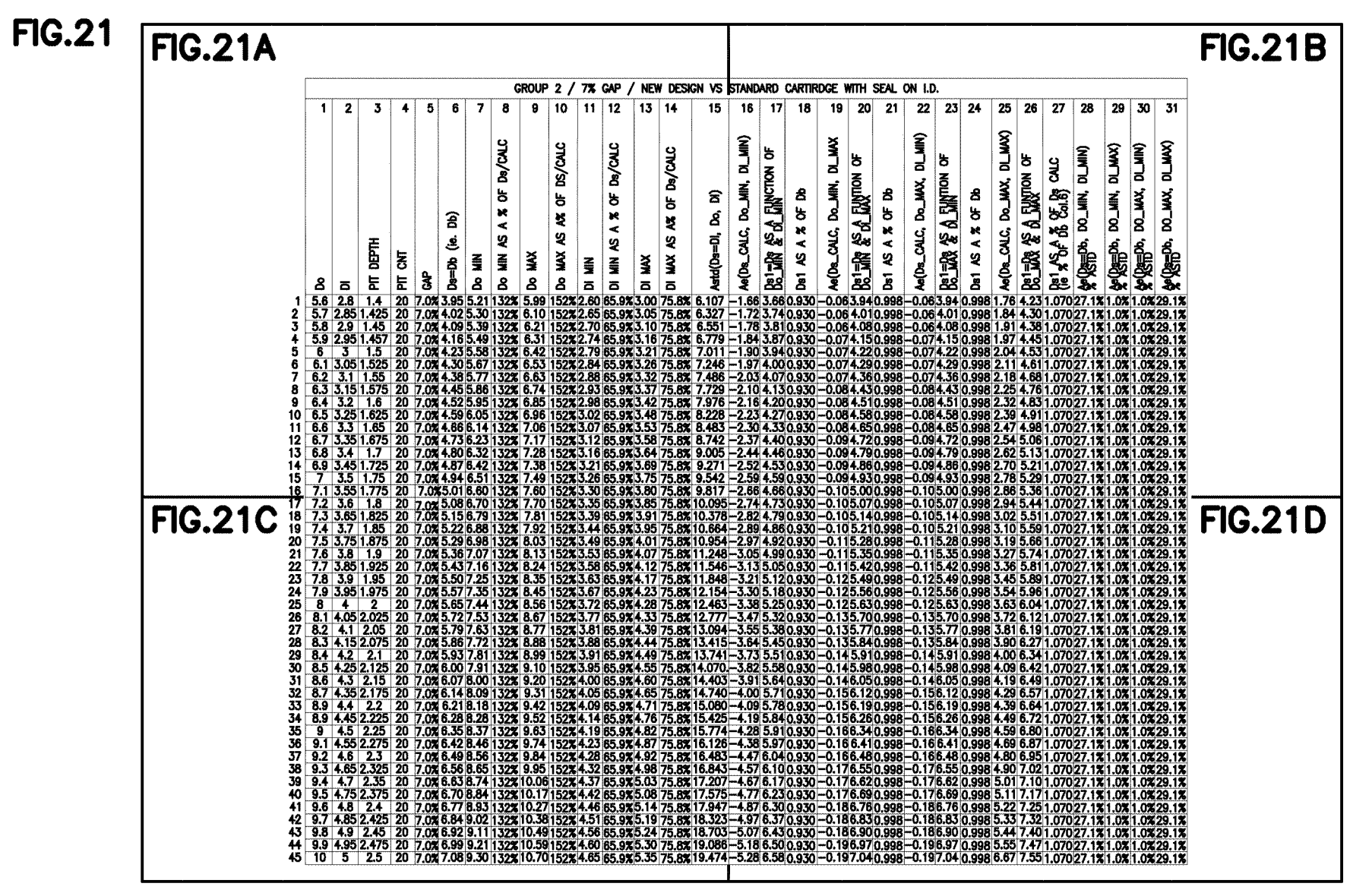

Line C2=a plot for data of FIG. 21 of the Ds value of column 6 (x-axis) against a Di value corresponding to Di min, column 11 (y-axis).

Line D2=a plot from any of FIGS. 21-23 of the Ds value of column 6 (x-axis) against a Di value corresponding to Di, column 2 (y-axis).

Line E2=a plot from FIG. 21 of the Ds value of column 6 (x-axis) against a Di value corresponding to Di max, column 13 (y-axis).

Line F2=a plot from FIG. 22 of the Ds value of column 6 (x-axis) against a Di value corresponding to Di max, column 13 (y-axis).

Line G2=a plot from FIG. 23 of the Ds value of column 6 (x-axis) against a Di value corresponding to Di max, column 13 (y-axis).

(b) FIG. 30

For the systems described in the tables of FIGS. 21-23, the plot of FIG. 30 is of the seal diameter Ds against Do. Seven lines are plotted. The lines are identified as A3, B3, C3, D3, E3, F3 and G3 as follows:

Line A3=for data in FIG. 23 a plot of the Ds value of column 6 (x-axis) against a Do value corresponding to Do min, column 7 (y-axis).

Line B3=a plot for the data in FIG. 22 of the Ds value of column 6 (x-axis) against a Do value corresponding to Do min, column 7 (y-axis).

Line C3=a plot for data of FIG. 21 of the Ds value of column 6 (x-axis) against a Do value corresponding to Do min, column 7 (y-axis).

Line D3=a plot from any of FIGS. 21-23 of the Ds value of column 6 (x-axis) against a Do value corresponding to Do, column 2 (y-axis).

Line E3=a plot from FIG. 21 of the Ds value of column 6 (x-axis) against a Do value corresponding to Do max, column 9 (y-axis).

Line F3=a plot from FIG. 22 of the Ds value of column 6 (x-axis) against a Do value corresponding to Do max, column 9 (y-axis).

Line G3=a plot from FIG. 23 of the Ds value of column 6 (x-axis) against a Do value corresponding to Do max, column 9 (y-axis).

Figure 31:
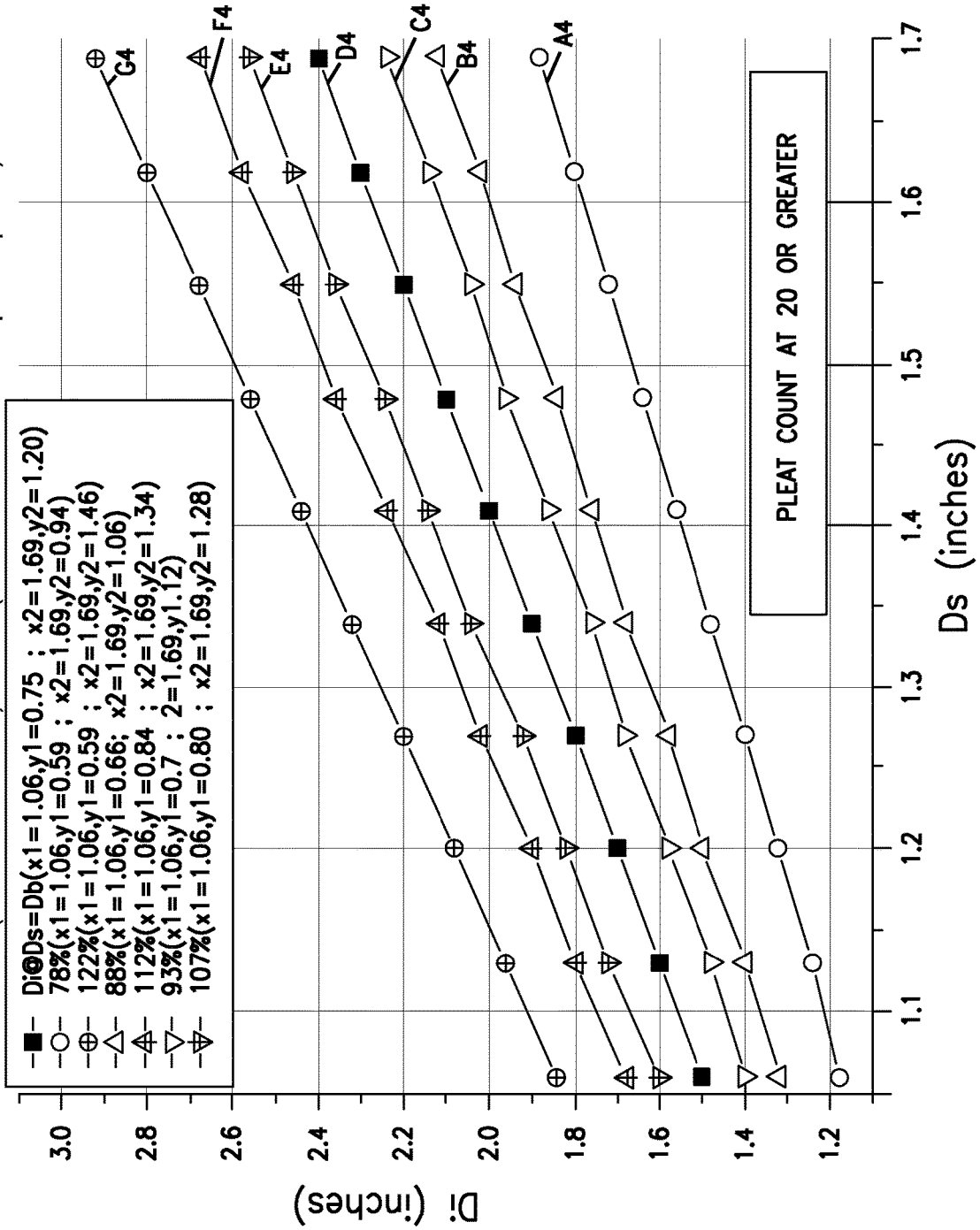
FIG. 31 is a plot of the inner pleat diameter (Di) versus seal diameter (Ds) for selected data, from FIGS. 18-26.
Figure 32:
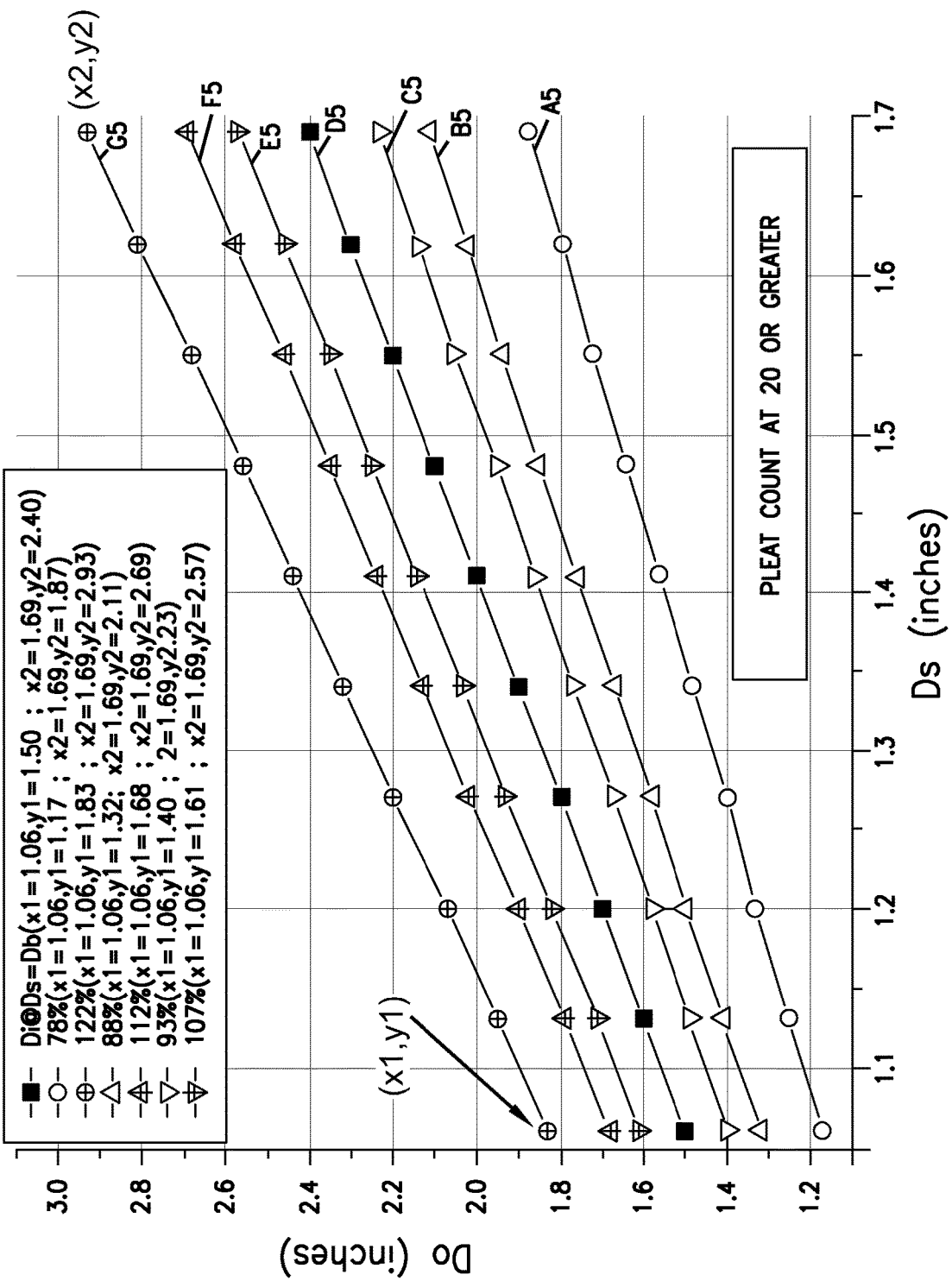
FIG. 32 is a plot of the outside diameter (Do) versus seal diameter (Ds) for selected points of data in the tables of FIGS. 18-26.

3 FIGS. 31 and 32

(a) FIG. 31

Figures 24, 24A, 24B:
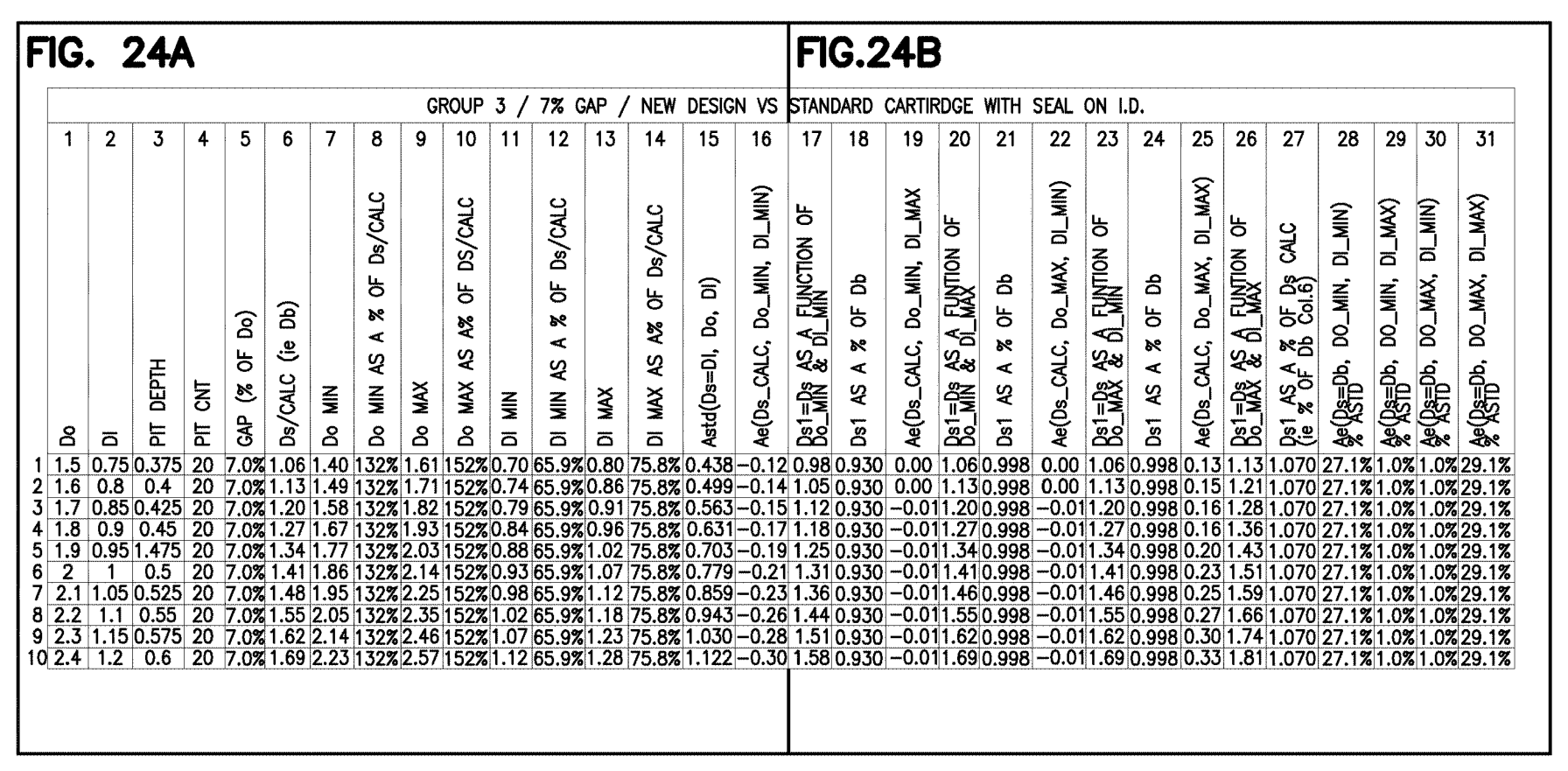

For the systems described in the tables of FIGS. 24-26, the plot of FIG. 31 is of the seal diameter Ds against Di. Seven lines are plotted. The lines are identified as A4, B4, C4, D4, E4, F4 and G4 as follows:

Line A4=for data in FIG. 26 a plot of the Ds value of column 6 (x-axis) against a Di value corresponding to Di min, column 11 (y-axis).

Line B4=a plot for the data in FIG. 25 of the Ds value of column 6 (x-axis) against a Di value corresponding to Di min, column 11 (y-axis).

Line C4=a plot for data of FIG. 24 of the Ds value of column 6 (x-axis) against a Di value corresponding to Di min, column 11 (y-axis).

Line D4=a plot from any of FIGS. 24-26 of the Ds value of column 6 (x-axis) against a Di value corresponding to Di, column 2 (y-axis).

Line E4=a plot from FIG. 24 of the Ds value of column 6 (x-axis) against a Di value corresponding to Di max, column 13 (y-axis).

Line F4=a plot from FIG. 25 of the Ds value of column 6 (x-axis) against a Di value corresponding to Di max, column 13 (y-axis).

Line G4=a plot from FIG. 26 of the Ds value of column 6 (x-axis) against a Di value corresponding to Di max, column 13 (y-axis).

(b) FIG. 32

For the systems described in the tables of FIGS. 24-26, the plot of FIG. 32 is of the seal diameter Ds against Do. Seven lines are plotted. The lines are identified as A5, B5, C5, D5, E5, F5 and G5 as follows:

Line A5=for data in FIG. 26 a plot of the Ds value of column 6 (x-axis) against a Do value corresponding to Do min, column 7 (y-axis).

Line B5=a plot for the data in FIG. 25 of the Ds value of column 6 (x-axis) against a Do value corresponding to Do min, column 7 (y-axis).

Line C5=a plot for data of FIG. 24 of the Ds value of column 6 (x-axis) against a Do value corresponding to Do min, column 7 (y-axis).

Line D5=a plot from any of FIGS. 24-26 of the Ds value of column 6 (x-axis) against a Do value corresponding to Do, column 2 (y-axis).

Line E5=a plot from FIG. 24 of the Ds value of column 6 (x-axis) against a Do value corresponding to Do max, column 9 (y-axis).

Line F5=a plot from FIG. 25 of the Ds value of column 6 (x-axis) against a Do value corresponding to Do max, column 9 (y-axis).

Line G5=a plot from FIG. 26 of the Ds value of column 6 (x-axis) against a Do value corresponding to Do max, column 9 (y-axis).

Utilization of the graphs of FIGS. 26-32 will be apparent from the following example.

1. In many instances, the seal diameter for a system will be fixed by the equipment. Consider for example an effort to design a new filter cartridge to fit on the head 601 of FIG. 16. Head 601 would already be in place on equipment, or would already have been designed to be in place on that equipment. The seal diameter would be fixed, by the design of post 620, on the head 601.

In designing the replacement part 602, in particular the cartridge 604, then, the parameter of the seal diameter (Ds) would already be fixed.

Also, the overall outside and inside diameters of the housing 603 are generally fixed, or at least limited. This sets the range in which one can design Do and Di for the cartridge.

2. If one assumes, for purposes of example, that the size range of the seal, Ds, for FIG. 16 is between 1.7 and 3.9 inches, the tables of Group 1, FIG. 27 and FIG. 28, are appropriate for utilization. (Other sizes of Ds would involve Group 2 or Group 3.)

3. The line identified as "D" in FIG. 27 and "D1" in FIG. 28, identifies for any given seal diameter (Ds) in the range stated, appropriate Di and Do values, to achieve balance, i.e., to obtain Ae=0. That is, if one assumes for example a seal diameter identified by the post 620 of 2.6 inches, in FIG. 27 this indicates that to obtain a balance (Ae=0), a Di of a little more than 1.8 inches should be chosen, and from FIG. 28, a Do of about 4 inches should be chosen. (Actual values are in corresponding data charts.)

4. Of course it would be preferred to optimize the design, in many instances, to provide for Ae=0, in accord with the discussion of point 3 above. However this is not, in all instances, practical or required.

The lines represented by line segment A in FIG. 27 and the line segment A1 in FIG. 28, generally indicates lower useable limits for Di and Do, respectively, for given values of Ds. It can be seen from the calculations of the tables, for FIG. 20, that as long as the value selected for Di and Do, for a given Ds, is on or above lines A and A1 respectively, substantial reduction in Ae, and thus corresponding load, result (by comparison to a standard seal design assumed to be with Ds being approximately Di).

5. In general, the line represented by line segments G and G1, FIGS. 17, 28, reflect the extreme of Do max, Di max, col. 31, FIG. 20. This is generally a value Di, Do for a given selection Ds, that would be so great, as to not result in substantial advantage relative to a standard style cartridge, where Ds is located at approximately Di.

6. On the other hand, the line represented by line segments F and F1, generally reflect values for Di and Do respectively, for a given selected Ds, whereat substantial reduction in Ae and thus forces occur. Thus, Di and Do, respectively, should be on or below lines of which F and F1, respectively, are segments.

7. As a result, a general advantage will be achieved provided, for a given value Ds, the values of Di and Do respectively are selected to be no less than the values given for lines represented by segments A and A1, and no more than the values given by lines represented by segments F and F1.

8. Greater advantage results, when the values chosen for Di and Do respectively, for a given Ds, are: (a) no less than the values of lines represented by segments B and B1 respectively; and, (b) no greater than the values of lines represented by segments F and F1 respectively; and, (c) preferably no greater than the values of lines represented by E and E1 respectively.

9. In typical applications of the principles herein, it will be preferred that the values selected for Di and Do, for a given Ds, will be no less than the values of lines represented by segments C and C1 respectively. Also, preferably they are no greater than the values of lines represented by segments E and E1 respectively.

10. The graph of FIG. 27, as indicated previously, is central portion of a continuous graph generated by FIG. 31 on the low end for Ds and FIG. 29 on the high end for Ds. Thus: lines A, A2 and A4 are sections of a continuous line; lines B, B2 and B4 are sections of a continuous line; lines C, C2 and C4 are sections of a continuous line; lines D, D2 and D4 are sections of a continuous line; lines E, E2 and E4 are sections of a continuous line; lines F, F2 and F4 are sections of a continuous line; and, lines G, G2 and G4 are sections of a continuous line.

11. Similarly, the graph of FIG. 28, as indicated above, is a central section of a continuous graph comprising FIGS. 28, 30 and 32. Thus, lines A1, A3 and A5 are sections of a continuous line; lines B1, B3 and B5 are sections of a continuous line; lines C1, C3 and C5 are sections of a continuous line; lines D1, D3 and D5 are sections of a continuous line; lines E1, E3 and E5 are sections of a continuous line; lines F1, F3 and F5 are sections of a continuous line; and, lines G1, G3 and G5 are sections of a continuous line.

12. The graphs of FIGS. 27-32, then, can be used to select a preferred Ds value range and Do value range, for a given Ds, over a Ds (seal diameter) range of 1.06 inches (26.9 mm) to 7.06 inches (179 mm). The different lines indicate useable defined ranges, for effects (Ae) as described in the tables. Typically the ranges selected for Di and Do respectively, for a given Ds, will be on or between lines for which segments A (or A1) and F (or F1) are a part, typically on or between line of which B (or B1) and F (or F1) are a part, and often on or between lines of which segments C (or C1) and E (or E1) are a part.

IX. General Summary of Selected Principles According to the Present Disclosure

A. General Features.

Techniques according to the present disclosure can be applied in a variety of liquid filter arrangements. The liquid filter arrangements generally comprise media extending between first and second opposite end caps. The media would typically be pleated, defining an inner pleat diameter (Di) and an outer pleat diameter (Do). One or both of the end caps can have an open central aperture.

In general at least one of the end caps would have a seal support positioned on a projection extending axially outwardly from the end cap (in a direction away from the media). In typical examples, the seal supported by the seal support, is an o-ring, although alternatives are possible. The seal can be supported to be directed inwardly or outwardly. The o-ring or alternate seal, would generally define a seal diameter Ds.

The filter cartridge can be used as a serviceable filter cartridge, in which it is removed and replaced from a housing during use. It also can be contained permanently within a housing, to be replaced with the housing part, during servicing.

The typical seal support shown in the drawings herein, is of a type which slides into position over (or inside of) a liquid filter assembly component during use. In the examples, the seal supports are shown slid over a post or other structure, through which an aperture, or flow conduit extends. In some arrangements the seal support can slide inside of a flow aperture, to seal against the wall defining the flow aperture, in use.

Seal supports of the type shown in the descriptions herein, are generally put in position without an external clamp, such as a hose clamp or similar structure, to secure the seals in place. Such arrangements will sometimes be described herein as "non-clamp" or "non-clamping" seal supports or seal arrangements, or by similar terms.

The principles of the present disclosure can be utilized to provide arrangements that have no inner liner and/or no outer liner, if desired.

The techniques according to the present disclosure can be utilized for arrangements that are configured for in-to-out flow, or out-to-in flow. Examples of both are described.

Techniques according to the present disclosure can be applied in systems in which the pleated media includes, on one or both sides thereof, pleated media support, such as a pleated wire mesh support or a pleated plastic mesh support.

The principles of the present disclosure, relate to preferred seal locations, to accomplish various effects.

B. Location of the seal diameter for given end cap of a liquid filter cartridge, at a balance point Db (Ae=0) or within a desired range of that location.

In one aspect of the present disclosure, at least the first end cap of a liquid filter arrangement has a first central aperture therethrough, the seal support is positioned on the first end cap to define seal diameter Ds, the seal diameter is within the range of 0.85-1.15 DbA, inclusive, typically within the range of 0.9-1.1 DbA inclusive, and preferably within the range of 0.95-1.05 DbA inclusive, wherein DbA is a diameter in which no axial surface force on the first end cap (A) toward or away from the second end cap (B) in use, results. DbA, of course, is a location which would define effective area of 0 (Ae=0) for the identified end cap, in accord with the calculations above.

Of course in some applications of this aspect of the disclosure, both end caps can be provided apertures therein, and both end caps can be provided with seals thereon within a similar definition. Thus on the second end cap (B) there would be provided a seal support for a seal member having a seal diameter DsB within the range of 0.85-1.15 DbB, typically 0.9-1.1 DbB and often within the range of 0.95-1.05 DbB.

C. Provision of a liquid filter arrangement in which a seal location is positioned spaced from an outer diameter of the end cap and outer pleat tips, and spaced from an inner diameter of the end cap and inner pleat tips.

Another aspect of defining liquid filter cartridges according to the present disclosure, will be understood to be that the filter cartridge is such that at least on a first end cap having a central aperture, seal support is provided that is spaced across the end cap, from the inside diameter of the pleat tips (and end cap aperture if present) a distance corresponding to at least 0.1 X, where X is the dimension corresponding to the distance between the outside diameter of the pleat tips (or end cap outer perimeter if similar) and the inside diameter of the pleat tips (or end cap aperture if similar and present).

For such situations, typically the seal arrangement is also positioned on the end cap a distance spaced from the outer pleat tip diameter (or end cap outer perimeter if similar), inwardly, a distance also corresponding to at least 0.1 X.

In some arrangements, a similar definition can be provided for the second end cap, whether open or closed. That is, a seal arrangement can be mounted on the second end cap defining a seal diameter spaced outwardly from the inside pleat diameter (or aperture) and inwardly from the outside pleat diameter (or end cap perimeter) a distance corresponding to at least 10% of the difference between the inside pleat diameter (or aperture) and outside pleat diameter (or aperture).

In general, in some liquid filter cartridges, the end cap aperture diameter of an open end cap, will be approximately the same as (or only slightly smaller than) the inner pleat tip diameter. Also in some instances the outside end cap diameter would be about the same as the outside pleat diameter. However variations are possible.

When variations are used, the spacing should typically be considered with respect to the pleat tip inner diameter and outer diameter, since these factors control Ae.

D. Liquid filter cartridges with the seal location spaced a specified amount from the inner pleat tips and outer pleat tips.

In another aspect of the invention, the liquid filter cartridge is provided with advantage, over a liquid filter cartridge in which the seal is provided on either the inside pleat diameter or the outside pleat diameter, by having the seal supported at a location spaced from both the side pleat diameter and outside pleat diameter a distance of at least 5 mm, typically at least 10 mm, and usually at least 15 mm.

E. Filter defined with respect to effected area.

In general it is preferred to provide a filter cartridge having at least one end cap, and in some instances two end caps, defined with respect to seal position thereon, such that the seal position provides for a value of Ae (effected area) of no more than 80%, typically no more than 55%, and usually no more than 20%, of a value for Ae of similar end cap and pleat tip definition (Do and Di) but in which the seal is located in the standard position at approximately the inside pleat diameter (Ds=Di).

F. Filter cartridge defined with respect to defined Ds selection of Do, Di, through the utilization of plots of FIGS. 17-32.

In still another aspect of the techniques described herein, a filter cartridge, typically with a pleat count of 20 or greater, can be constructed which has first and second end caps and pleated media extending therebetween, defining an inner pleat tip diameter (Di) and an outer pleat tip diameter (Do) for a given Ds located spaced between the Di and Do location, wherein: for a given value Ds within the range of 1.06 inches (26.9 mm) to 7.06 inches (179.3 mm);

(a) from a plot of Ds (x-axis) versus Do (y-axis) Do is no less than a value defined by a line extending from Ds, Do of 1.06 inches, 1.32 inches (26.9 mm, 33.5 mm) to Ds, Do of 7.06 inches, 8.8 inches (179 mm, 224 mm); and Do is no greater than a value defined by a line extending from Ds, Do of 1.06 inches, 1.68 inches (26.9 mm, 42.7 mm); to Ds, Do of 7.06 inches, 11.20 inches (179 mm, 284 mm); and (b) from a plot of Ds (x-axis) versus Di (y-axis), Di is no less than a value defined by a line extending from Ds, Di of 1.06 inches, 0.66 inches (26.9 mm, 16.8 mm) to Ds, Di of 7.06 inches, 4.4 inches (179 mm, 112 mm) and Di is no greater than a value defined by a line extending from Ds, Di of 1.06 inches, 0.84 inches (26.9 mm, 21.3 mm) to Ds, Di of 7.06 inches, 5.6 inches (179 mm, 142 mm).

Typically:

(a) from a plot of Ds (x-axis) versus Do (y-axis) Do is no less than a value defined by a line extending from Ds, Do of 1.06 inches, 1.4 inches (26.9 mm, 290 mm) to Ds, Do of 7.06 inches, 9.3 inches (17.9 mm, 236 mm); and Do is no greater than a value defined by a line extending from Ds, Do of 1.06 inches, 1.4 inches (26.9 mm, 35.6 mm); to Ds, Do of 7.06 inches, 10.7 inches (179 mm, 272 mm); and (b) from a plot of Ds (x-axis) versus Di (y-axis), Di is no less than a value defined by a line extending from Ds, Di of 1.06 inches, 0.7 inches (26.9 mm, 17.8 mm) to Ds, Di of 7.06 inches, 4.65 inches (179 mm, 118 mm) and Di is no greater than a value defined by a line extending from Ds, Di of 1.06 inches, 0.8 inches (26.9 mm, 20.3 mm) to Ds, Di of 7.06 inches, 5.35 inches (179 mm, 135.9 mm).

Of course a variety of alternate preferred ranges be defined using such plots, as explained above with respect to the graphs of FIGS. 17-32.

G. Liquid Filter Assemblies.

Of course techniques described herein can be utilized to develop liquid filter assemblies comprising housings with filter cartridges therein (serviceable or otherwise). In general the housing would be configured to support the filter cartridge, and the filter cartridge would be selected in accord with the general principles discussed herein, for example as indicated above in Sections IX A-F.

H. Methods of Filtering.

Advantages result from liquid filtering operation in which the liquid to be filtered is passed through an assembly in accord with those of IX G above. The advantages result from the advantageous on one or more end caps of the filter cartridge.

It is noted that in many instances herein, a reference is made to a standard in which the seal is located at the inner pleat diameter, i.e., Ds=Di. For purposes of the calculation, it was assumed that a standard was Ds–Di. In some actual prior instances, there may have been a minor variation from this.

What is claimed:

1. A liquid filter cartridge comprising:
   (a) first and second, opposite, molded polymeric end caps:
      (i) at least the first end cap having a first central aperture therethrough; and
   (b) an extension of pleated filter media secured to, and extending between, the first and second end caps;
      (i) the extension of pleated filter media defining an open central volume in fluid flow communication with the first central aperture;
      (ii) the media comprising a total of at least 20 pleats; and
   (c) means for balancing opposing axial forces on the first end cap by operating fluid during filtering operation to result in little or no net axial force on the first end cap; wherein the means for balancing excludes use of an inner liner and outer liner.

2. A liquid filter cartridge according to claim 1 wherein:
   (a) the liquid filter cartridge has an axial load coreless construction.

3. A liquid filter cartridge according to claim 1 wherein:
   (a) the liquid filter cartridge has an axial load outer liner free construction.

4. A liquid filter cartridge according to claim 1 wherein:
   (a) the second end cap is a closed end cap.

5. A liquid filter cartridge according to claim 1 wherein:
   (a) the second end cap is an open end cap.

6. A liquid filter cartridge according to claim 5 wherein:
   (a) the second end cap includes a second means for balancing opposing axial forces on the second end cap during filtering operation.

7. A liquid filter cartridge according to claim 1 further including an inner liner extending between the first and second end caps and surrounded by the pleated filter media.

8. A liquid filter cartridge according to claim 1 further including an outer liner extending between the first and second end caps and surrounding the pleated filter media.

9. A liquid filter assembly comprising:
   (a) a filter housing;
      (i) the filter housing being threaded, for mounting on a filter head, in use; and,
   (b) a liquid, filter cartridge positioned within the housing, the liquid filter cartridge comprising:
      (i) first and second, opposite, molded polymeric end caps;
         (A) the first end cap having a first central liquid flow aperture therethrough; and,
      (ii) an extension of filter media secured to, and extending between, the first and second end caps;
         (A) the extension of filter media comprising pleated media defining an open central volume in fluid flow communication with the first central aperture and having a pleat inner diameter and a pleat outer diameter; and,
         (B) the media comprising a total of at least 20 pleats; and
      (iii) means for balancing opposing axial forces on the first end cap by operating fluid during filter operation to result in little or no net axial force on the first end cap: wherein the means for balancing excludes use of an inner liner and outer liner.

10. A liquid filter assembly according to claim 9 wherein:
    (a) the liquid filter cartridge has an axial load coreless construction.

11. A liquid filter assembly according to claim 9 wherein:
    (a) the liquid filter cartridge has an axial load outer liner free construction.

12. A liquid filter assembly according to claim 9 wherein:
    (a) the second end cap is a closed end cap.

13. A liquid filter assembly according to claim 9 wherein:
    (a) the second end cap is an open end cap.

14. A liquid filter assembly according to claim 13 wherein:
    (a) the second end cap includes a second means for balancing opposing axial forces on the second end cap during filtering operation.

15. A liquid filter assembly according to claim 9 further including an inner liner extending between the first and second end caps and surrounded by the pleated filter media.

16. A liquid filter assembly according to claim 9 further including an outer liner extending between the first and second end caps and surrounding the pleated filter media.

* * * * *